United States Patent
Kwon et al.

(10) Patent No.: US 12,009,577 B2
(45) Date of Patent: Jun. 11, 2024

(54) ELECTRONIC DEVICE INCLUDING AN ANTENNA

(71) Applicant: SAMSUNG ELECTRONICS CO., LTD., Suwon-si (KR)

(72) Inventors: Soonheung Kwon, Suwon-si (KR); Sumin Yun, Suwon-si (KR); Hosaeng Kim, Suwon-si (KR); Hyunjeong Lee, Suwon-si (KR); Hyungjoo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 68 days.

(21) Appl. No.: 17/955,770

(22) Filed: Sep. 29, 2022

(65) Prior Publication Data

US 2023/0089687 A1   Mar. 23, 2023

Related U.S. Application Data

(63) Continuation of application No. PCT/KR2022/011884, filed on Aug. 9, 2022.

(30) Foreign Application Priority Data

Aug. 10, 2021 (KR) .................. 10-2021-0105054
Dec. 8, 2021 (KR) .................. 10-2021-0175089

(51) Int. Cl.
*H01Q 1/24* (2006.01)
*H01Q 1/48* (2006.01)
(Continued)

(52) U.S. Cl.
CPC .............. *H01Q 1/243* (2013.01); *H01Q 1/48* (2013.01); *H01Q 5/25* (2015.01); *H01Q 5/307* (2015.01); *H01Q 9/0407* (2013.01)

(58) Field of Classification Search
None
See application file for complete search history.

(56) References Cited

U.S. PATENT DOCUMENTS 9,024,832 B2   5/2015   Duron et al.
10,939,539 B2  3/2021   Seo et al.
(Continued)

FOREIGN PATENT DOCUMENTS

KR   101794560 B1   11/2012
KR   20200022803 A   3/2020
(Continued)

OTHER PUBLICATIONS

International Search Report for International Application No. PCT/KR2022/011884 International Filing Date Aug. 9, 2022; dated Nov. 22, 2022; 8 Pages.

*Primary Examiner* — Wilson Lee
(74) *Attorney, Agent, or Firm* — CANTOR COLBURN LLP

(57) ABSTRACT

An electronic device includes a housing providing a front surface and a rear surface, an antenna including a printed circuit board within the housing and including a first surface facing the front surface and a second surface facing the rear surface. The printed circuit board includes a first conductive layer including a first antenna element and a second antenna element that do not overlap each other when viewed from above the first surface, a second conductive layer operating as a ground plane, and a dielectric between the first and second conductive layers. A conductive pattern is located between the front surface and the second surface when the first surface faces the rear surface and is located between the rear surface and the second surface when the first surface faces the front surface. The conductive pattern overlaps a part of the second conductive layer when viewed from above the first surface.

20 Claims, 24 Drawing Sheets

(51) Int. Cl.
*H01Q 5/25* (2015.01)
*H01Q 5/307* (2015.01)
*H01Q 9/04* (2006.01)

(56) References Cited

U.S. PATENT DOCUMENTS

| | | | |
|---|---|---|---|
| 11,276,926 B2 | 3/2022 | Yun et al. | |
| 11,316,284 B2 | 4/2022 | Cho et al. | |
| 2019/0288392 A1* | 9/2019 | Kim | H05K 5/0226 |
| 2020/0021011 A1 | 1/2020 | Cooper et al. | |
| 2020/0106192 A1* | 4/2020 | Avser | H01Q 1/405 |
| 2020/0388911 A1* | 12/2020 | Kim | H05K 3/4644 |
| 2021/0336327 A1 | 10/2021 | Kim et al. | |
| 2021/0344783 A1 | 11/2021 | Jeong et al. | |
| 2021/0376452 A1* | 12/2021 | Wu | H01Q 5/40 |
| 2022/0276682 A1* | 9/2022 | Yu | G02F 1/133305 |
| 2022/0336965 A1* | 10/2022 | Compton | H01Q 21/24 |

FOREIGN PATENT DOCUMENTS

| | | | |
|---|---|---|---|
| KR | 20200024500 A | 3/2020 | |
| KR | 20200109900 A | 9/2020 | |
| KR | 20200121037 A | 10/2020 | |
| KR | 20210051472 A | 5/2021 | |

\* cited by examiner

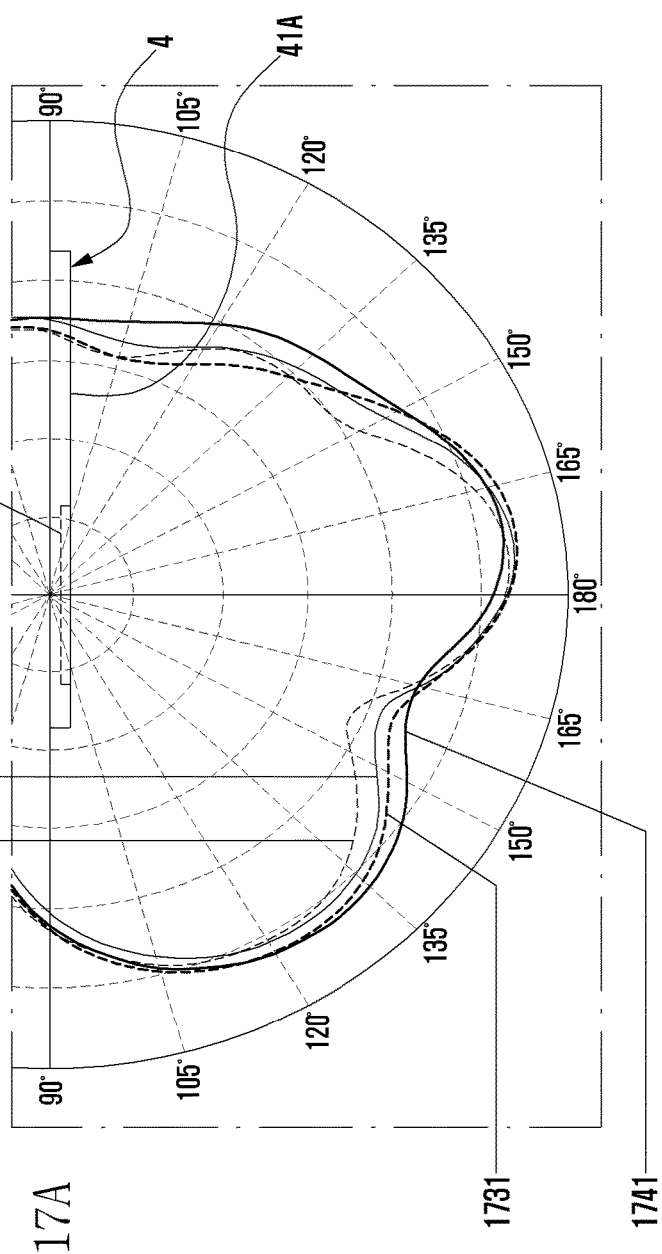

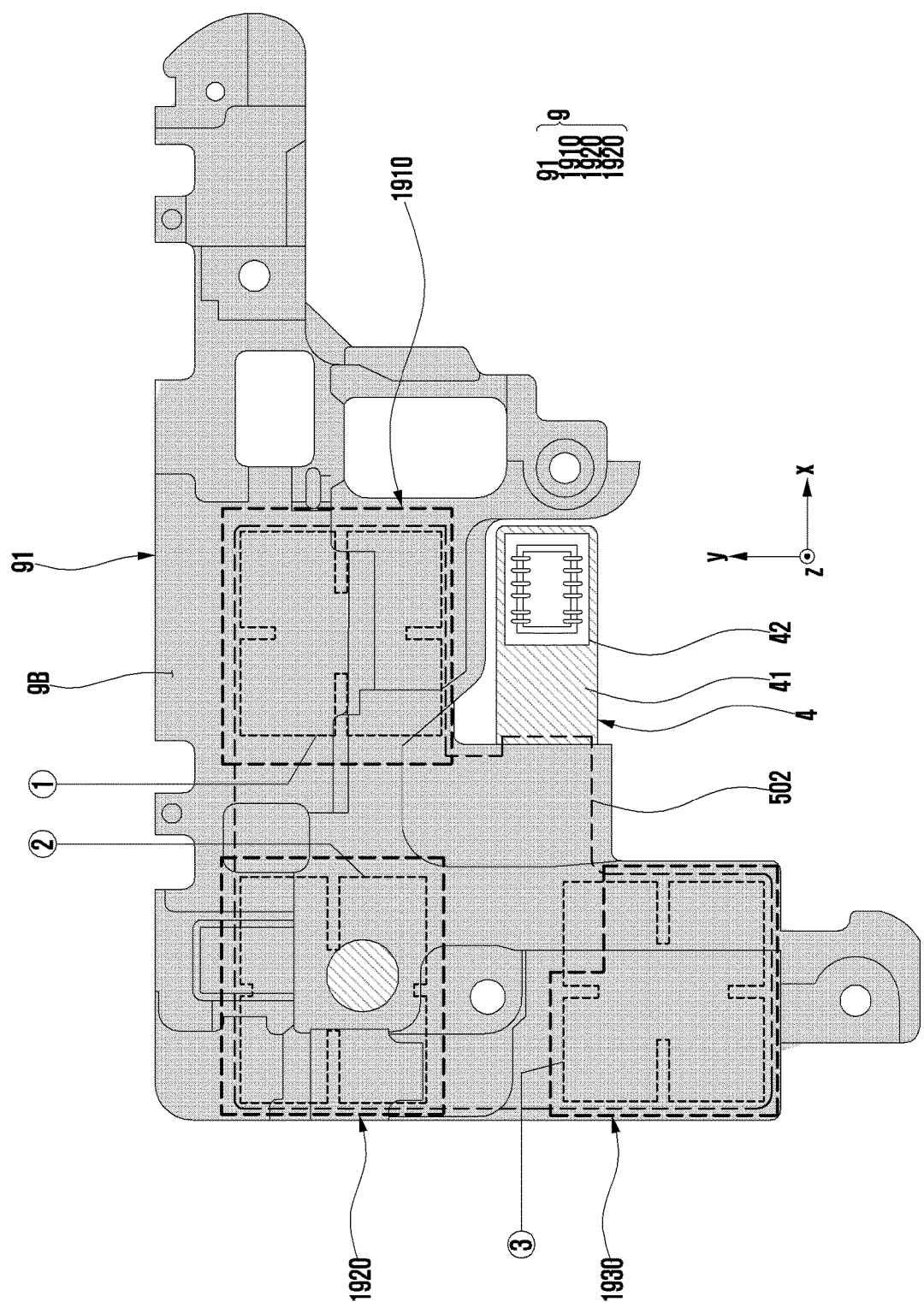

ELECTRONIC DEVICE INCLUDING AN ANTENNA

CROSS-REFERENCE TO RELATED APPLICATION

This application is a continuation of International Application No. PCT/KR2022/011884, designating the United States, filed on Aug. 9, 2022, in the Korean Intellectual Property Receiving Office and claiming priority to Korean Patent Application No. 10-2021-0175089, filed on Dec. 8, 2021, in the Korean Intellectual Property Office, and Korean Patent Application No. 10-2021-0105054, filed on Aug. 10, 2021, in the Korean Intellectual Property Office, the disclosures of which are incorporated by reference herein in their entireties.

TECHNICAL FIELD

Various embodiments of the disclosure relate to an electronic device including an antenna.

BACKGROUND ART

In line with development of wireless communication technologies, electronic devices have become daily necessities, and content usage has increased accordingly. In addition, electronic devices tend to include an increasing number of antennas to support a wide range of available applications.

Technical Problem

As electronic devices have become slim, it can be difficult to position an antenna in a limited space in a manner that reduces electromagnetic influences with peripheral components.

Solution to Problem

Various embodiments of the disclosure may provide an electronic device including an antenna for improved antenna radiation performance.

Technical problems to be solved by the disclosure are not limited to the above-mentioned technical problems, and other technical problems not mentioned herein will be clearly understood from the following description by those skilled in the art to which the disclosure pertains.

According to an embodiment of the disclosure, an electronic device may include a housing providing a front surface of the electronic device and a rear surface of the electronic device and an antenna structure including a printed circuit board located within the housing and including a first surface facing the front surface or the rear surface and a second surface facing an opposite direction to the first surface. The printed circuit board includes a first conductive layer including a first antenna element and a second antenna element that do not overlap each other when viewed from above the first surface, a second conductive layer located closer to the second surface than the first conductive layer and operating as a ground plane, and a dielectric located between the first conductive layer and the second conductive layer. The printed circuit board further includes a conductive pattern located between the front surface and the second surface when the first surface faces the rear surface or located between the rear surface and the second surface when the first surface faces the front surface. The conductive pattern overlaps at least a part of the second conductive layer when viewed from above the first surface.

Advantageous Effects of Invention

An electronic device including an antenna according to various embodiments of the disclosure may improve antenna radiation performance or coverage while reducing electromagnetic influences with peripheral components.

Various other advantageous effects obtainable or predictable from various embodiments of the disclosure will be explicitly or implicitly provided in the detailed description of the disclosure.

BRIEF DESCRIPTION OF DRAWINGS

FIG. 17A is a diagram illustrating a radiation pattern for a first antenna element according to a shape of a conductive area corresponding to the first antenna element of an antenna structure for a selection of example conductive patterns, according to an embodiment.

FIG. 17B is a first example conductive area for the radiation pattern of FIG. 17A.

FIG. 17C is a second example conductive area for the radiation pattern of FIG. 17A.

FIG. 17D is a third example conductive area for the radiation pattern of FIG. 17A.

FIG. 17E is a fourth example conductive area for the radiation pattern of FIG. 17A.

FIG. 19 is a diagram illustrating a state in which a third support structure and an antenna structure are coupled, according to various embodiments.

MODE FOR THE INVENTION

Hereinafter, various embodiments disclosed herein will be described with reference to the accompanying drawings.

Figure 1:
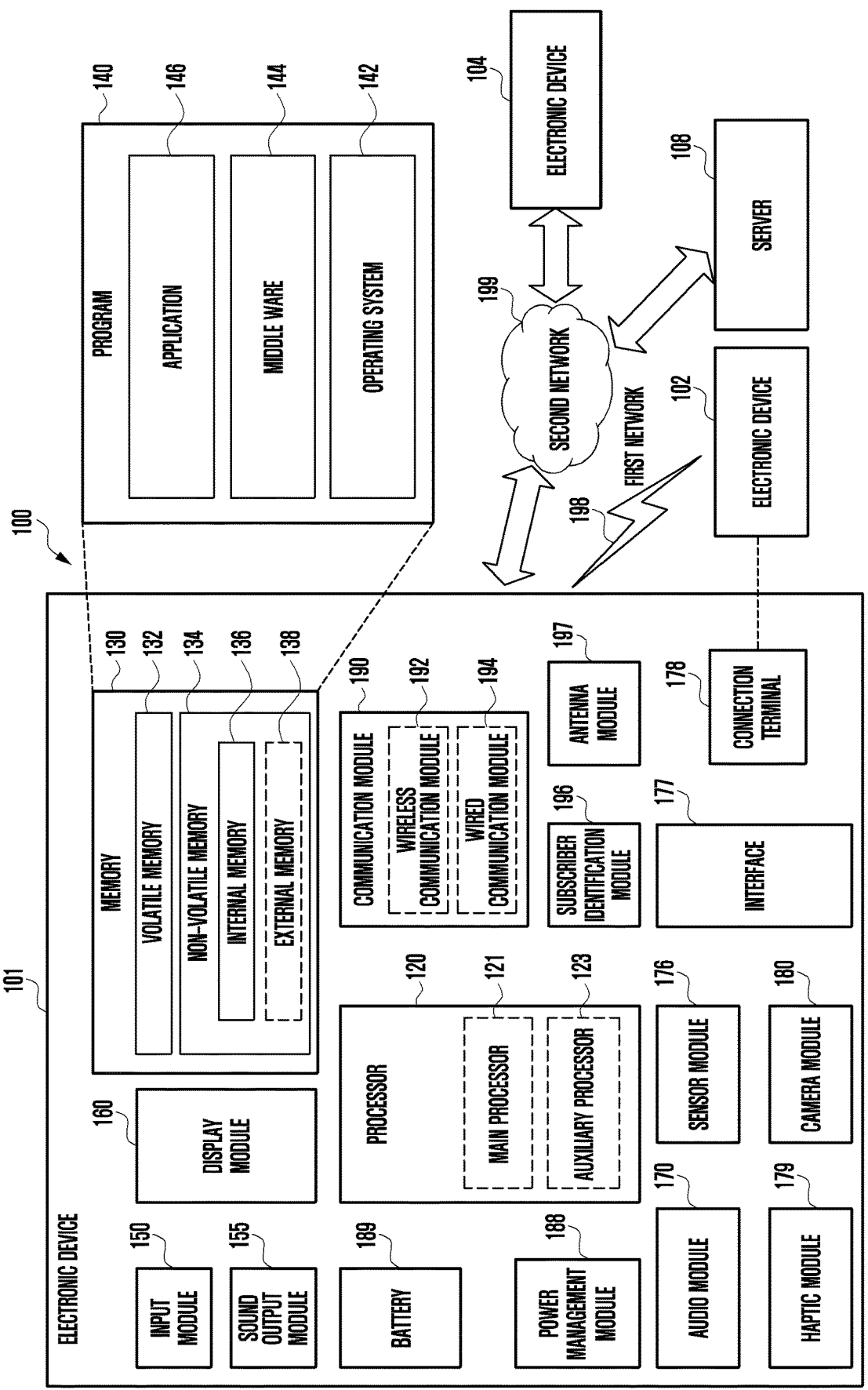
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 2A is a front side view schematic illustrating an electronic device 2 in a flat or an unfolded state, or an unfolding state according to an embodiment. FIG. 2B is a right side view of the electronic device 2 of FIG. 2A. FIG. 2C is a left side view of the electronic device 2 of FIG. 2A. FIG. 2D is a bottom side view of the electronic device 2 of FIG. 2A. FIG. 2E is a top side view of the electronic device 2 of FIG. 2A. FIG. 2F is a rear side view of the electronic device 2 of FIG. 2A.

FIG. 3A is a first front view schematic illustrating an electronic device 2 in a folded state or a folding state according to an embodiment. FIG. 3B is a right side view of the electronic device 2 of FIG. 3A. FIG. 3C is a left side view of the electronic device 2 of FIG. 3A. FIG. 3D is a bottom side view of the electronic device 2 of FIG. 3A. FIG. 3E is a top side view of the electronic device 2 of FIG. 3A. FIG. 3F is a second front view of the electronic device 2 of FIG. 3A.

Figure 2:
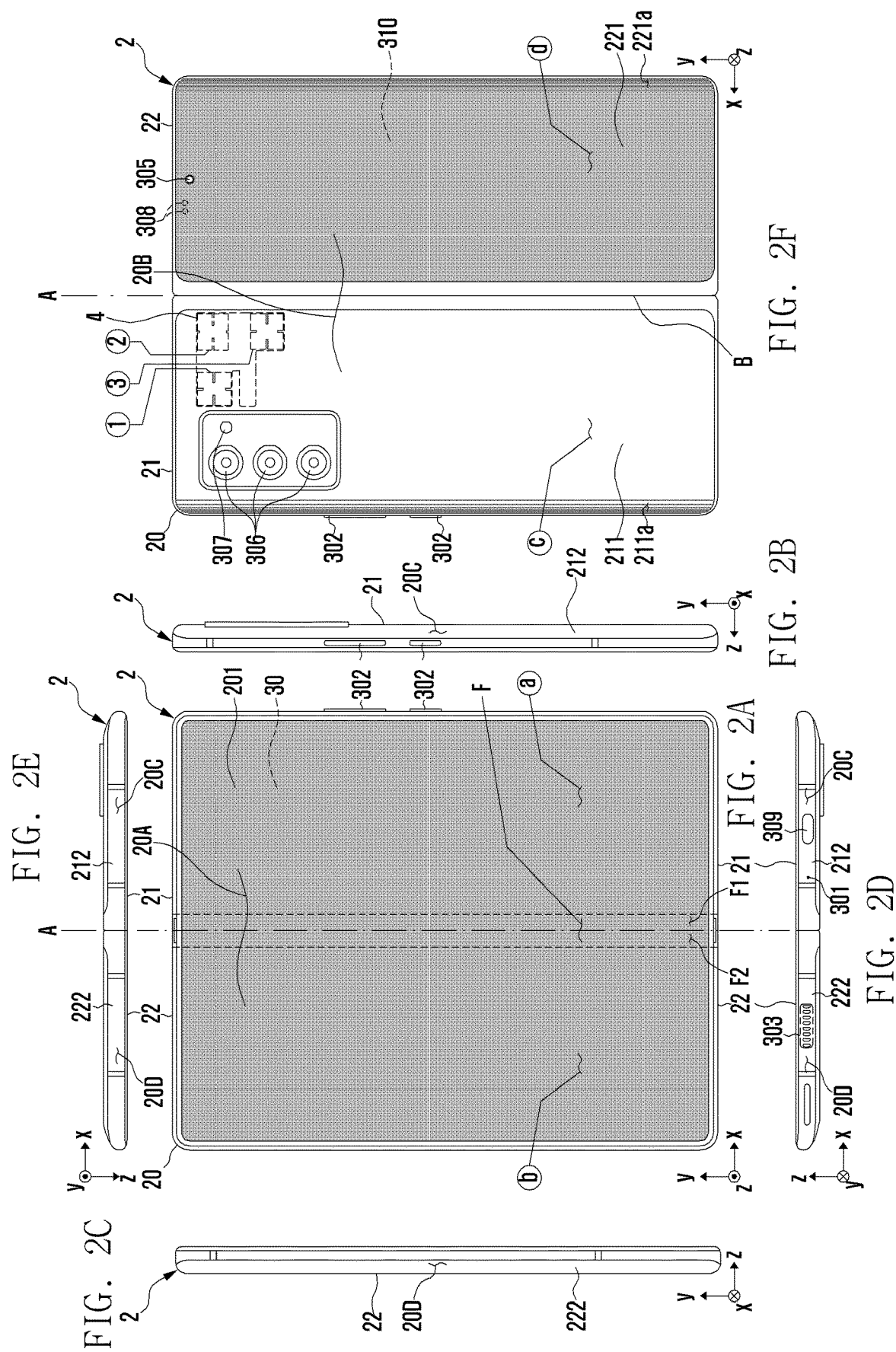
FIG. 2A is a front side view schematic illustrating an electronic device in an unfolded state according to an embodiment.
FIG. 2B is a right side view of the electronic device of FIG. 2A.
FIG. 2C is a left side view of the electronic device of FIG. 2A.
FIG. 2D is a bottom side view of the electronic device of FIG. 2A.
FIG. 2E is a top side view of the electronic device of FIG. 2A.
FIG. 2F is a rear side view of the electronic device of FIG. 2A.
Figure 3:
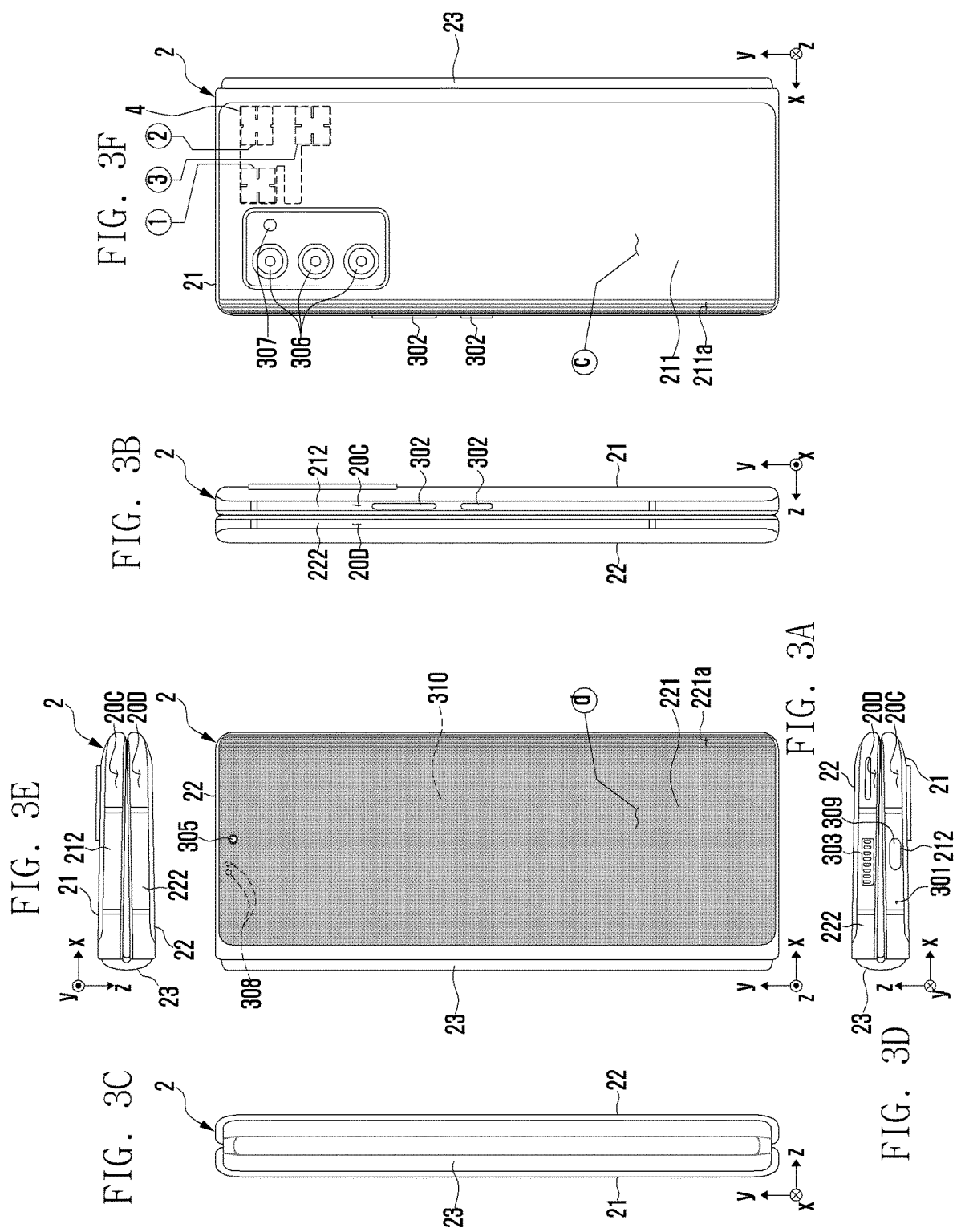
FIG. 3A is a first front view schematic illustrating an electronic device in a folded state according to an embodiment.
FIG. 3B is a right side view of the electronic device of FIG. 3A.
FIG. 3C is a left side view of the electronic device of FIG. 3A.
FIG. 3D is a bottom side view of the electronic device of FIG. 3A.
FIG. 3E is a top side view of the electronic device of FIG. 3A.
FIG. 3F is a second front view of the electronic device of FIG. 3A.

Referring to FIGS. 2A and 3A, in an embodiment, the electronic device 2 may include a foldable housing 20 and a flexible display 30. The foldable housing 20 may include a front surface 20A of the electronic device 2 and a rear surface 20B of the electronic device 2 located opposite to the front surface 20A. For better understanding, the front surface 20A of the electronic device 2 is interpreted as a surface on which the flexible display 30 is exposed, and the rear surface 20B of the electronic device 2 is interpreted as a surface located opposite to the front surface 20A. The foldable housing 20 may include a first side surface 20C and a second side surface 20D of the electronic device 2 that at least partially surround the space between the front surface 20A and the rear surface 20B. The front surface 20A may include a first cover area ⓐ, a second cover area ⓑ, and a folding cover area F between the first cover area ⓐ and the second cover area ⓑ. In the unfolded state of the foldable housing 20, the front surface 20A may be substantially planar, and the first cover area ⓐ, the second cover area ⓑ, and the folding cover area F may face in substantially the same direction. The rear surface 20B may include a third cover area ⓒ and a fourth cover area ⓓ. The third cover area ⓒ is located on the opposite side to the first cover area ⓐ of the front surface 20A, and may face in the opposite direction to the first cover area ⓐ. The fourth cover area ⓓ is located on the opposite side to the second cover area ⓑ of the front surface 20A, and may face in the opposite direction to the second cover area ⓑ. In an embodiment, the foldable housing 20 may be implemented in an in-folding structure in which the front surface 20A is folded inward. For example, in the unfolded state of the foldable housing 20 (refer to FIG. 2A), the folding cover area F may be disposed in a planar shape, and the first cover area ⓐ and the second cover area ⓑ may form an angle of about 180 degrees. In the folded state of the foldable housing 20 (refer to FIG. 3A), the folding cover area F may be disposed in a curved shape, and the first cover area ⓐ and the second cover area ⓑ may form an angle different from the angle of about 180 degrees. The folded state may include a fully folded state or an intermediate state. The fully folded state (see FIG. 3) is a fully folded state in which the first cover area (a) and the second cover area (b) of the front surface 20A are no longer close, and, for example, the first cover area (a) and the second cover area (b) may form an angle of about 0 degrees to about 10 degrees. In the fully folded state, the front surface 20A may not be substantially exposed to the outside. The intermediate state may refer to a state between the unfolded state and the fully folded state. The folding cover area F of the front surface 20A may be more bent in the fully folded state than in the intermediate state. In some embodiments, the electronic device 2 may be implemented in an out-folding structure in which the front surface 20A (or screen) is folded outward.

According to an embodiment, the foldable housing 20 may include a front cover (e.g., a window) 201 that provides at least a part of the front surface 20A. The flexible display 30 may at least partially overlap the front cover 201 and be located in the internal space of the electronic device 2. The front cover 201 may protect the flexible display 30 from the outside and may be substantially transparent. Light output from the flexible display 30 may pass through the front cover 201 and proceed to the outside.

The flexible display 30 may include, for example, a first display area (or first active area) overlapping the first cover area (a) of the front surface 20A, a second display area (or second active area) overlapping the second cover area (b) of the front surface 20A, and a third display area (or a third active area) overlapping the folding cover area F. In some embodiments, the third display area may be referred to by various other terms such as a 'folding display area' or a 'bendable display area'. The screen may refer to an area capable of expressing an image in a device including the flexible display 30 and the front cover 201, and for example, the screen may include a display area of the flexible display 30 and an area of the front cover 201 overlapping therewith.

In some embodiments, the front cover 201 may be provided integrally with the flexible display 30 as a component included in the flexible display 30. The front cover 201 may be implemented in the form of a thin membrane such as a film to have flexibility. The front cover 201 may include, for example, a plastic film (e.g., polyimide film) or thin glass (e.g., ultra-thin glass (UTG)). In some embodiments, the front cover 201 may include multiple layers. For example, the front cover 201 may have a form in which a coating layer or a protective layer of various polymer materials (e.g., polyester (PET), polyimide (PI), or thermoplastic polyurethane (TPU)) is disposed on a plastic film or thin glass.

According to an embodiment, the foldable housing 20 may include a first housing (or a first housing part or a first housing structure) 21, a second housing (or second housing part or second housing structure) 22, and a folding part between the first housing 21 and the second housing 22. Coordinate axes illustrated for better understanding are based on the first housing 21, and for example, the first cover area (a) may be substantially oriented in the +z axis direction and the third cover area (c) may be substantially oriented in the −z axis direction. The first housing 21 and the second housing 22 may be connected by the folding part, and may be mutually rotatable based on a folding axis A of the foldable housing 20. The folding part may include, for example, a hinge assembly (or a hinge structure) (not illustrated). The folding axis A may be a rotation axis of the hinge assembly. In the illustrated example, the folding axis A may be parallel to the y-axis direction.

The first housing 21 may include a first cover part of the front cover 201 located on one side with respect to the folding axis A, a first rear cover 211 providing at least a part of the third cover area (c) of the rear surface 20B, and a first side member (or a first side bezel structure) 212 that at least partially surrounds a space between the first cover part and the first rear cover 211 and provides a first side surface 20C. The first cover part of the front cover 201 may provide, for example, the first cover area (a) and a first folding cover area F1 located on one side of the folding cover area F with respect to the folding axis A.

The second housing 22 may include a second cover part of the front cover 201 located on one side with respect to the folding axis A, a second rear cover 221 providing at least a part of the fourth cover area (d) of the rear surface 20B, and a second side member (or a side bezel structure) 222 that at least partially surrounds a space between the second cover part and the second rear cover 221 and provides a second side surface 20D. The second cover part of the front cover 201 may provide, for example, the second cover area (b) and a second folding cover area F2 located on another side of the folding cover area F with respect to the folding axis A.

In the fully folded state of the foldable housing 20, the first side member 212 and the second side member 222 may be aligned at least partially overlapping each other. The first side member 212 and/or the second side member 222 may be formed by, for example, a ceramic, a polymer, a metal (e.g., aluminum, stainless steel, or magnesium), or a combination of at least two of the materials. The first side member 212 and/or the second side member 222 may include various metal materials, for example, such as titanium, an amorphous alloy, a metal-ceramic composite material (e.g., cermet), stainless steel, magnesium, magnesium alloy, aluminum, an aluminum alloy, a zinc alloy, or a copper alloy. The first rear cover 211 and/or the second rear cover 221 may be substantially opaque. The first rear cover 211 and/or the second rear cover 221 may be formed by, for example, a coated or colored glass, a ceramic, a polymer, a metal (e.g., aluminum, stainless steel, or magnesium), or a combination of at least two of the materials. The first rear cover 211 or the second rear cover 221 may include, for example, a plate of various materials such as transparent glass, ceramic, or polymer and at least one coating layer disposed on the plate by using a coating. For another example, the first rear cover 211 or the second rear cover 221 may include a plate of various materials such as transparent glass, ceramic, or polymer, and a film (e.g., a decoration film) having various visual effects attached to the plate. In some embodiments, the first rear cover 211 and the first side member 212 may be integrally formed and may include the same material. In some embodiments, the second rear cover 221 and the second side member 222 may be integrally formed and may include the same material.

According to an embodiment, the folding part may include a hinge housing 23. The hinge housing 23 may cover at least one hinge connecting the first housing 21 and the second housing 22. In some embodiments, the hinge housing 23 may be referred to as a 'hinge cover'. When the electronic device 2 is switched from the unfolded state of FIG. 2 to the folded state of FIG. 3, the hinge housing 23 may cover the inside of the electronic device 2 from being exposed while the gap B between the first housing 21 and the second housing 22 is opened. As illustrated in FIG. 2, in the unfolded state of the electronic device 2, the gap B may be substantially absent, and the hinge housing 23 may not be exposed to the outside by being covered by the first housing 21 and the second housing 22. Although not illustrated, in an intermediate state of the electronic device 2, the hinge housing 23 may be partially exposed between the first housing 21 and the second housing 22. The hinge housing 23 may be more exposed in the folded state of FIG. 3 than in the intermediate state.

According to various embodiments, the foldable housing 20 may refer to a structure (e.g., a foldable housing structure or a foldable housing assembly) providing at least a part of the front surface 20A, the rear surface 20B, the first side surface 20C, and the second side surface 20D. For example, the foldable housing 20 may include a first housing part, a second housing part, and a folding part connected to the first housing part and the second housing part. The folding part may refer to a more flexible part than the first housing part and the second housing part, and may be bent in the folded state of the electronic device 2. The folding part may include, for example, a hinge assembly. For another example, the folding part may include a structure in which a plurality of bars are arranged (e.g., a multi-bar structure), but is not limited thereto, and may be implemented in various other structures that may have bending characteristics while connecting the first housing part and the second housing part.

According to an embodiment, the electronic device 2 may include a display (hereinafter, a sub-display) 310 located inside the first housing 21 adjacent to the first rear cover 211. A part of the first rear cover 211 may overlap the sub-display 310 and may be substantially transparent. The electronic device 2 may output an image by using the sub-display 310 instead of the flexible display 30 in the folded state of FIG. 3.

According to an embodiment, the second rear cover 221 may include a second curved area 221a that is bent from the fourth cover area ⓓ toward the second cover area ⓑ and extends seamlessly. The second curved area 221a may be provided adjacent to a long edge of the second rear cover 221 that is substantially parallel to the folding axis A. The sub-display 310 may include a flexible display that may be disposed in a shape corresponding thereto.

According to an embodiment, the first rear cover 211 may include a first curved area 211a that is bent from the third cover area ⓓ toward the first cover area ⓐ and extends seamlessly. The first curved area 211a may be provided adjacent to a long edge of the first rear cover 211 that is substantially parallel to the folding axis A. For example, in the unfolded state (refer to FIG. 2A) or the folded state (refer to FIG. 3A) of the electronic device 2, for aesthetic reasons, the first curved area 211a and the second curved area 221a may be substantially symmetrically located on opposite sides of each other. In some embodiments, the first curved area 211a or the second curved area 221a may be omitted.

According to an embodiment, the electronic device 2 may include an input module, a sound output module, a camera module, a sensor module, or a connection terminal. In some embodiments, the electronic device 2 may omit at least one of the components or additionally include other components. The position or number of components included in the electronic device 2 is not limited to the illustrated example and may vary.

The input module may include, for example, a microphone located inside the electronic device 2, and a microphone hole 301 provided on the first side surface 20C corresponding to the microphone. The position or number of the input module including the microphone and the corresponding microphone hole 301 is not limited to the illustrated example and may vary. In some embodiments, the electronic device 2 may include a plurality of microphones capable of detecting the direction of sound.

The input module may include, for example, key input devices 302. The key input devices 302 may be located, for example, in an opening (not illustrated) provided on the first side surface 20C. In some embodiments, the electronic device 2 may not include some or all of the key input devices 302, and the non-included key input device may be implemented as a soft key by using the flexible display 30 or the sub-display 310. In some embodiments, the input module may include at least one sensor module.

The sound output module may include, for example, a speaker located inside the electronic device 2, and a speaker hole 303 provided on the second side surface 20D corresponding to the speaker. The position or number of the sound output module including the speaker and the speaker hole 303 corresponding thereto is not limited to the illustrated example and may vary. In some embodiments, the microphone hole 301 and the speaker hole 303 may be implemented as one hole. In some embodiments, a piezo speaker in which the speaker hole 303 is omitted may be implemented. The sound output module may include, for example, a receiver for a call located inside the electronic device 2, and a receiver hole (not illustrated) provided in the fourth cover area ⓓ to correspond to the receiver for a call.

The camera module, for example, may include a first camera module 305 (or a front camera module) located to correspond to the fourth cover area ⓓ or a plurality of second camera modules 306 (or rear camera modules) located to correspond to the third cover area ⓒ. The first camera module 305 and/or the plurality of second camera modules 306 may include one or a plurality of lenses, an image sensor, and/or an image signal processor. The position or number of the first camera module 305 or the plurality of second camera modules 306 is not limited to the illustrated example and may vary.

According to an embodiment, the sub-display 310 may include an opening aligned with the first camera module 305. External light may pass through openings of the second rear cover 221 and the sub-display 310 to reach the first camera module 305. In some embodiments, the opening of the sub-display 310 may be provided in the form of a notch according to the position of the first camera module 305. In some embodiments, the first camera module 305 may be located on the rear side of the sub-display 310, or below or beneath the sub-display 310, and may perform related functions (e.g., image photographing) without visually distinguishing (or exposing) the position of the first camera module 305. For example, the first camera module 305 may include a hidden display rear camera (e.g., an under display camera (UDC). In some embodiments, the first camera module 305 may be located aligned with a recess provided on the rear surface of the sub-display 310. The first camera module 305 may be disposed to overlap at least a part of the screen to obtain an image of an external subject without being visually exposed to the outside. In this case, at least a partial area of the sub-display 310 overlapping the first camera module 305 may include a pixel structure and/or a wiring structure different from those of other areas. For example, a partial area of the sub-display 310 overlapping the first camera module 305 may have a different pixel density compared to other areas. A pixel structure and/or a wiring structure provided in a partial area of the sub-display 310 that is at least partially overlapping the first camera module 305 may reduce light loss between the outside and the first camera module 305. In some embodiments, pixels may not be disposed in a partial area of the sub-display 310 that is at least partially overlapping the first camera module 305.

According to an embodiment, a plurality of second camera modules 306 may have different properties (e.g., angle of view) or functions, and may include, for example, a dual camera or a triple camera. The plurality of second camera modules 306 may include a plurality of camera modules including lenses having different angles of view and the electronic device 2 may control to change the angle of view of the camera module performed by the electronic device 2 based on the user's selection. The plurality of second camera modules 306 may include at least one of a wide-angle camera, a telephoto camera, a color camera, a monochrome camera, or an infrared (IR) camera (e.g., time of flight (TOF) camera, structured light camera). In some embodiments, the IR camera may be operated as at least part of a sensor module. The electronic device 2 may include a flash 307 as a light source for the plurality of second camera modules 306. The flash 307 may include, for example, a light emitting diode or a xenon lamp.

The sensor module may generate an electrical signal or data value corresponding to an internal operating state of the electronic device 2 or an external environmental state. The sensor module may include, for example, a proximity sensor, a gesture sensor, a gyro sensor, a barometric pressure sensor, a magnetic sensor, an acceleration sensor, a grip sensor, a color sensor, an infrared (IR) sensor, a biometric sensor (e.g., a fingerprint sensor, an HRM sensor), a temperature sensor, a humidity sensor, and an illuminance sensor.

According to an embodiment, the sensor module may include an optical sensor 308 located inside the electronic device 2 corresponding to the fourth cover area ⓓ. The optical sensor 308 may include, for example, a proximity sensor or an illuminance sensor. The optical sensor 308 may be aligned with an opening provided in the sub-display 310. External light may pass through the opening of the second rear cover 221 and sub-display 310 to reach the optical sensor 308. In some embodiments, the optical sensor 308 may be located on the rear surface of the sub-display 310 or below or beneath the sub-display 310, and may perform a related function without visually distinguishing (or exposing) the location of the optical sensor 308. In some embodiments, the optical sensor 308 may be located aligned with a recess provided on the rear surface of the sub-display 310. The optical sensor 308 may be disposed to overlap at least a part of the screen, and may perform a sensing function without being exposed to the outside. In this case, a partial area of the sub-display 310 that at least partially overlaps the optical sensor 308 may include different pixel structures and/or wiring structures compared to other areas. For example, a partial area of the sub-display 310 that at least partially overlaps the optical sensor 308 may have different pixel densities compared to other areas. In some embodiments, the sensor module may include a fingerprint sensor (not illustrated) located below the sub-display 310. The fingerprint sensor may be implemented using a capacitive method, an optical method, or an ultrasonic method. A pixel structure and/or a wiring structure provided in a partial area of the sub-display 310 that at least partially overlaps the sensor module may reduce the loss when various types of signals (e.g., light or ultrasonic) related to the sensor module pass between the outside and the sensor module. In some embodiments, a plurality of pixels may not be disposed in a partial area of the sub-display 310 that at least partially overlaps the sensor module.

The connection terminal may include, for example, a connector (e.g., a USB connector) located inside the electronic device 2. The electronic device 2 may include a connector hole 309 provided on the first side surface 20C corresponding to the connector. The electronic device 2 may transmit and/or receive power and/or data to and/or from an external electronic device electrically connected to the connector through the connector hole 309. The position or number of the connector and the connector hole 309 corresponding thereto is not limited to the illustrated example and may vary.

According to various embodiments, the electronic device 2 may include a detachable pen input device (e.g., an electronic pen, a digital pen, or a stylus pen) (not illustrated). For example, the pen input device may be detachably attached to the hinge housing 23. The hinge housing 23 may include a recess, and the pen input device may fit into the recess. The pen input device may be detachably attached to, for example, a recess of the hinge housing 23 exposed to the outside in a folded state (refer to FIG. 3A) or an intermediate state of the electronic device 2. In some embodiments, the electronic device 2 may be implemented such that the pen input device may be inserted into the inner space of the first housing 21 or the second housing 22.

According to an embodiment, the electronic device 2 may include an antenna structure 4 located inside the first housing 21. For example, the electronic device 2 may use the antenna structure 4 to perform a positioning function (e.g., angle of arrival (AOA) for a signal source (e.g., a responder, a transmitter, or a Tx device). The electronic device 2 may include a wireless communication circuit (e.g., the wireless communication module 192 of FIG. 1) electrically connected to the antenna structure 4 and a processor (e.g., the processor 120 in FIG. 1) electrically connected to the wireless communication circuit. The processor may perform positioning (AOA) measuring an angle and ranging measuring a distance. In an embodiment, the processor may identify (or estimate) the distance between the electronic device 2 and the signal source by using a first antenna element ①, a second antenna element ②, or a third antenna element ③. In an embodiment, the processor may identify (or estimate) a reception angle (e.g., a direction of a signal) of a signal with respect to a set axis of the electronic device 2 through at least two antenna elements (e.g., the first antenna element ① and the second antenna element ②, or the first antenna element ① and the third antenna element ③) of the antenna structure 4 by using at least one of a difference in arrival time of a response message to a request message, a difference in arrival distance between received signals, or a phase difference. The electronic device 2 may support a positioning function by using a broadband bandwidth (e.g., ultra-wide band (UWB)). UWB is, for example, a technology that conforms to the international standard of IEEE 802.15.4, and may refer to a technology for communicating with a wide bandwidth. In an embodiment, the electronic device 2 (e.g., an initiator, a receiver, or a receiver (Rx) device) may identify or estimate a position of a signal source (e.g., a responder, a transmitter, or a transmitter (Tx) device) by using a phase difference between signals received through a plurality of antenna elements (e.g., the first antenna element ①, the second antenna element ②, and the third antenna element ③) included in the antenna structure 4. The antenna structure 4 may be implemented as a printed circuit board (e.g., a flexible printed circuit board (FPCB)), and may be, for example, a patch antenna including a plurality of patches (e.g., the first antenna element ①, the second antenna element ②, and the third antenna element ③).

The electronic device 2 may further include various components according to the provision form thereof.

Although all of these components may not be listed due to variations according to a convergence trend of the electronic device 2, a component having a level equivalent to that of the above-mentioned components may be further included in the electronic device 2. In various embodiments, certain components may be excluded from the above components or replaced with other components according to the form of provision.

According to various embodiments, the electronic device 2 including the antenna structure 4 has a foldable type appearance, but is not limited thereto. For example, the electronic device 2 including the antenna structure 4 may be implemented as a bar type or plate type electronic device, a slidable electronic device, a stretchable electronic device, and/or a rollable electronic device.

Figure 4:
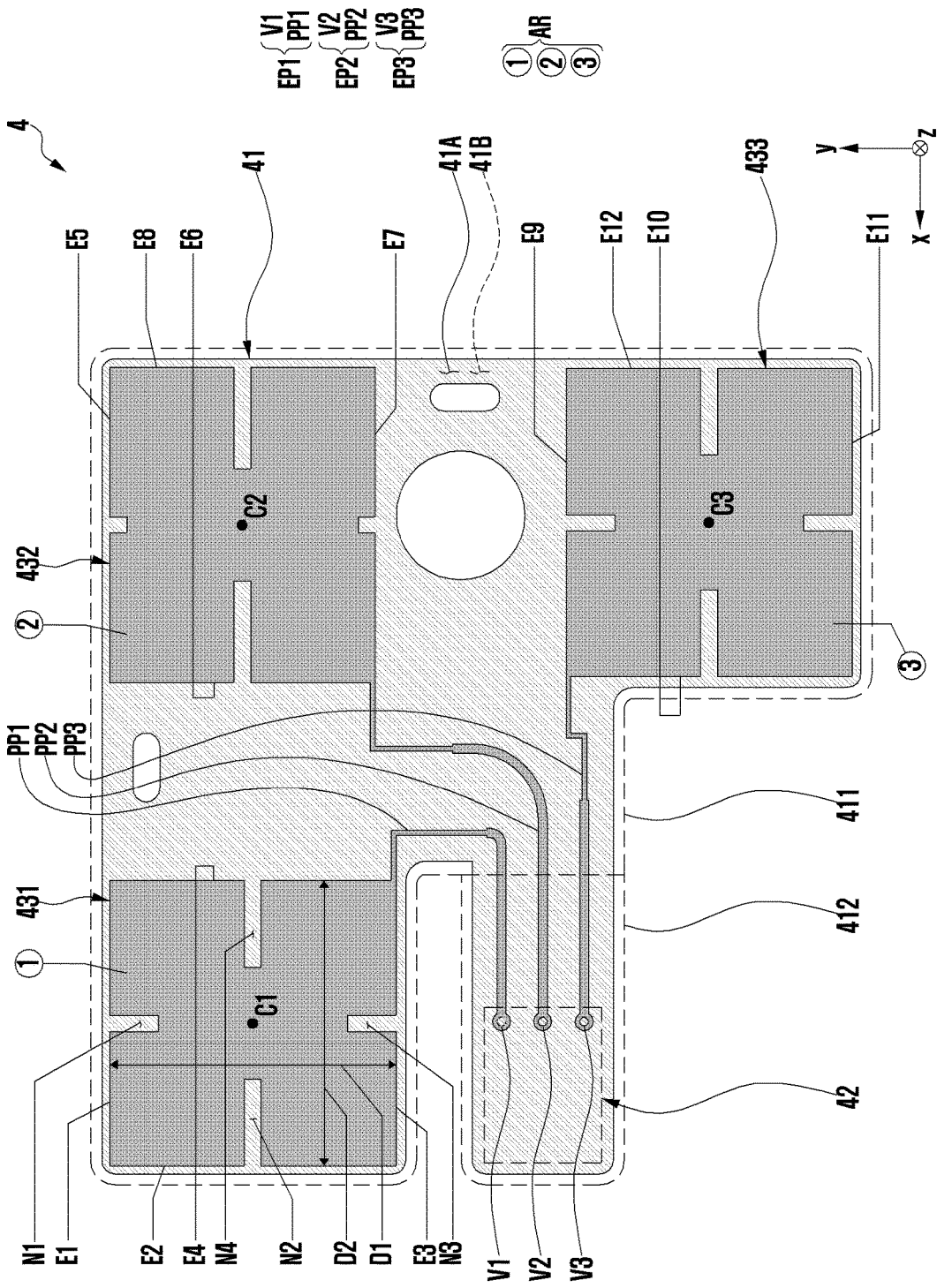
FIG. 4 is a diagram illustrating an antenna structure when viewed from above a third cover area of an electronic device according to an embodiment.

FIG. 4 is a diagram illustrating an antenna structure 4 when viewed from above (e.g., in the +z-axis direction) of a third cover area ⓒ (refer to FIG. 2F) of an electronic device 2 according to an embodiment.

Referring to FIG. 4, in an embodiment, the antenna structure 4 may include a printed circuit board 41 and a connector 42. In the printed circuit board 41, for example, a plurality of conductive layers including at least one conductive pattern are stacked, and a dielectric (or an insulator) may be located between the plurality of conductive layers. At least a part of the printed circuit board 41 may be implemented by using, for example, a flexible copper clad laminate (FCCL). The flexible copper clad laminate is a laminate used for the printed circuit board 41, and may include a structure in which copper foil is attached to one or both surfaces of a flexible insulating film (or dielectric film) by using an adhesive material (e.g., acrylic adhesive). The flexible insulating film may include, for example, various non-conductive materials such as a polyimide film or a polyester film. The flexible insulating film may include, for example, pre-impregnated materials (PREPREG) (e.g., an insulating resin layer).

One or more conductive patterns included in the plurality of conductive layers may be utilized as an antenna radiator. One or more conductive patterns included in the plurality of conductive layers may be utilized as an electrical path (e.g., a signal line). One or more conductive patterns included in the plurality of conductive layers may be utilized as a ground plane. A conductive pattern used as an antenna radiator may be referred to as an 'antenna element' or a 'radiation pattern'. A conductive pattern utilized as at least a part of an electrical path may be referred to as a 'path pattern'. A conductive pattern utilized as at least a part of the ground plane may be referred to as a 'ground pattern'.

The printed circuit board 41 may include a plurality of conductive vias. The conductive via may be a conductive hole drilled through the printed circuit board 41. In some embodiments, connection leads for electrically connecting conductive patterns of different conductive layers may be disposed on the conductive via. The conductive via may include, for example, a plated through hole (PTH), a laser via hole (LVH), a buried via hole (BVH), or a stacked via.

The printed circuit board 41 may include a first surface 41A and a second surface 41B located opposite to the first surface 41A. The first surface 41A may substantially face the third cover area ⓒ (or the first rear cover 211) (refer to FIG. 2F or FIG. 3F). The second surface 41B may substantially face the first cover area ⓐ (refer to FIG. 2A).

According to an embodiment, the connector 42 may be disposed on the second surface 41B. In an embodiment, the printed circuit board 41 may include a first part 411 (in some embodiments, a rigid first part) including a plurality of antenna elements ①, ②, and ③, and a second part 412 (in some embodiments, a flexible second part 412) extended from the first part 411 and electrically connected to the first substrate assembly located in the interior space of the first housing 21 (refer to FIG. 2A). The connector 42 may be disposed on the second part 412. In some embodiments, a flexible member (not separately illustrated), such as a sponge, may be located between the first rear cover 211 (refer to FIG. 2F or FIG. 3F) and the connector 42. The flexible member may resiliently press the connector 42 toward the first substrate assembly between the connector 42 and the first rear cover 211 so that the connector 42 is not separated from the first substrate assembly.

According to an embodiment, the first part 411 and the second part 412 of the printed circuit board 41 may be substantially flexible. For example, the printed circuit board 41 may include a flexible printed circuit board (FPCB).

According to various embodiments, the second part 412 of the printed circuit board 41 may have greater flexibility than the first part 411 of the printed circuit board 41. Compared to the first part 411, the second part 412 may have a bending characteristic (e.g., flexibility) such that the second party 412 may be bent without breakage while reducing stress generation under the same condition. In an embodiment, the first part 411 and the second part 412 may be substantially flexible, and the second part 412 may have greater flexibility than the first part 411. For example, the second part 412 may have a smaller thickness or a smaller number of stacked layers than the first part 411, and thus may be implemented to be more flexible than the first part 411. For another example, the second part 412 may include a material different from that of the first part 411 to be implemented more rigidly than the first part 411. In some embodiments, the second part 412 may be a substantially flexible part (or flexible section) of the printed circuit board 41, and the first part 411 may be substantially rigid parts (or rigid sections) of the printed circuit board 41. The printed circuit board 41 including a flexible part, a rigid part, or parts having different flexibility may be provided by using other various structures. For example, the printed circuit board 41 may be provided as a rigid flexible printed circuit board (RFPCB) including a rigid first part 411 and a flexible second part 412. In some embodiments, the first part 411 may be provided as a rigid printed circuit board (RPCB), and the second part 412 may be provided as an FPCB to be connected to the first part 411.

According to an embodiment, the printed circuit board 41 may include the first antenna element ①, the second antenna element ②, the third antenna element ③, a first path pattern PP1, a second path pattern PP2, a third path pattern PP3, a first conductive via V1, a second conductive via V2, and/or a third conductive via V3. In an embodiment, the first conductive via V1, the second conductive via V2, and the third conductive via V3 may be located in the second part 412 of the printed circuit board 41. The first path pattern (or the first signal line pattern) PP1 may electrically connect the first antenna element ① and the first conductive via V1. The first path pattern PP1 may be electrically connected to the connector 42 through the first conductive via V1. The second path pattern (or the second signal line pattern) PP2 may electrically connect the second antenna element ② and the second conductive via V2. The second path pattern PP2 may be electrically connected to the connector 42 through the second conductive via V2. The third path pattern (or the third signal line pattern) PP3 may electrically connect the third antenna element ③ and the third conductive via V3.

The third path pattern PP3 may be electrically connected to the connector 42 through the third conductive via V3.

The first electrical path EP1 including the first path pattern PP1 and the first conductive via V1 may form a first signal line connecting the first antenna element ① and the connector 42. The second electrical path EP2 including the second path pattern PP2 and the second conductive via V2 may form a second signal line connecting the second antenna element ② and the connector 42. The third electrical path EP3 including the third path pattern PP3 and the third conductive via V3 may form a third signal line connecting the third antenna element ③ and the connector 42.

The wireless communication circuit (e.g., the wireless communication module 192 of FIG. 1) included in the first substrate assembly located in the inner space of the first housing 21 (refer to FIG. 2A) may provide a radiation current (or electromagnetic signal) (e.g., a UWB signal) to the first antenna element ① through the first electrical path EP1, and the first antenna element ① may radiate electromagnetic waves. The first antenna element ① may radiate an electromagnetic signal fed to the first electrical path EP1 (e.g., a first feeding line) to the outside or receive an electromagnetic signal from the outside. The wireless communication circuit (e.g., the wireless communication module 192 of FIG. 1) may provide a radiation current (or electromagnetic signal) (e.g., a UWB signal) to the second antenna element ② through the second electrical path EP2, and the second antenna element ② may radiate electromagnetic waves. The second antenna element ② may radiate an electromagnetic signal fed to the second electrical path EP2 (e.g., a second feeding line) to the outside or receive an electromagnetic signal from the outside. The wireless communication circuit (e.g., the wireless communication module 192 of FIG. 1) may provide a radiation current (or electromagnetic signal) (e.g., a UWB signal) to the third antenna element ③ through the third electrical path EP3, and the third antenna element ③ may radiate electromagnetic waves. The third antenna element ③ may radiate an electromagnetic signal fed to the third electrical path EP3 (e.g., a third feeding line) to the outside or receive an electromagnetic signal from the outside. In some embodiments, the first path pattern PP1 may be referred to as a 'first feeding pattern', the second path pattern PP2 may be referred to as a 'second feeding pattern', and the third path pattern PP3 may be referred to as a 'third feeding pattern'.

In an embodiment, the antenna element (e.g., the first antenna element ①, the second antenna element ②, or the third antenna element ③) may be connected to a communication circuit (e.g., the processor 120 or a communication processor of FIG. 1) through a respective feeding pattern (e.g., the first path pattern PP1, the second path pattern PP2, and the third path pattern PP3), thereby securing frequency resonance characteristics. In an embodiment, the first feeding pattern, the second feeding pattern, and the third feeding pattern are spaced apart from each other, so that isolation between the feeding patterns may be secured.

According to an embodiment, the first antenna element ① and the first electrical path EP1 can collectively be referred to as a first antenna 431. The second antenna element ② and the second electrical path EP2 can collectively be referred to as a second antenna 432. The third antenna element ③ and the third electrical path EP3 can collectively be referred to as a third antenna 433. The first electrical path EP1 may be referred to as a first feeding part (e.g., a first feeding line) that provides an electromagnetic signal (or radiation current) to the first antenna element ①, and the first antenna element ① may be referred to as a first radiation part (or a first radiator or a first antenna radiator) that radiates a fed electromagnetic signal to the outside or receives an electromagnetic signal from the outside. The second electrical path EP2 may be referred to as a second feeding part (e.g., a second feeding line) that provides an electromagnetic signal (or radiation current) to the second antenna element ②, and the second antenna element ② may be referred to as a second radiation part (or a second radiator or a second antenna radiator) that radiates a fed electromagnetic signal to the outside or receives an electromagnetic signal from the outside. The third electrical path EP3 may be referred to as a third feeding part (e.g., a third feeding line) that provides an electromagnetic signal (or radiation current) to the third antenna element ③, and the third antenna element ③ may be referred to as a third radiation part (or a third radiator or a third antenna radiator) that radiates a fed electromagnetic signal to the outside or receives an electromagnetic signal from the outside.

According to an embodiment, the first antenna element ①, the second antenna element ②, and the third antenna element ③ may be included in a first conductive layer (not illustrated) among a plurality of conductive layers included in the printed circuit board 41. The first conductive layer may be located closer to the first surface 41A than the second surface 41B of the printed circuit board 41. In an embodiment, the first path pattern PP1, the second path pattern PP2, and the third path pattern PP3 may be included in the first conductive layer. The first path pattern PP1 may, for example, extend from the edge of the first antenna element ① when viewed from above the first surface 41A (e.g., when viewed in the +z-axis direction). The second path pattern PP2 may, for example, extend from the edge of the second antenna element ② when viewed from above the first surface 41A. The third path pattern PP3 may, for example, extend from the edge of the third antenna element ③ when viewed from above the first surface 41A. The second path pattern PP2 may extend from the second antenna element ② between the first path pattern PP1 and the third path pattern PP3 to be electrically connected to the second conductive via V2 when viewed from above the first surface 41A.

According to various embodiments (not illustrated), in a case where the first path pattern PP1 is included in a conductive layer different from the first antenna element ①, the first electrical path EP1 may include a conductive via electrically connecting the first path pattern PP1 and the first antenna element ①. In some embodiments, in a case where the second path pattern PP2 is included in a conductive layer different from the second antenna element ②, the second electrical path EP2 may include a conductive via electrically connecting the second path pattern PP2 and the second antenna element ②. In some embodiments, in a case where the third path pattern PP3 is included in a conductive layer different from the third antenna element ③, the third electrical path EP3 may include a conductive via electrically connecting the third path pattern PP3 and the third antenna element ③. In some embodiments, any two (or all three) of the first path pattern PP1, the second path pattern PP2, and the third path pattern PP3 may be included in the same conductive layer or may be included in different conductive layers, respectively.

According to various embodiments (not illustrated), in a case where the first path pattern PP1, the second path pattern PP2, or the third path pattern PP3 includes a first pattern portion and a second pattern portion respectively included in different layers, the printed circuit board 41 may include a conductive via electrically connecting the first pattern portion and the second pattern portion.

According to an embodiment, the electronic device 2 (refer to FIG. 2A) may communicate with a signal source by using the first antenna element ①, the second antenna element ②, and the third antenna element ③. An antenna array AR may include the first antenna element ①, the second antenna element ②, and the third antenna element ③. For example, the electronic device 2 may perform a positioning function (e.g., AOA) for a signal source (e.g., a responder, a transmitter, or a Tx device) by using the antenna array AR.

In an embodiment, the antenna array AR may be arranged in an 'L' shape (as shown). For example, according to the 'L'-shaped arrangement, the first antenna element ① may be located spaced apart from the second antenna element ② in the +x-axis direction, and the third antenna element ③ may be located spaced apart from the second antenna element ② in the −y-axis direction. In an embodiment, the first antenna element ① and the second antenna element ② of the antenna array AR may be arranged spaced apart in the x-axis direction, and the second antenna element ② and the third antenna element ③ of the antenna array AR may be arranged spaced apart in the y-axis direction.

In some embodiments, the processor (e.g., the processor 120 in FIG. 1) may identify or estimate a first angle (e.g., a first signal reception angle) at which the signal is received with respect to the set x-axis of the electronic device 2 by using a time difference between signals received through the first antenna element ① and the second antenna element ② aligned in the x-axis direction and the resulting phase difference. The set x-axis of the electronic device 2 may correspond, for example, to a direction orthogonal to a direction to which the third cover area ⓒ (refer to FIG. 2F) faces (e.g., −z axis direction), and a direction orthogonal to a direction of the folding axis A (refer to FIG. 2A) (e.g., y-axis direction). In some embodiments, the processor may identify or estimate a second angle (e.g., a second signal reception angle) at which the signal is received with respect to the set y-axis of the electronic device 2 by using a time difference between signals received through the second antenna element ② and the third antenna element ③ aligned in the y-axis direction and the resulting phase difference. The set y-axis of the electronic device 2 may correspond, for example, to a direction parallel to the folding axis A (refer to FIG. 2A).

In some embodiments, the processor may identify or estimate the direction of the signal source with respect to the electronic device 2 by using the first angle and the second angle. The electronic device 2 may identify or estimate the distance between the electronic device 2 and the signal source by using the time between signals received through the antenna array AR and the resulting phase difference. In some embodiments, such as when the first antenna element ① and the second antenna element ② are in a misaligned state in the x-axis direction, or the second antenna element ② and the third antenna element ③ are in a misaligned state in the y-axis direction, in order to reduce the recognition error of positioning, the electronic device 2 may be implemented to correct such misalignments by applying an offset value based on a misalignment distance between antennas. The state in which the first antenna element ① and the second antenna element ② are in a misaligned state in the x-axis direction, for example, may refer to a state in which the first center C1 of the first antenna element ① and the second center C2 of the second antenna element ② are in a misaligned state in the x-axis direction. The state in which the second antenna element ② and the third antenna element ③ are in a misaligned state in the y-axis direction, for example, may refer to a state in which the second center C2 of the second antenna element ② and the third center C3 of the third antenna element ③ are in a misaligned state in the y-axis direction.

Although the antenna structure 4 provides an example including the first antenna element ①, the second antenna element ②, and the third antenna element ③, the number or position of the antenna elements included in the antenna array AR is not limited to the illustrated example and may vary. In some embodiments, the antenna array AR may be disposed in various shapes other than the illustrated 'L' shape. In an embodiment, the processor may identify and estimate the first angle and the second angle at which the signal is received with respect to the set x-axis and the set y-axis of the electronic device 2 by using the time difference or phase difference between signals received through all of the first antenna element ① to the third antenna element ③. In a case where the 3D AOA (measure at all of top, bottom, left, and right) is measured through all of the antenna elements (e.g., the first antenna element ① to the third antenna element ③), more reliable AOA positioning may be performed.

According to an embodiment, the first antenna element ① may include a first edge E1, a second edge E2, a third edge E3, and a fourth edge E4 when viewed from above the first surface 41A of the printed circuit board 41 (e.g., when viewed in the +z-axis direction, or when viewed in the x-y plane). The first edge E1 may be located to be spaced apart from the third edge E3 in the +y-axis direction. The second edge E2 may be located to be spaced apart from the fourth edge E4 in the +x-axis direction. The first edge E1 and the third edge E3 may be provided substantially symmetrically with respect to the first center (e.g., center of symmetry) C1 of the first antenna element ① when viewed in the x-y plane. The second edge E2 and the fourth edge E4 may be provided substantially symmetrically with respect to the first center C1 of the first antenna element ① when viewed in the x-y plane.

In an embodiment, the first antenna element ① may include a first notch N1 provided on the first edge E1, a second notch N2 provided on the second edge E2, a third notch N3 provided on the third edge E3, and a fourth notch N4 provided on the fourth edge E4. As used herein, a "notch" may refer to, for example, an opening provided in the form of a recess in the edge. In some embodiments, each notch may be referred to as a 'slit'. The first notch N1 and the third notch N3 may be provided substantially symmetrically with respect to the first center C1 of the first antenna element ① when viewed in the x-y plane. The second notch N2 and the fourth notch N4 may be provided substantially symmetrically with respect to the first center C1 of the first antenna element ① when viewed in the x-y plane. The first notch N1, the second notch N2, the third notch N3, and the fourth notch N4 may be arranged at an angle of substantially 90 degrees with respect to the first center C1 of the first antenna element ① when viewed in the x-y plane.

The first edge E1 may include a first straight part extending in the x-axis direction and a first notch part due to the first notch N1 when viewed in the x-y plane. The second edge E2 may include a second straight part extending in the y-axis direction and a second notch part due to the second notch N2 when viewed in the x-y plane. The third edge E3 may include a third straight part extending in the x-axis direction and a third notch part due to the third notch N3 when viewed in the x-y plane. The fourth edge E4 may include a fourth straight part extending in the y-axis direction and a fourth notch part due to the fourth notch N4 when viewed in the x-y plane. In an embodiment, a first distance D1 by which the first straight part of the first edge E1 and the third straight part of the third edge E3 are spaced apart in the y-axis direction may be substantially equal to a second distance D2 spaced apart in the x-axis direction between the second straight part of the second edge E2 and the fourth straight part of the fourth edge E4. In some embodiments, the first distance and the second distance may be different.

The second antenna element ②, for example, may be provided in substantially the same manner as the first antenna element ①. The second antenna element ② may include a fifth edge E5, a sixth edge E6, a seventh edge E7, and an eighth edge E8 when viewed from above the first surface 41A of the printed circuit board 41 (e.g., when viewed in the +z-axis direction, or when viewed in the x-y plane). The fifth edge E5 may be located to be spaced apart from the seventh edge E7 in the +y-axis direction. The sixth edge E6 may be located to be spaced apart from the eighth edge E8 in the +x-axis direction. The second antenna element ② may include a fifth notch provided on the fifth edge E5, a sixth notch provided on the sixth edge E6, a seventh notch provided on the seventh edge E7, and an eighth notch provided on the eighth edge E8 when viewed in the x-y plane. The fifth edge E5 and the seventh edge E7 may be provided substantially symmetrically with respect to the second center (e.g., center of symmetry) C2 of the second antenna element ② when viewed in the x-y plane. The sixth edge E6 and the eighth edge E8 may be provided substantially symmetrically with respect to the second center C2 of the second antenna element ② when viewed in the x-y plane.

The third antenna element ③, for example, may be provided in substantially the same manner as the first antenna element ①. The third antenna element ③ may include a ninth edge E9, a tenth edge E10, a eleventh edge E11, and an twelfth edge E12 when viewed from above the first surface 41A of the printed circuit board 41 (e.g., when viewed in the +z-axis direction, or when viewed in the x-y plane). The ninth edge E9 may be located to be spaced apart from the eleventh edge E11 in the +y-axis direction. The tenth edge E10 may be located to be spaced apart from the twelfth edge E12 in the +x-axis direction. The third antenna element ③ may include a ninth notch provided on the ninth edge E9, a tenth notch provided on the tenth edge E10, a eleventh notch provided on the eleventh edge E11, and a twelfth notch provided on the twelfth edge E12 when viewed in the x-y plane. The ninth edge E9 and the eleventh edge E11 may be provided substantially symmetrically with respect to the third center (e.g., center of symmetry) C3 of the third antenna element ③ when viewed in the x-y plane. The tenth edge E10 and the twelfth edge E12 may be provided substantially symmetrically with respect to the third center C3 of the third antenna element ③ when viewed in the x-y plane.

According to an embodiment, any two of the first antenna element ①, the second antenna element ②, and the third antenna element ③ may have different shapes that may substantially resonate in a frequency band used (or operating frequency band). For example, the shape of the plurality of antenna elements ①, ②, and ③ may be determined in consideration of the resonance frequency band of the antenna structure 4. In the illustrated example, the first antenna element ① and the second antenna element ②, or the second antenna element ② and the third antenna element ③ may have different shapes that may substantially resonate in the frequency band used. In some embodiments, the first antenna element ①, the second antenna element ②, and the third antenna element ③ may be provided in substantially the same form.

According to an embodiment, a plurality of notches included in each respective antenna element of the antenna array AR (e.g., the first antenna element ①, the second antenna element ②, and the third antenna element ③) may contribute to the respective antenna element's ability to generate a dual-band electromagnetic wave. For example, the first antenna element ①, the second antenna element ②, and the third antenna element ③ may substantially resonate at the first used frequency (e.g., about 8 GHz) and the second used frequency (e.g., 6.5 GHz). According to the shape of each respective antenna element (e.g., the first antenna element ①, the second antenna element ②, and the third antenna element ③) or the shape of the notch included in the respective antenna element, a resonant frequency band in which the antenna element can transmit and receive signals may be changed.

According to various embodiments, the first antenna element ① may be provided in a form that does not include the first notch N1 and the third notch N3 or does not include the second notch N2 and the fourth notch N4. In some embodiments, the second antenna element ② may be provided in a form that does not include the fifth notch provided on the fifth edge E5 and the seventh notch provided on the seventh edge E7, or does not include the sixth notch provided on the sixth edge E6 and the eighth notch provided on the eighth edge E8. In some embodiments, the third antenna element ③ may be provided in a form that does not include the ninth notch provided on the ninth edge E9 and the eleventh notch provided on the eleventh edge E11, or does not include the tenth notch provided on the tenth edge E10 and the twelfth notch provided on the twelfth edge E12.

According to various embodiments, any antenna element of the antenna array AR (e.g., the first antenna element ①, the second antenna element ②, and the third antenna element ③) may be provided in a form that does not include a notch. In this case, the first antenna 431, the second antenna 432, and the third antenna 433 may resonate at substantially one frequency (e.g., a first used frequency (e.g., about 8 GHz) or a second used frequency (e.g., about 6.5 GHz)).

According to various embodiments (not illustrated), each antenna element (e.g., the first antenna element ①, the second antenna element ②, and the third antenna element ③) is not limited to the illustrated example and may be provided in various other forms. For example, each antenna element may be formed in a circular, elliptical, polygonal, or annular shape, and may or may not include one or more notches.

The printed circuit board 41 may include a second conductive layer (e.g., the second conductive layer 502 of FIG. 5) including a ground plane or a ground layer. In an embodiment, the second conductive layer may be located between the second surface 41B and the antenna array AR (e.g., the first antenna element ①, the second antenna element ②, and the third antenna element ③). For example, the second conductive layer may be located closer to the second surface 41B than the antenna array AR (e.g., the first antenna element ①, the second antenna element ②, and the third antenna element ③). The ground plane may reduce electromagnetic effects (e.g., electromagnetic interference (EMI)) on circuits (or circuit patterns) included in the printed circuit board 41. The ground plane may reduce, for example, the effect of external electromagnetic noise (e.g., electromagnetic noise from the periphery of antenna structure 4 to antenna structure 4) on the circuit included in the printed circuit board 41. The ground plane, for example, can reduce the effect of an electromagnetic field generated when a current flows through a circuit included in the printed circuit board 41 on electrical elements around the printed circuit board 41. In an embodiment, the ground plane may operate as an antenna ground for the first antenna 431, the second antenna 432, and the third antenna 433. The ground plane included in the antenna structure 4 may be electrically connected to the ground (e.g., a ground plane or a ground layer) included in the first substrate assembly located in the inner space of the first housing 21 through the connector 42. The ground plane included in the antenna structure 4 may be electrically connected to a ground member (e.g., a ground plane) included in the first substrate assembly.

Figure 5:
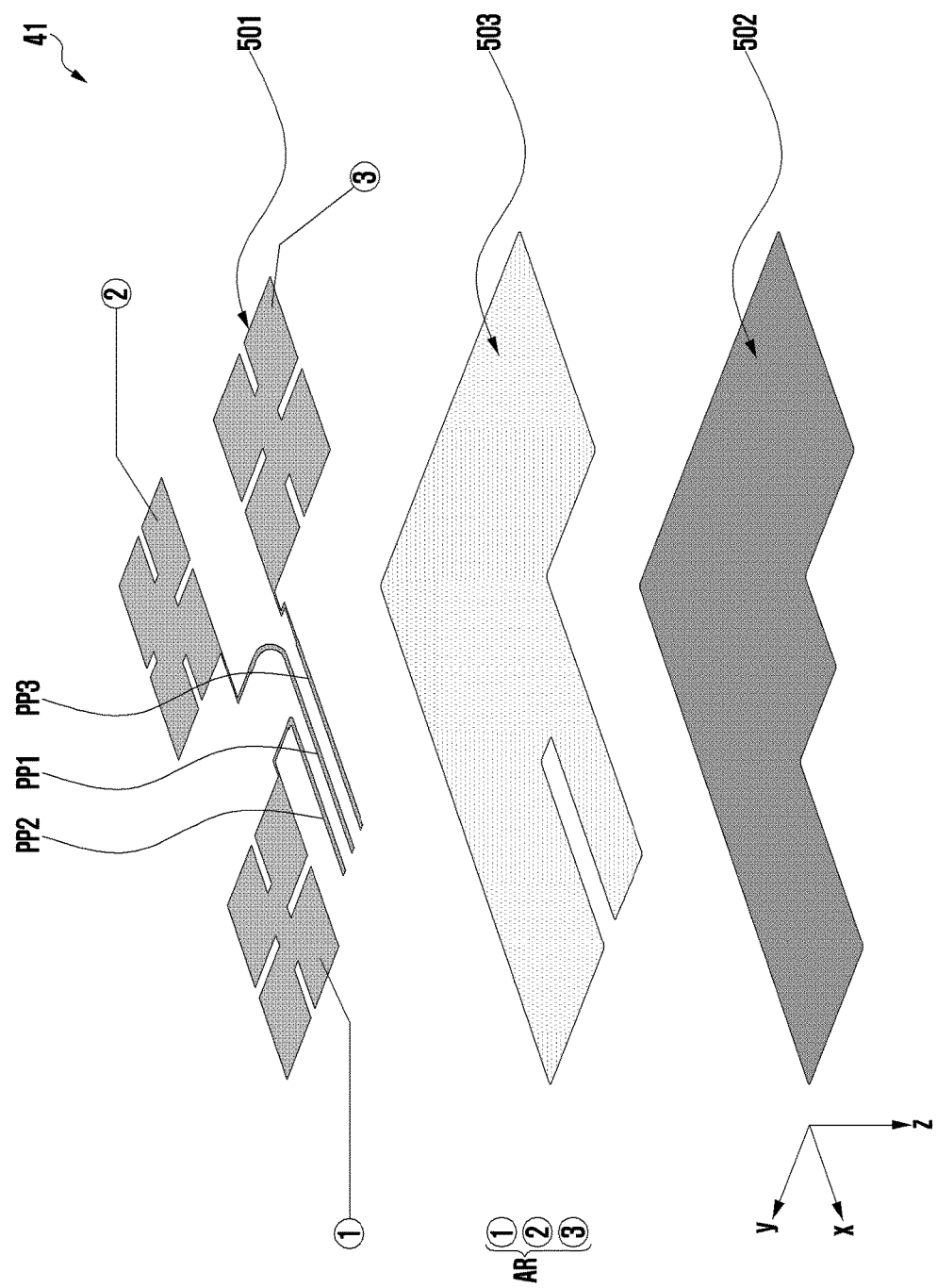
FIG. 5 is an exploded perspective view of a printed circuit board included in an antenna structure according to an embodiment.
Figure 6:
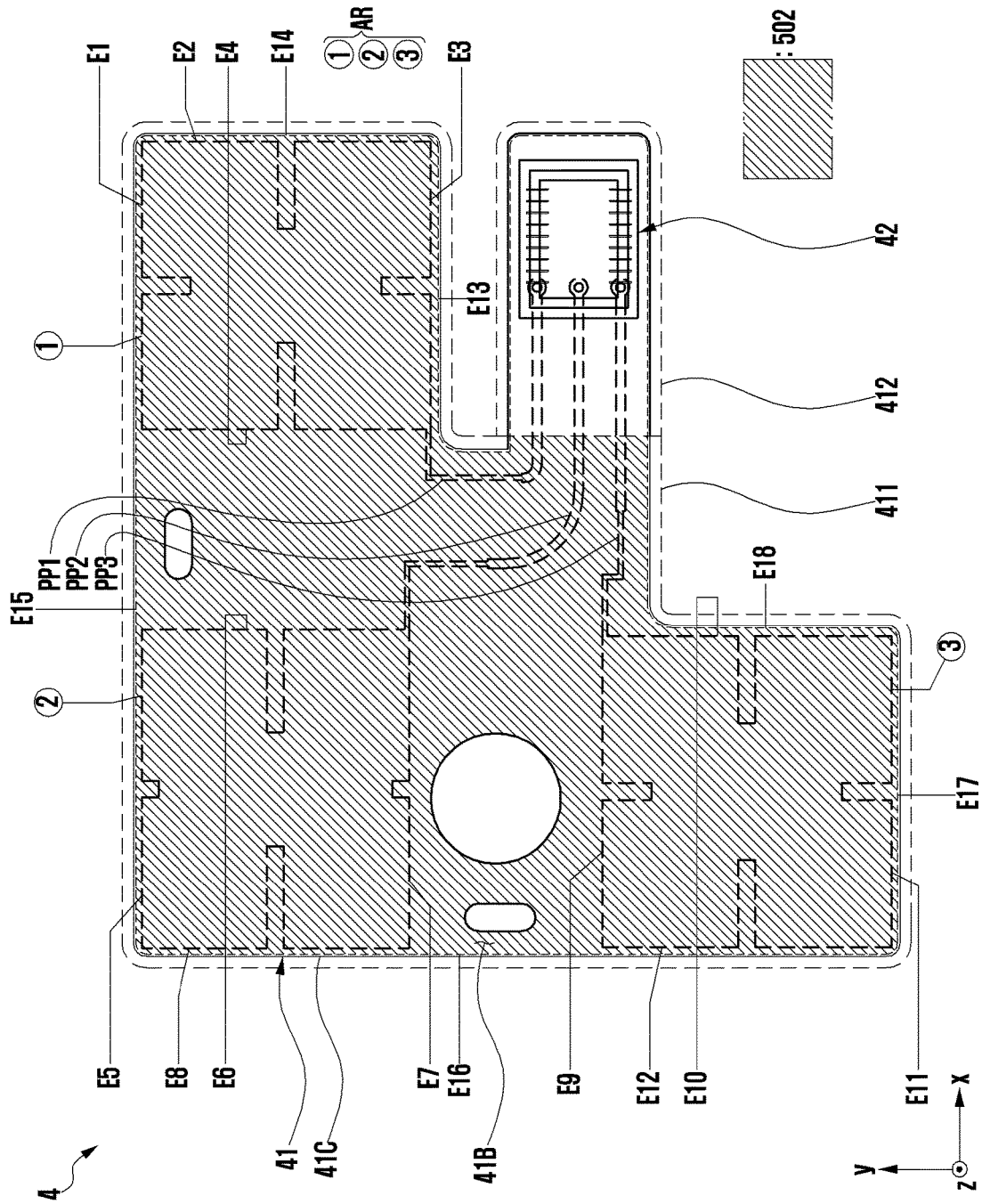
FIG. 6 is a diagram illustrating an antenna structure when viewed from above a first cover area of an electronic device according to an embodiment.

FIG. 5 is an exploded perspective view of a printed circuit board 41 included in an antenna structure 4 according to an embodiment. FIG. 6 is a diagram illustrating an antenna structure 4 when viewed from above (e.g., in the −z-axis direction) of a first cover area ⓐ (refer to FIG. 2A) of the electronic device 2 according to an embodiment.

Referring to FIGS. 5 and 6, the printed circuit board 41 may include a first conductive layer 501, a second conductive layer 502, and a dielectric (or layer of dielectric material) 503. In an embodiment, the first conductive layer 501 may be located closer to the first surface 41A (refer to FIG. 4) of the printed circuit board 41 than the second conductive layer 502. For example, the first conductive layer 501 may include the first antenna element ①, the second antenna element ②, and the third antenna element ③, the first path pattern PP1, the second path pattern PP2, and the third path pattern PP3. In an embodiment, the second conductive layer 502 may be located closer to the second surface 41B than the first conductive layer 501. The second conductive layer 502 may operate as a ground plane. A dielectric 503 may be located between the first conductive layer 501 and the second conductive layer 502.

In an embodiment, the printed circuit board 41 may operate as a patch antenna. The patch antenna may refer to an antenna type including, for example, a dielectric substrate (e.g., dielectric 503), one or more patches (e.g., the first antenna element ①, the second antenna element ②, and the third antenna element ③) disposed on one surface of the dielectric substrate, and a ground plane (e.g., second conductive layer 502) disposed on the other surface of the dielectric substrate. The second conductive layer 502 may at least partially overlap the first conductive layer 501 when viewed from above the first surface 41A (refer to FIG. 4) of the printed circuit board 41 (e.g., when viewed in the +z-axis) and may operate as an antenna ground. When a radiation current is provided (or fed) to the antenna structure 4, substantial power radiation may occur in the first antenna element ①, the second antenna element ②, and the third antenna element ③. In an embodiment, the first conductive area corresponding to the feeding pattern (e.g., the first path pattern PP1, the second path pattern PP2, and the third path pattern PP3) of the first conductive layer 501 and the second conductive area corresponding to the feeding pattern of the second conductive layer 502 may form a coplanar waveguide (CPW) that transmits a frequency signal (or radiation current). In this case, although not illustrated, the first conductive layer 501 may be implemented to include a ground pattern located around the feeding pattern. In some embodiments, the feeding pattern (e.g., the first feeding pattern PP1, the second feeding pattern PP2, or the third feeding pattern PP3) may be implemented as a microphone strip line. The radiation characteristics (e.g., resonant frequency and impedance values) of the antenna structure 4 may be determined based on various conditions such as the shape and material of the components included in the printed circuit board 41 and the relative positions between the components. For example, the resonance frequency and impedance value may be determined according to the shape of the plurality of antenna elements ①, ②, and ③, the thickness (e.g., the distance between the first conductive layer 501 and the second conductive layer 502) or dielectric constant of the dielectric 503, and the thickness, width, and material of the second conductive layer 502.

Although not illustrated, the printed circuit board 41 may further include a first coverlay providing at least a part of the first surface 41A or a second coverlay providing at least a part of the second surface 41B. The first coverlay or the second coverlay serves to protect a circuit (or circuit pattern) included in the printed circuit board 41, and may include, for example, an insulating layer or a non-conductive layer.

According to an embodiment, the second conductive layer 502 (e.g., a ground plane or an antenna ground) may be included in the first part 411 of the printed circuit board 41. In an embodiment, the second conductive layer 502 may be located to substantially overlap the entire circuit included in the first part 411 when viewed from above the second surface 41B (e.g., when viewed along the −z axis). The circuit included in the first part 411 may include, for example, a first antenna element ①, a second antenna element ②, a third antenna element ③, a part of the first path pattern PP1, a part of the second path pattern PP2, and a part of the third path pattern PP3. In some embodiments, the second conductive layer 502 may be provided in various other forms, not limited to the illustrated examples, at a level at which antenna radiation performance may be secured when viewed from above the second surface 41B. In some embodiments, the second conductive layer 502 may extend into at least a part of the second part 412 (not separately shown). In some embodiments, the second conductive layer 502 may be electrically connected to the ground plane included in the second part 412 by using a conductive via.

According to an embodiment, the first antenna element ① and the second antenna element ② may be positioned to be spaced apart from each other so as to have an isolation degree of a specified value or a value greater than or equal to a level capable of securing antenna radiation performance. According to an embodiment, the second antenna element ② and the third antenna element ③ may be positioned to be spaced apart from each other so as to have an isolation degree of a specified value or a value greater than or equal to a level capable of securing antenna radiation performance. In some embodiments, any or all of the first feeding pattern PP1, the second feeding pattern PP2, and the third feeding pattern PP3 may include a first part having a first width and a second part having a second width that is wider than the first width when viewed from above the first surface 41A (refer to FIG. 4). The first part having the first width, for example may serve as a transformer line to adjust the phase of the radiation current. Phase adjustment by using transformer lines may contribute to reducing interference between antenna elements.

In an embodiment, the first antenna element ①, the second antenna element ②, and the third antenna element ③ are located adjacent to the edge 41C of the printed circuit board 41, and may contribute to securing isolation between the antenna elements and reducing the size of the printed circuit board 41. For example, the first part 411 of the printed circuit board 41 may be provided in an 'L' shape corresponding to the antenna array AR arranged in an 'L' shape when viewed from above the second surface 41B (e.g., in the −z axis direction). In an embodiment, the second conductive layer 502 (e.g., a ground plane) may include a thirteenth edge E13, a fourteenth edge E14, a fifteenth edge E15, a sixteenth edge E16, a seventeenth edge E17, and/or an eighteenth edge E18 when viewed from above the second surface 41B. The thirteenth edge E13 may be located to correspond to the third edge E3 of the first antenna element ①. The thirteenth edge E13 may be located to be spaced apart from the third edge E3 in the −y-axis direction, for example, when viewed from above the second surface 41B. The fourteenth edge E14 may be located to correspond to the second edge E2 of the first antenna element ①. The fourteenth edge E14 may be located to be spaced apart from the second edge E2 in the +x-axis direction, for example, when viewed from above the second surface 41B. The fifteenth edge E15 may be located to correspond to the first edge E1 of the first antenna element ① and the fifth edge E5 of the second antenna element ②. The fifteenth edge E15 may be located spaced apart from the first edge E1 and/or the fifth edge E5 in the +y-axis direction, for example, when viewed from above the second surface 41B. The sixteenth edge E16 may be located to correspond to the eighth edge E8 of the second antenna element ② and the twelfth edge E12 of the third antenna element ③. The sixteenth edge E16 may be located spaced apart from the eighth edge E8 and/or the twelfth edge E12 in the −x-axis direction, for example, when viewed from above the second surface 41B. The seventeenth edge E17 may be located to correspond to the eleventh edge E11 of the third antenna element ③. The seventeenth edge E17 may be located to be spaced apart from the eleventh edge E11 in the −y-axis direction, for example, when viewed from above the second surface 41B. The eighteenth edge E18 may be located to correspond to the tenth edge E10 of the third antenna element ③. The eighteenth edge E18 may be located to be spaced apart from the tenth edge E10 in the +x-axis direction, for example, when viewed from above the second surface 41B.

When a radiation current (or an electromagnetic signal) (e.g., a UWB signal) is provided (or fed) to the antenna array AR (e.g., the first antenna element ①, the second antenna element ②, and the third antenna element ③), electromagnetic fields (or electromagnetic waves, radiation waves, or radiation energy) distributed around each respective antenna element may be formed. In an embodiment, a part of the electromagnetic field may proceed in front of the first surface 41A (refer to FIG. 4) (e.g., in a direction toward which the first surface 41A is facing). In an embodiment, the second conductive layer 502 (e.g., a ground plane or an antenna ground) may contribute to substantially radiating energy in a direction toward which the first surface 41A is facing. For example, the second conductive layer 502 may contribute to forming a beam in which a relatively large amount of energy is radiated in a direction toward which the first surface 41A is facing through the antenna element.

According to an embodiment, the second conductive layer 502 (e.g., ground plane or antenna ground) may contribute to securing radiation performance of the antenna structure 4 by reducing electromagnetic influence (e.g., electromagnetic interference (EMI)) on a circuit (or circuit pattern) included in the printed circuit 41. The second conductive layer 502, for example, may shield or reduce electromagnetic noise for signals or power flowing in the printed circuit board 41. The second conductive layer 502 may reduce, for example, an influence of external electromagnetic noise (e.g., electromagnetic noise from the periphery of antenna structure 4 to antenna structure 4) on a circuit included in the printed circuit board 41. The second conductive layer 502 may reduce, for example, an influence of an electromagnetic field generated when a current flows through a circuit included in the printed circuit board 41 on electrical elements around the antenna structure 4.

Figure 7:
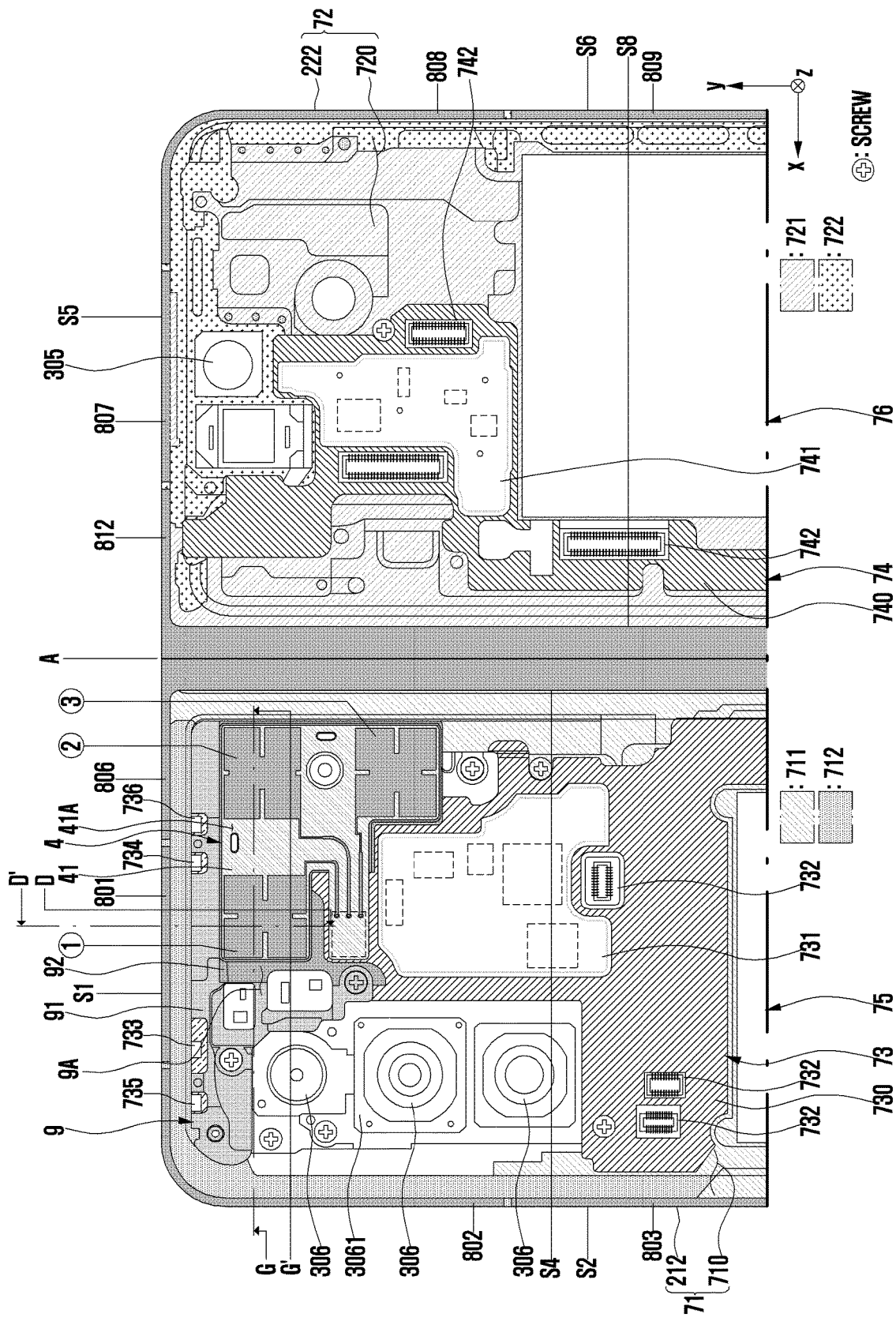
FIG. 7 is a diagram illustrating a part of an electronic device in an unfolded state when viewed from above from the rear side according to an embodiment.
Figure 8:
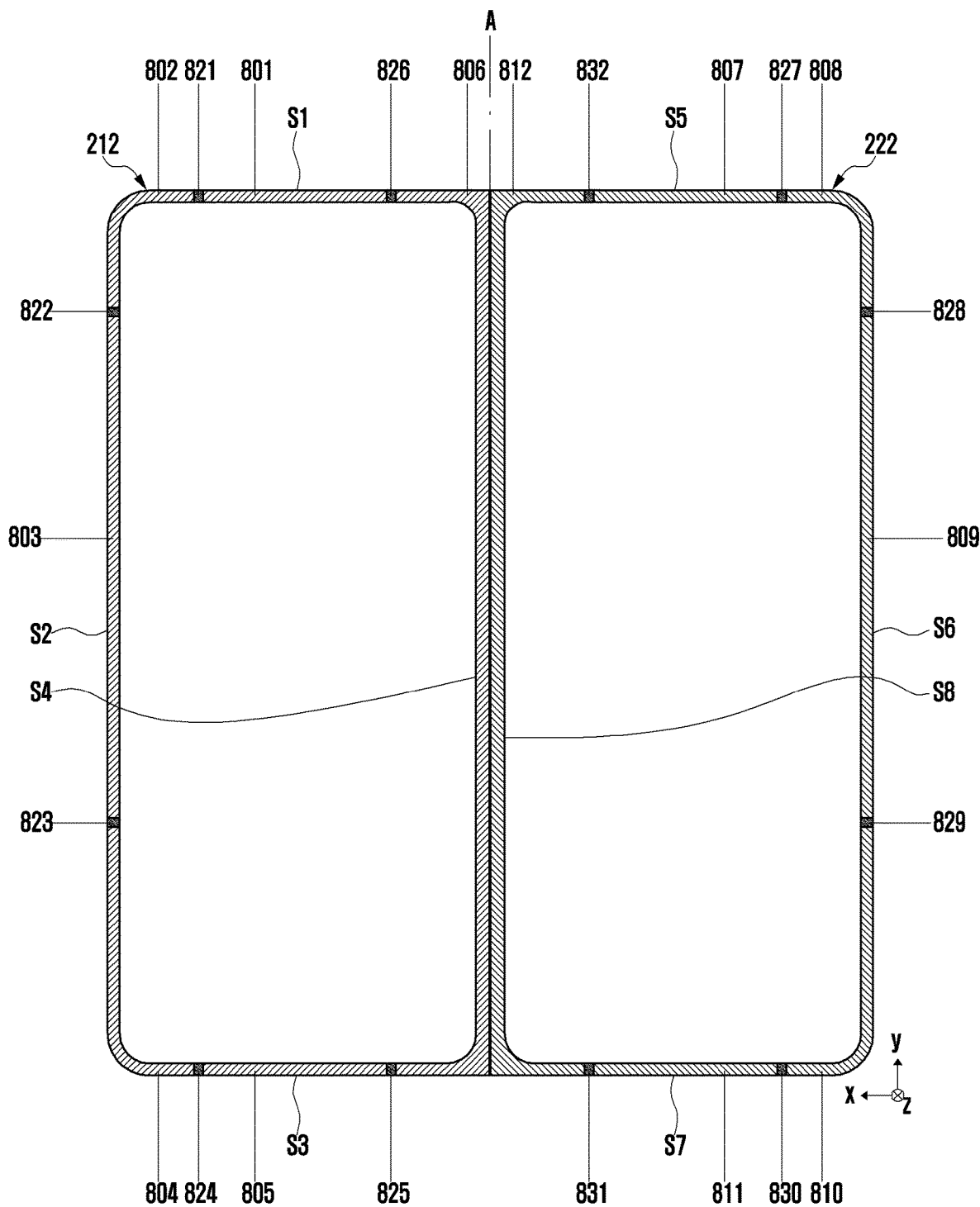
FIG. 8 is a diagram illustrating a first side member and a second side member in an electronic device in an unfolded state according to an embodiment.
Figure 9:
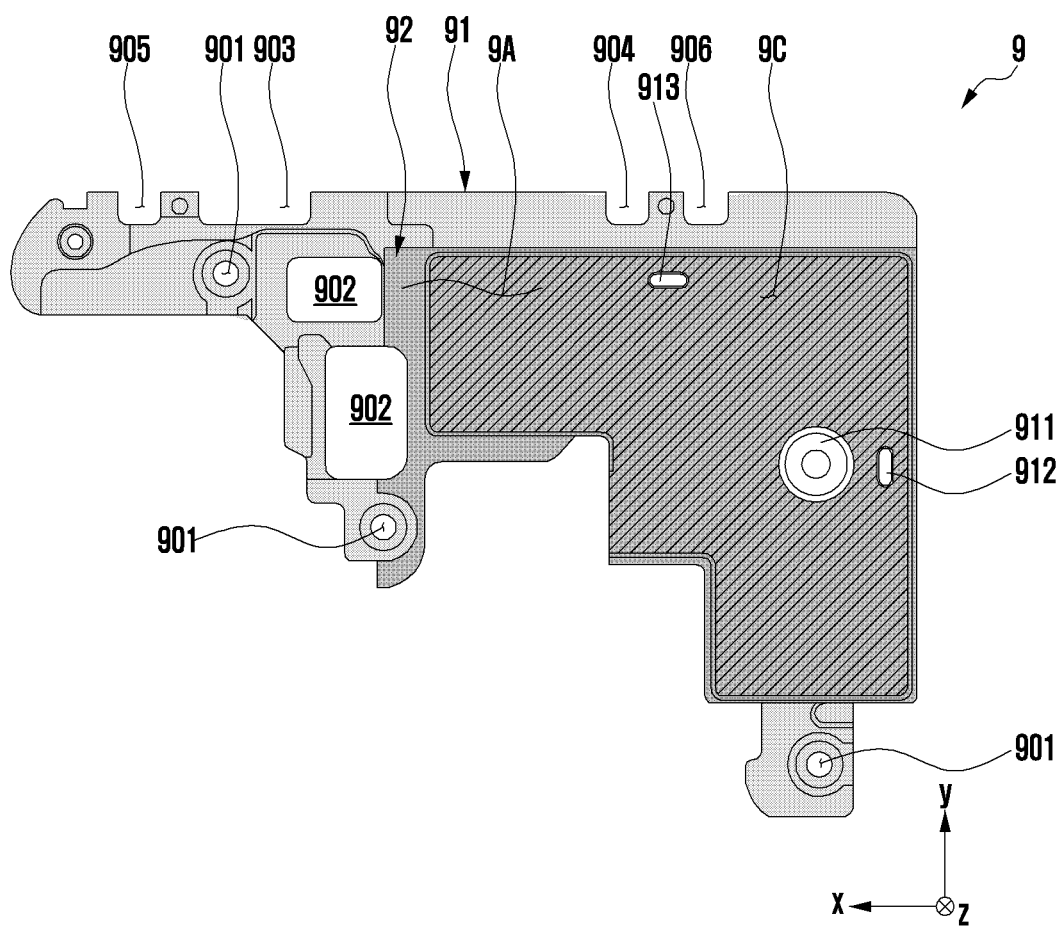
FIG. 9 is a diagram illustrating a third support structure when viewed from above a third cover area of an electronic device according to an embodiment.
Figure 10:
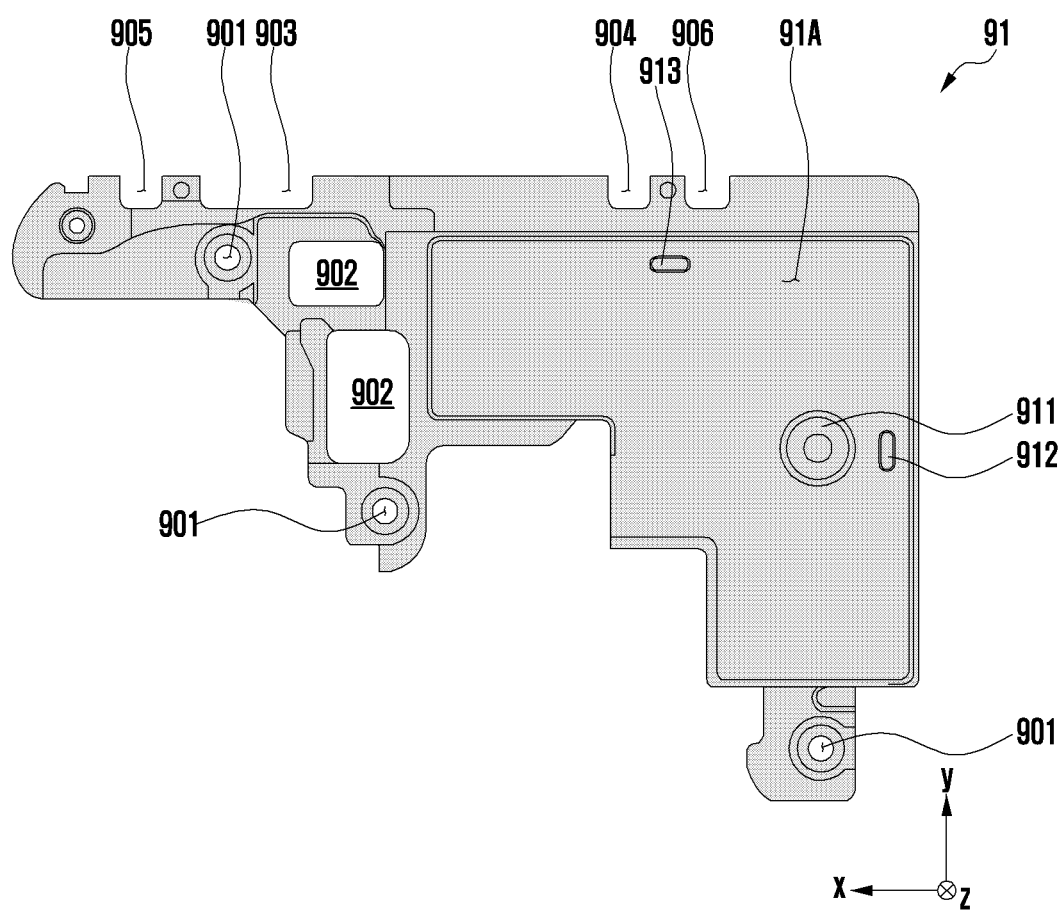
FIG. 10 is a diagram illustrating a non-conductive support structure included in a third support structure according to an embodiment.
Figure 11:
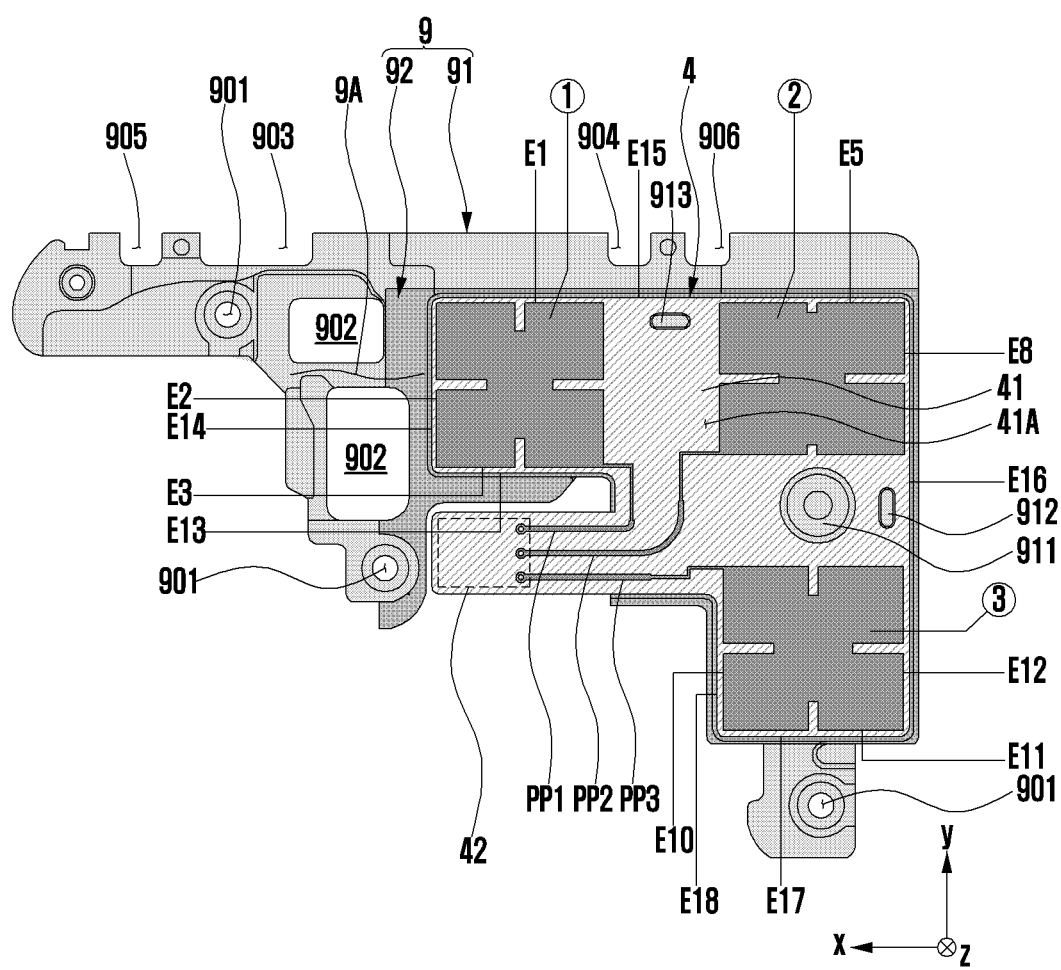
FIGS. 11 and 12 are diagrams illustrating a state in which a third support structure and an antenna structure are coupled according to an embodiment.
Figure 12:
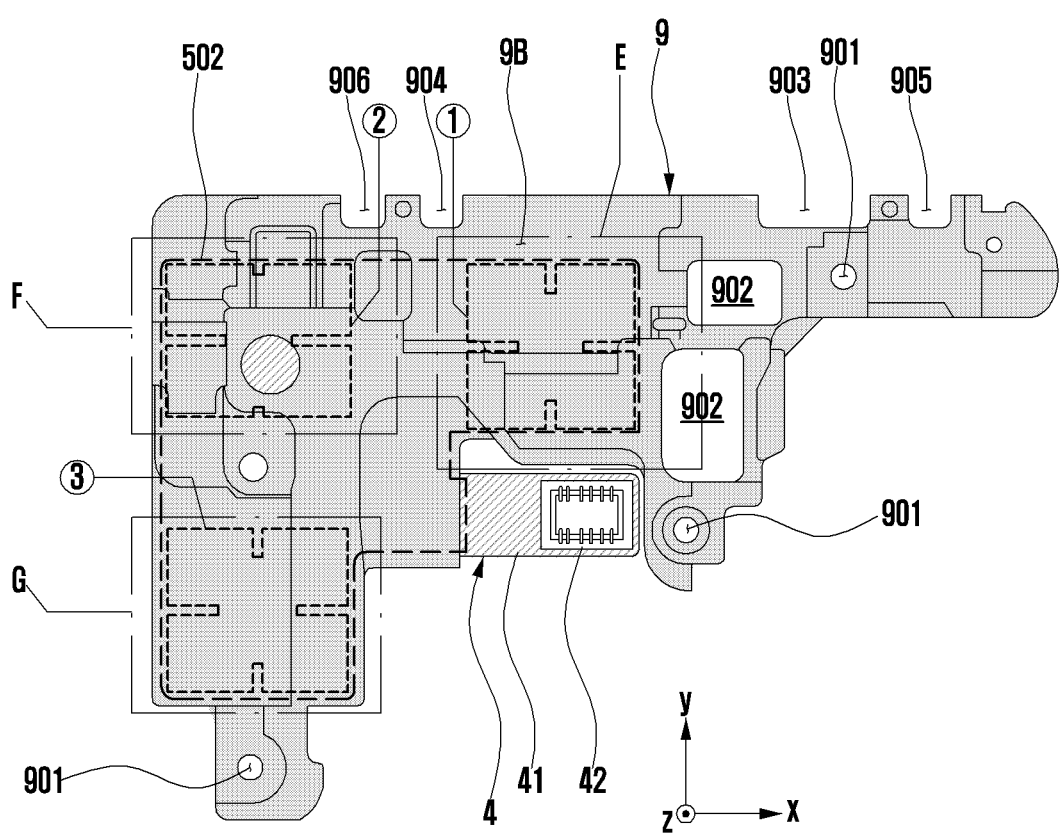

FIG. 7 is a diagram illustrating a part of an electronic device 2 in an unfolded state when viewed from above (e.g., in the +z axis direction) from the rear surface 20B (refer to FIG. 2F) according to an embodiment. FIG. 8 is a diagram illustrating a first side member 212 and a second side member 222 in an electronic device 2 in an unfolded state according to an embodiment. FIG. 9 is a diagram illustrating a third support structure 9 when viewed from above (e.g., when viewed along the +z axis) a third cover area ⓒ (refer to FIG. 2F) of an electronic device 2 according to an embodiment. FIG. 10 is a diagram illustrating a non-conductive support structure 91 included in a third support structure 9 according to an embodiment. FIGS. 11 and 12 are diagrams illustrating a state in which a third support structure 9 and an antenna structure 4 are coupled according to an embodiment.

Referring to FIG. 7, the electronic device 2 may include a first front case 71, a second front case 72, a first substrate assembly 73, a second substrate assembly 74, a first battery 75, a second battery 76, antenna structure 4, a third support structure 9, a first camera module 305, and/or a plurality of second camera modules 306. In some embodiments, the electronic device 2 may omit at least one of the above components or additionally include other components.

According to an embodiment, the first front case 71 may include a first side member 212 and a first support structure 710. The first support structure 710 may be located in the interior space of the first housing 21 (refer to FIG. 2A), and may be connected to the first side member 212 or integrally formed with the first side member 212. The second front case 72 may include a second side member 222 and a second support structure 720. The second support structure 720 may be located in the interior space of the second housing 22 (refer to FIG. 2A), and may be connected to the second side member 222 or integrally formed with the second side member 222. One or more hinges may connect the first support structure 710 and the second support structure 720, and the first front case 71 and the second front case 72 may be mutually rotatable based on a rotation axis (e.g., the folding axis A) by one or more hinges. The first support structure 710 and the second support structure 720 may be located in the electronic device 2 to withstand a load, thereby contributing to durability or rigidity (e.g., torsional stiffness) of the electronic device 2. The first support structure 710 and/or the second support structure 720 may be formed of, for example, a metal material and/or a non-metal material (e.g., a polymer). Electronic components (e.g., a part of the flexible display 30, the first substrate assembly 73, the first battery 75, or a plurality of second camera modules 306) or various members related to the electronic components may be disposed on the first front case 71 or the first support structure 710, or may be supported by the first front case 71 or the first support structure 710. Electronic components (e.g., a part of the flexible display 30, the second substrate assembly 74, the second battery 76, or the first camera module 305) or various members related to the electronic components may be disposed on the second front case 72 or the second support structure 720, or may be supported by the second front case 72 or the second support structure 720. The first front case 71 or the first support structure 710 may be included in the first housing 21 of the foldable housing 20 (refer to FIG. 2A) to withstand a load, thereby contributing to durability or rigidity of the electronic device 2. The second front case 72 or the second support structure 720 may be included in the second housing 22 of the foldable housing 20 to withstand a load, thereby contributing to durability or rigidity of the electronic device 2. In some embodiments, the first front case 71 or the first support structure 710 may be referred to by various other terms such as 'first frame', 'first frame structure', or 'first framework'. In some embodiments, the second front case 72 or the second support structure 720 may be referred to by various other terms such as 'second frame', 'second frame structure', or 'second framework'. The first support structure 710 is an internal structure located in the inner space of the electronic device 2 corresponding to the first housing 21, and in some embodiments, may be referred to by various other terms such as a 'first bracket' or a 'first support member'. The second support structure 720 is an internal structure located in the inner space of the electronic device 2 corresponding to the second housing 22, and in some embodiments, may be referred to by various other terms such as a 'second bracket' or a 'second support member'. In some embodiments, the first support structure 710 may be interpreted as a part of the first housing 21, and the second support structure 720 may be interpreted as a part of the second housing 22.

Referring to FIGS. 7 and 8, in an embodiment, the first side member 212 may include a first side part S1, a second side part S2, a third side part S3, and/or a fourth side part S4. The second side part S2 may be spaced apart from and substantially parallel to the folding axis A. The fourth side part S4 may be substantially parallel to the folding axis A, and may be located closer to the folding axis A than the second side portion S2. The first side part S1 may connect one end of the second side part S2 and one end of the fourth side part S4, and may be substantially perpendicular to the folding axis A. The third side part S3 may connect the other end of the second side part S2 and the other end of the fourth side part S4, and may be spaced apart from and substantially parallel to the first side part S1. In an embodiment, a corner part to which the first side part S1 and the second side part S2 of the first side member 212 are connected, or a corner part to which the second side part S2 and the third side part S3 of the first side member 212 are connected may be provided in a round shape or a curved shape. In an embodiment, the first side member 212 may include a first conductive part 801, a second conductive part 802, a third conductive part 803, a fourth conductive part 804, a fifth conductive part 805, a sixth conductive part 806, a first insulating part 821, a second insulating part 822, a third insulating part 823, a fourth insulating part 824, a fifth insulating part 825, and/or a sixth insulating part 826. The first conductive part 801 may provide a part of the first side part S1. The second conductive part 802 may include a corner to which the first side part S1 and the second side part S2 are connected, and provide a part of the first side part S1 and a part of the second side part S2. The third conductive part 803 may provide a part of the second side part S2. The fourth conductive part 804 may include a corner to which the second side part S2 and the third side part S3 are connected, and provide a part of the second side part S2 and a part of the third side part S3. The fifth conductive part 805 may provide a part of the third side part S3. The sixth conductive part 806 may include a corner to which the first side part S1 and the fourth side part S4 are connected and a corner to which the third side part S3 and the fourth side part S4 are connected, and provide a part of the first side part S1, a part of the fourth side part S4 and a part of the third side part S3. The first insulating part 821 may be located between the first conductive part 801 and the second conductive part 802, and may provide a part of the first side part S1. The second insulating part 822 may be located between the second conductive part 802 and the third conductive part 803, and may provide a part of the second side part S2. The third insulating part 823 may be located between the third conductive part 803 and the fourth conductive part 804, and may provide a part of the second side part S2. The fourth insulating part 824 may be located between the fourth conductive part 804 and the fifth conductive part 805, and may provide a part of the third side surface portion S3. The fifth insulating part 825 may be located between the fifth conductive part 805 and the sixth conductive part 806, and may provide a part of the third side part S3. The sixth insulating part 826 may be located between the first conductive part 801 and the sixth conductive part 806, and may provide a part of the first side portion S1. The plurality of conductive parts 801, 802, 803, 804, 805, and 806 included in the first side member 212 may be located to be separated by, for example, the plurality of insulating parts 821, 822, 823, 824, 825, and 826 included in the first side member 212. In an embodiment, the first support structure 710 may include a first conductive area 711 including a metal material, and a first non-conductive area 712 coupled to the first conductive area 711 and including a non-metal material. The first conductive part 801, the second conductive part 802, the third conductive part 803, the fourth conductive part 804, the fifth conductive part 805, or the sixth conductive part 806 may be integrally formed with the first conductive area 711 or connected to the first conductive area 711. The first insulating part 821, the second insulating part 822, the third insulating part 823, the fourth insulating part 824, the fifth insulating part 825, or the sixth insulating part 826 may be integrally formed with the first non-conductive area 712 or may be connected to the first non-conductive area 712.

According to an embodiment, the second side member 222 may include a fifth side part S5, a sixth side part S6, a seventh side part S7, and/or an eighth side part S8. In the folded state (refer to FIG. 3A) of the electronic device 2, the first side part S1 and the fifth side part S5, the second side part S2 and the sixth side part S6, the third side part S3 and the seventh side part S7, and the fourth side part S4 and the eighth side part S8 may be aligned with and overlap each other. In an embodiment, the second side member 222 may include a seventh conductive part 807, an eighth conductive part 808, a ninth conductive part 809, a tenth conductive part 810, an eleventh conductive part 811, a twelfth conductive part 812, a seventh insulating part 827, an eighth insulating part 828, a ninth insulating part 829, a tenth insulating part 830, an eleventh insulating part 831, and/or a twelfth insulating part 832. In the folded state of the electronic device 2, the first insulating part 821 and the seventh insulating part 827, the second insulating part 822 and the eighth insulating part 828, the third insulating part 823 and the ninth insulating part 829, the fourth insulating part 824 and the tenth insulating part 830, the fifth insulating part 825 and the eleventh insulating part 831, and the sixth insulating part 826 and the twelfth insulating part 832 may be aligned with each other. In the folded state of the electronic device 2, the first conductive part 801 and the seventh conductive part 807, the second conductive part 802 and the eighth conductive part 808, the third conductive part 803 and the ninth conductive part 809, the fourth conductive part 804 and the tenth conductive part 810, the fifth conductive part 805 and the eleventh conductive part 811, and the sixth conductive part 806 and the twelfth conductive part 812 may be aligned with and overlap each other. The plurality of conductive parts 807, 808, 809, 810, 811, and 812 included in the second side member 222 may be located to be separated by, for example, a plurality of insulating parts 827, 828, 829, 830, 831, and 832 included in the second side member 222. In an embodiment, the second support structure 720 may include a second conductive area 721 including a metal material, and a second non-conductive area 722 coupled to the second conductive area 721 and including a non-metal material. The seventh conductive part 807, the eighth conductive part 808, the ninth conductive part 809, the tenth conductive part 810, the eleventh conductive part 811, or the twelfth conductive part 812 may be integrally formed with the second conductive area 721 or connected to the second conductive area 721. The seventh insulating part 827, the eighth insulating part 828, the ninth insulating part 829, the tenth insulating part 830, the eleventh insulating part 831, or the twelfth insulating part 832 may be integrally formed with the second non-conductive area 722 or connected to the second non-conductive area 722. The shape or number of the conductive part or the insulating part included in the first side member 212 may vary without being limited to the illustrated example, and the second side member 222 may be implemented to have a plurality of conductive parts and/or insulating parts aligned with the plurality of conductive parts and the plurality of insulating parts of the first side member 212 in the folded state of the electronic device 2.

According to an embodiment, the electronic device 2 may transmit and/or receive a signal (e.g., a frequency signal) of a selected or specified frequency band by using at least one conductive part (e.g., the first conductive part 801, the second conductive part 802, the fourth conductive part 804, the fifth conductive part 805, or the sixth conductive part 806) included in the first side member 212. The electronic device 2 may transmit and/or receive a signal of a selected or specified frequency band by using at least one conductive part (e.g., the seventh conductive part 807, the eighth conductive part 808, the ninth conductive part 809, the tenth conductive part 810, the eleventh conductive part 811, or the twelfth conductive part 812) included in the second side member 222. For example, at least one conductive part included in the first side member 212 or at least one conductive part included in the second side member 222 may be electrically connected to a wireless communication circuit (e.g., the wireless communication module 192 of FIG. 1) included in the first substrate assembly 73 to operate as an antenna radiator. The wireless communication circuit may process a transmitted signal or a received signal in at least one selected or specified frequency band through the at least one radiator. The selected or specified frequency band may include, for example, at least one of a low band (LB) (about 600 MHz to about 1 GHz), a middle band (MB) (about 1 GHz to about 2.3 GHz), a high band (HB) (about 2.3 GHz to about 2.7 GHz), or an ultra-high band (UHB) (about 2.7 GHz to about 6 GHz). The specified frequency band may include various other frequency bands. Although not illustrated, the electronic device 2 may include various other one or more antenna radiators. A structure in which the plurality of insulating parts (e.g., the first insulating part 821, the second insulating part 822, the third insulating part 823, the fourth insulating part 824, the fifth insulating part 825, and the sixth insulating part 826) of the first side member 212 and the plurality of insulating parts (e.g., the seventh insulating part 827, the eighth insulating part 828, the ninth insulating part 829, the tenth insulating part 830, the eleventh insulating part 831, and the twelfth insulating part 832) of the second side member 222 are aligned correspondingly in the folded state (refer to FIG. 3A) of the electronic device 2, respectively may reduce the deterioration of the antenna radiation performance when utilizing the at least one conductive part included in the first side member 212 or the at least one conductive part included in the second side member 222 as an antenna radiator.

According to an embodiment, a wireless communication circuit (e.g., the wireless communication module 192 of FIG. 1) or a processor (e.g., the processor 120 of FIG. 1) included in the first substrate assembly 73 may transmit or receive data through a MIMO technique by using a plurality of antenna radiators in a communication mode using a corresponding frequency band. The electronic device 2 may include a memory (e.g., the memory 130 of FIG. 1) electrically connected to the processor. The memory may store instructions that cause the processor to transmit or receive data through a MIMO technique by selectively using multiple antenna radiators among the plurality of antenna radiators based on a communication mode. For example, the MIMO technique may include a 'beamforming' method that adjusts the phase information of each antenna radiator and adjusts the signal strength according to the position angle of the base station (or transmitter) and the user to remove surrounding interference and improve performance. For example, the MIMO technique may include a 'diversity' method that improves performance by keeping a distance between antenna radiators to independently make signals between the antenna radiators. For example, the MIMO technique may include a 'multiplexing' method that increases the transmission rate by transmitting different data through each transmission antenna by generating a virtual auxiliary channel between transmission and reception antenna radiators. In an embodiment, a technique in which the base station transmits different data through each transmission antenna and the electronic device 2 divides the transmit data through appropriate signal processing may be utilized. For example, the 4×4 MIMO technique may utilize four antenna radiators for each of the base station (or transmitter) and the electronic device 2 (or receiver).

According to an embodiment, the first support structure 710 may include a first support area facing the first cover area ⓐ (refer to FIG. 2A), and a third support area facing the third cover area ⓒ (or the first rear cover 211) (refer to FIG. 2F). A part of the flexible display 30 (refer to FIG. 2A) corresponding to the first housing 21 may be located between the front cover 201 (refer to FIG. 2A) and the first support area. A part of the flexible display 30 corresponding to the first housing 21 may be disposed on or supported by the first support area by using, for example, bonding including an adhesive member (not separately illustrated). Components such as the first substrate assembly 73, the first battery 75, or the third support structure 9 may be disposed in the third support area by using, for example, mechanical bonding, such as screw fastening or snap-fit fastening (e.g., hook and hook fastening structure in which hooks are fastened), or bonding (or chemical bonding) including an adhesive member. For example, the plurality of second camera modules 306 may be connected to the third support area by using a camera bracket. The camera bracket in which the plurality of second camera modules 306 are located may be disposed in the third support area by using screw fastening. The first support area and the third support area may include a seating structure that enables the components to be stably located on the first support structure 710. The seating structure may include, for example, a structure into which the components may be fitted (e.g., a fitting structure or a recess structure).

According to an embodiment, the second support structure 720 may include a second support area facing the second cover area ⓑ (refer to FIG. 2A), and a fourth support area facing the fourth cover area ⓓ (or the second rear cover 221) (refer to FIG. 2F). A part of the flexible display 30 (refer to FIG. 2A) corresponding to the second housing 22 may be located between the front cover 201 (refer to FIG. 2A) and the second support area. A part of the flexible display 30 corresponding to the first housing 21 may be disposed on or supported by the second support area by using, for example, bonding including an adhesive member. Components such as the second substrate assembly 74, the second battery 76, or the first camera module 305 may be disposed in the fourth support area by using, for example, mechanical bonding, such as screw fastening or snap-fit fastening, or bonding including an adhesive member. The second support area and the fourth support area may include a seating structure that enables the components to be stably located on the second support structure 720. The seating structure may include, for example, a structure into which the components may be fitted (e.g., a fitting structure or a recess structure).

According to an embodiment, the first substrate assembly 73 may be disposed on the first support structure 710 and may include a first printed circuit board 730 (e.g., a printed circuit board (PCB) or a printed circuit board assembly (PBA)). The first substrate assembly 73 may include various electronic components electrically connected to the first printed circuit board 730. For example, electronic components located in the inner space of the first housing 21 (refer to FIG. 2A) may be disposed on the first printed circuit board 730 or may be electrically connected to the first printed circuit board 730 through an electrical path such as a cable or FPCB. For example, the first substrate assembly 73 may include electronic components such as a processor (e.g., processor 120 in FIG. 1) and a wireless communication circuit (e.g., the wireless communication module 192 of FIG. 1) disposed on the first printed circuit board 730, and an electromagnetic shielding member 731 (e.g., a shield can) that covers the electronic components. For example, components such as the plurality of second camera modules 306 or the antenna structure 4 may be electrically connected to one or more connectors 732 disposed on the first printed circuit board 730 by using an electrical path (e.g., FPCB) (not illustrated). In an embodiment, the first printed circuit board 730, the plurality of second camera modules 306, and the first battery 75 may be located on the first support structure 710 so as not to substantially overlap when viewed from above (e.g., in the +z-axis direction) of the third cover area ⓒ (or the first rear cover 211) (refer to FIG. 2F).

According to an embodiment, the second substrate assembly 74 may be disposed on the second support structure 720 and may include a second printed circuit board 740 (e.g., a PCB or a PBA). The second substrate assembly 74 may include various electronic components electrically connected to the second printed circuit board 740. For example, electronic components located in the inner space of the second housing 22 (refer to FIG. 2A) may be disposed on the second printed circuit board 740 or may be electrically connected to the second printed circuit board 740 through an electrical path such as a cable or FPCB. For example, the second substrate assembly 74 may include electronic components disposed on the second printed circuit board 740, and an electromagnetic shielding member 741 (e.g., a shield can) that covers the electronic components. For example, components such as the first camera module 305 or the sub-display 310 (refer to FIG. 2F or FIG. 3A) may be electrically connected to one or more connectors 742 disposed on the second printed circuit board 740 by using an electrical path (e.g., FPCB) (not illustrated). In an embodiment, the first printed circuit board 730 and the second printed circuit board 740 may be electrically connected by using a flexible electrical path (e.g., FPCB) (not illustrated) located in the interior space of the electronic device 2 across the folding part between the first housing 21 (refer to FIG. 2A) and the second housing 22 (refer to FIG. 2A). In an embodiment, the first printed circuit board 730, the first camera module 305, and the second battery 76 may be located on the second support structure 720 so as not to substantially overlap when viewed from above (e.g., in the +z-axis direction) of the fourth cover area ⓓ (or the second rear cover 221) (refer to FIG. 2F).

According to various embodiments, the first substrate assembly 73 or the second substrate assembly 74 may include a primary PCB (or main PCB or master PCB), a secondary PCB (or slave PCB) disposed partially overlapping the primary PCB, and/or an interposer substrate between the primary PCB and the secondary PCB. For example, the first printed circuit board 730 or the second printed circuit board 740 may be a primary PCB.

Referring to FIGS. 7, 9, 10, 11, and 12 in an embodiment, the third support structure 9 may include a third surface 9A and a fourth surface 9B located opposite to the third surface 9A. The third surface 9A may substantially face the third cover area ⓒ (or the first rear cover 211) (refer to FIG. 2F) of the electronic device 2. The fourth surface 9B may substantially face the first support structure 710. The third support structure 9 may be coupled to the first support structure 710. In an embodiment, the third support structure 9 may at least partially overlap the first printed circuit board 730 when viewed from above on the third surface 9A (e.g., when viewed in the +z-axis direction). For example, the first printed circuit board 730 disposed on the first support structure 710 may include a first area overlapping the third support structure 9 and a second area not overlapping the third support structure 9 when viewed from above the third surface 9A. The first area of the first printed circuit board 730 may be located between the fourth surface 9B and the third support structure 9 and the first support structure 710.

In an embodiment, the third support structure 9 and the first area of the first printed circuit board 730 may be coupled to the first support structure 710 by using screw fastening. In an embodiment, the fourth surface 9B of the third support structure 9 may contribute to slimming of the stacked structure including the first support structure 710, the first substrate assembly 73, and the third support structure 9 by including the first area of the first printed circuit board 730, or a recess (or recess structure) or one or more openings 902 into which one or more electronic components located in the first area may be inserted. In an embodiment, the third support structure 9 may not overlap the plurality of second camera modules 306 when viewed from above the third cover area ⓒ (or the first rear cover 211) (refer to FIG. 2F). In some embodiments, a part of the camera bracket 3061 may be located between the fourth surface 9B of the third support structure 9 and the first support structure 710. The part of the camera bracket 3061 located between the fourth surface 9B of the third support structure 9 and the first support structure 710 and the third support structure 9 may be coupled to the first support structure 710 by using screw fastening. The third support structure 9 may include a plurality of screw holes 901 corresponding to the plurality of screws.

According to an embodiment, the first substrate assembly 73 may include one or more flexible conductive members disposed on the first printed circuit board 730 corresponding to the first conductive part 801, the second conductive part 802, the third conductive part 803, the fourth conductive part 804, the fifth conductive part 805, or the sixth conductive part 806 included in the first side member 212. The flexible conductive member may include, for example, a conductive clip (e.g., a conductive member including a resilient structure), a pogo pin, a spring, a conductive poron, a conductive rubber, a conductive tape, or a conductive connector. The first conductive part 801, the second conductive part 802, the third conductive part 803, the fourth conductive part 804, the fifth conductive part 805, or the sixth conductive part 806 may be electrically connected to the first printed circuit board 730 through at least one flexible conductive member to operate as an antenna radiator. The first conductive part 801, the second conductive part 802, the third conductive part 803, the fourth conductive part 804, the fifth conductive part 805, or the sixth conductive part 806 may be electrically connected to a ground plane included in the first printed circuit board 730 through at least one flexible conductive member.

In the illustrated example, the first conductive part 801 may be electrically connected to a wireless communication circuit disposed on the first printed circuit board 730 through one of the first flexible conductive member 733 and the second flexible conductive member 734, and may be electrically connected to a ground plane included in the first printed circuit board 730 through the other one of the first flexible conductive member 733 and the second flexible conductive member 734. In an embodiment, the third support structure 9 may include a first opening 903 in the form of a notch provided corresponding to the first flexible conductive member 733 and a second opening 904 in the form of a notch provided corresponding to the second flexible conductive member 734. The third support structure 9 may include a third opening 905 provided corresponding to the third flexible conductive member 735 electrically connected to the second conductive part 802 in substantially the same manner as the first opening 903 or the second opening 904 located corresponding to the first conductive part 801. The third support structure 9 may include a fourth opening 906 provided corresponding to a fourth flexible conductive member 736 electrically connected to the sixth conductive part 806 in substantially the same manner as the first opening 903 or the second opening 904 located corresponding to the first conductive part 801.

According to an embodiment, the antenna structure 4 may be located on the third surface 9A of the third support structure 9. For example, the antenna structure 4 may be disposed on the third support structure 9 by using bonding including an adhesive member (or adhesive material). The adhesive member may be located between the second surface 41B of the antenna structure 4 and the third surface 9A of the third support structure 9, so that the second surface 41B and the third surface 9A may be coupled to each other by an adhesive member. The adhesive member may have various forms such as, for example, double-sided tape. The third support structure 9 may be an internal structure located in the inner space of the electronic device 2 corresponding to the first housing 21 to support the antenna structure 4, and in some embodiments, may be referred to by various other terms such as 'third support member', 'antenna support member', 'antenna support structure', 'antenna bracket', or 'rear case'.

According to an embodiment, the first part 411 (refer to FIG. 4) of the antenna structure 4 may be coupled to the third support structure 9. For example, the adhesive member may be located between the third support structure 9 and the first part 411 of the antenna structure 4. The second part 412 (refer to FIG. 4) of the antenna structure 4 may be located facing the first printed circuit board 730, and the connector 42 disposed on the second part 412 may be electrically connected to a connector (not illustrated) disposed on the first printed circuit board 730.

According to an embodiment, the third surface 9A of the third support structure 9 may include a seating structure in the form of a recess so that the first part 411 of the antenna structure 4 may be stably located on the third support structure 9. The seating structure in the form of a recess may contribute to slimming of the stacked structure including the third support structure 9 and the antenna structure 4. In an embodiment, a surface (hereinafter, referred to as a 'seating surface') 9C on which the first part 411 of the antenna structure 4 is disposed among the seating structures may be substantially planar. The seating surface 9C may, for example, substantially face the third cover area ⓒ (or the first rear cover 211) (refer to FIG. 2F) (e.g., in the −z-axis direction) of the electronic device 2. The adhesive member may be disposed, for example, between the first part 411 of the antenna structure 4 and the seating surface 9C. The seating surface 9C may contribute so that the first part 411 of the antenna structure 4 and the conductive pattern (e.g., the first antenna element ①, the second antenna element ②, the third antenna element ③, a part of the first path pattern PP1, a part of the second path pattern PP2, a part of the third path pattern PP3, or the second conductive layer 502 of FIG. 5 or FIG. 6) included in the first part 411 may be located in a substantially planar shape.

According to an embodiment, the third support structure 9 may include a non-conductive support structure 91 and a conductive pattern 92 disposed on the non-conductive support structure 91. In some embodiments, the non-conductive support structure 91 may be referred to by various other terms such as 'non-conductive member', 'non-metal member', 'non-conductive structure', or 'non-metal structure'. The conductive pattern 92 may be disposed, for example, on a surface 91A of the non-conductive support structure 91 that substantially faces the third cover area ⓒ (or the first rear cover 211) (refer to FIG. 2F) of the electronic device 2. The third surface 9A of the third support structure 9 may include, for example, an area provided by the non-conductive support structure 91, and an area provided by the conductive pattern 92. The fourth surface 9B of the third support structure 9 may be provided, for example, by the non-conductive support structure 91.

In an embodiment, the conductive pattern 92 may be implemented by laser direct structuring (LDS). The LDS may be, for example, a method of drawing (or designing) a pattern on the non-conductive support structure 91 by using a laser, and plating a conductive material such as copper or nickel thereon to form a conductive pattern. In some embodiments, the conductive pattern 92 is not limited to LDS and may be disposed on the non-conductive support structure 91 by using a variety of other methods, such as printing or coating. In some embodiments, the conductive pattern 92 may include a conductive sheet disposed on the non-conductive support structure 91, and in this case, a polymer adhesive material may be located between the conductive sheet and the non-conductive support structure 91. In some embodiments, the non-conductive support structure 91 coupled to the conductive pattern 92 may be implemented by using insert injection molding. Although an example in which the third support structure 9 includes the integrated conductive pattern 92 is provided, the third support structure 9 is not limited thereto, and may be implemented to include a plurality of conductive patterns by replacing the integrated conductive pattern 92.

According to an embodiment, at least a part of the seating surface 9C of the third surface 9A of the third support structure 9 on which the first part 411 of the antenna structure 4 is disposed may be formed by the conductive pattern 92. In some embodiments, although not illustrated, the third support structure 9 of the illustrated example may be deformed such that a partial area of the seating surface 9C is provided by the conductive pattern 92 and the remaining area of the seating surface 9C is provided by the non-conductive support structure 91.

According to various embodiments, at least a part of the conductive pattern 92 may be located inside the non-conductive support structure 91.

In some embodiments, the non-conductive support structure 91 may have a form in which a plurality of non-conductive structures are coupled. In some embodiments, at least a part of the conductive pattern 92 may be located between a plurality of non-conductive structures.

According to an embodiment, the third support structure 9 may include one or more protrusions 911, 912, and 913 protruding with respect to the third surface 9A. The antenna structure 4 may include one or more openings corresponding to one or more protrusions 911, 912, and 913. When the antenna structure 4 is coupled to the third support structure 9, one or more protrusions 911, 912, and 913 may be located through one or more openings of the antenna structure 4. The one or more protrusions 911, 912, and 913 and one or more openings provided to the antenna structure 4 corresponding thereto may guide, for example, the antenna structure 4 to be located in a specified area of the third support structure 9 or may contribute to a stable positioning of the antenna structure 4 on the third support structure 9.

According to an embodiment, the conductive pattern 92 may operate as a ground plane or an antenna ground for the antenna structure 4. The conductive pattern 92 may contribute to expanding or strengthening the antenna ground for the antenna structure 4 without, for example, expanding the ground plane (e.g., the second conductive layer 502 of FIG. 5 or FIG. 6) included in the antenna structure 4.

According to an embodiment, when viewed from above (e.g., when viewed in the +z-axis direction) of the first surface 41A of the antenna structure 4, the conductive pattern 92 may at least partially overlap the first antenna element ①, the second antenna element ②, and/or the third antenna element ③. The conductive pattern 92 may at least partially overlap the second conductive layer 502 when viewed from above the first surface 41A of the antenna structure 4. The conductive pattern 92 may be further extended than the second conductive layer 502 and disposed in at least one direction substantially perpendicular to a direction (e.g., in the −z-axis direction) to which the first surface 41A faces when viewed from above the first surface 41A of the antenna structure 4. The conductive pattern 92 may extend or strengthen the antenna ground for the first antenna element ①, the second antenna element ②, and/or the third antenna element ③, for example, compared to a comparative example that does not include the conductive pattern 92. For example, the conductive pattern 92 may improve antenna radiation performance for the first antenna element ①, the second antenna element ②, and/or the third antenna element ③. For example, the conductive pattern 92 may reduce electromagnetic effects (e.g., electromagnetic interference (EMI)) of electrical elements around the antenna structure 4 on the first antenna element ①, the second antenna element ②, and/or the third antenna element ③. For example, the conductive pattern 92 may reduce electromagnetic effects of the first antenna element ①, the second antenna element ②, and/or the third antenna element ③ on electrical elements around the antenna structure 4. Hereinafter, what is referred to as a 'comparative example' is only provided for comparison with the examples of the disclosure, and does not have a preceding position with respect to various embodiments of the disclosure.

Figure 13:
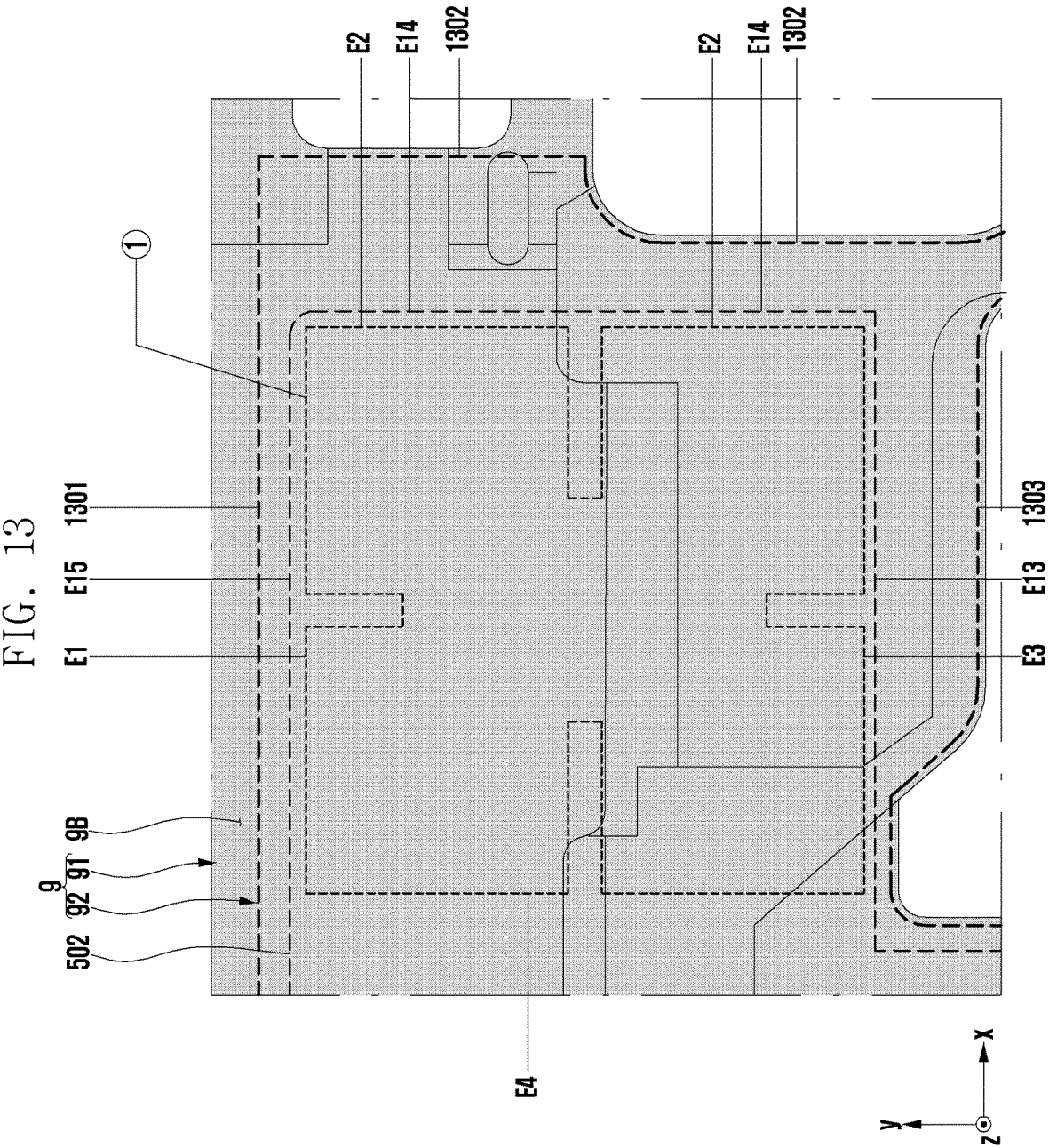
FIG. 13 is an enlarged view of a part indicated by reference numeral 'E' in FIG. 12 according to an embodiment.
Figure 14:
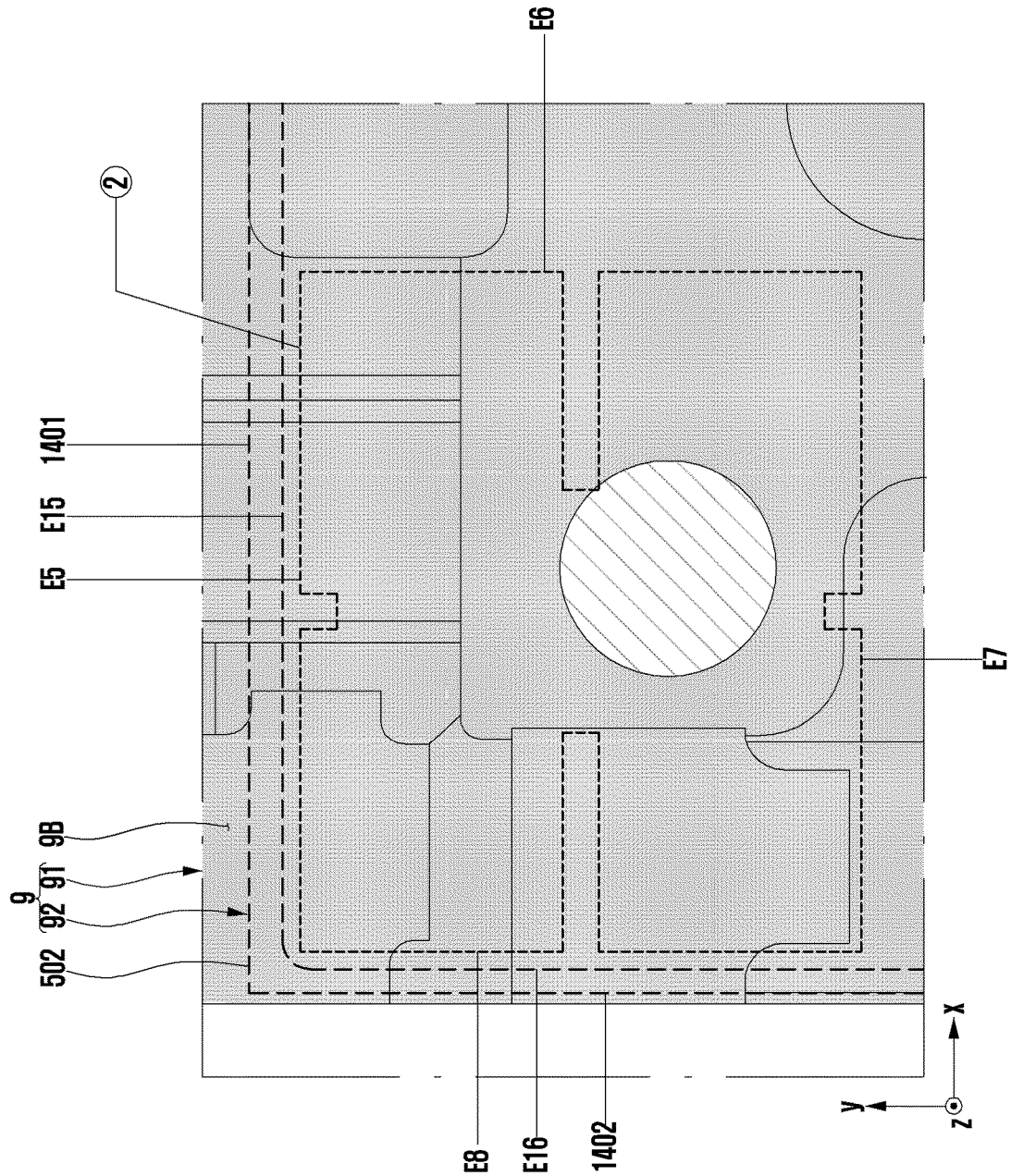
FIG. 14 is an enlarged view of a part indicated by reference numeral 'F' in FIG. 12 according to an embodiment.
Figure 15:
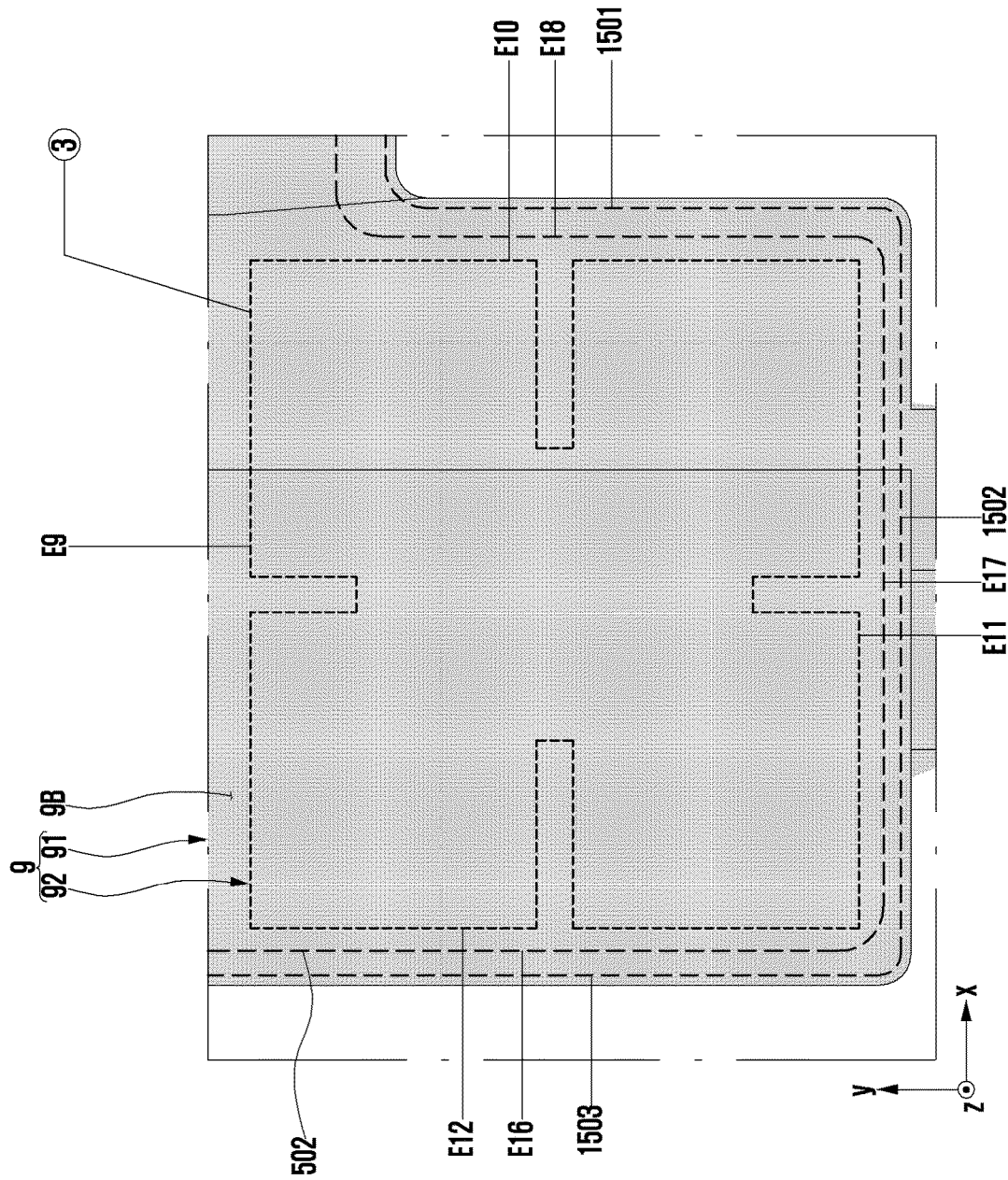
FIG. 15 is an enlarged view of a part indicated by reference numeral G' in FIG. 12 according to an embodiment.

FIG. 13 illustrates an enlarged view of a part indicated by reference numeral 'E' in FIG. 12 according to an embodiment. FIG. 14 illustrates an enlarged view of a part indicated by reference numeral 'F' in FIG. 12 according to an embodiment. FIG. 15 illustrates an enlarged view of a part indicated by reference numeral G' in FIG. 12 according to an embodiment.

There may be restrictions in extending the printed circuit board 41 (refer to FIG. 11) included in the antenna structure 4 and the second conductive layer 502 included in the printed circuit board 41 in the limited antenna design space (or antenna mounting space) in the electronic device 2. According to an embodiment, the conductive pattern 92 may contribute to expanding or strengthening the antenna ground for the antenna structure 4 without extending the second conductive layer 502.

Referring to FIG. 13, in an embodiment, when viewed from above the fourth surface 9B (e.g., in the −z-axis direction) of the third support structure 9, the conductive pattern 92 may be provided to include an edge 1301 spaced apart from the fifteenth edge E15 corresponding to the first edge E1 of the first antenna element ① of the second conductive layer 502 in the +y-axis direction. For example, the fifteenth edge E15 of the second conductive layer 502 may be at least partially located between the first edge E1 of the first antenna element ① and the edge 1301 of the conductive pattern 92 when viewed from above the fourth surface 9B of the third support structure 9.

According to an embodiment, when viewed from above the fourth surface 9B (e.g., in the −z-axis direction) of the third support structure 9, the conductive pattern 92 may be provided to include an edge 1302 spaced apart from the fourteenth edge E14 corresponding to the second edge E2 of the first antenna element ① of the second conductive layer 502 in the +x-axis direction. For example, the fourteenth edge E14 of the second conductive layer 502 may be at least partially located between the second edge E2 of the first antenna element ① and the edge 1302 of the conductive pattern 92 when viewed from above the fourth surface 9B of the third support structure 9.

According to an embodiment, when viewed from above the fourth surface 9B (e.g., in the −z-axis direction) of the third support structure 9, the conductive pattern 92 may be provided to include an edge 1303 spaced apart from the thirteenth edge E13 corresponding to the third edge E3 of the first antenna element ① of the second conductive layer 502 in the −y-axis direction. For example, the thirteenth edge E13 of the second conductive layer 502 may be at least partially located between the third edge E3 of the first antenna element ① and the edge 1303 of the conductive pattern 92 when viewed from above the fourth surface 9B of the third support structure 9.

When a radiation current (or electromagnetic signals) (e.g., UWB signals) is provided (or fed) to the first antenna element ①, an electromagnetic field (electric field and magnetic field) distributed around the first antenna element ① may be formed. A part of the electromagnetic field formed by the first antenna element ① may proceed in front of (e.g., in a direction in which the first surface 41A faces) the first surface 41A (refer to FIG. 11) of the antenna structure 4. In an embodiment, the conductive pattern 92 may expand or strengthen the antenna ground for the first antenna element ① compared to a comparative example that does not include the conductive pattern 92. The conductive pattern 92 may improve the antenna radiation performance of the first antenna element ①. For example, the conductive pattern 92 may contribute so that energy may be radiated from the first antenna element ① in a direction in which the first surface 41A of the antenna structure 4 faces. For example, the conductive pattern 92 may contribute to forming a beam in which a relatively large amount of energy is emitted in a direction in which the first surface 41A faces through the first antenna element ①. For example, the conductive pattern 92 may reduce electromagnetic influence (e.g., electromagnetic interference (EMI)) that electrical elements around the antenna structure 4 have on the first antenna element ①. For example, the conductive pattern 92 may reduce the loss by shielding electromagnetic noise with respect to the signal flow or the power flow to the first antenna element ①. For example, the conductive pattern 92 may reduce the electromagnetic influence of the first antenna element ① on the electrical elements around the antenna structure 4.

According to an embodiment, when the radiation current is provided (or fed) to the first antenna element ①, electromagnetic waves may be substantially radiated from the edge of the first antenna element ① (e.g., the first edge E1, the second edge E2, the third edge E3, and the fourth edge E4). The conductive pattern 92 may contribute so that electromagnetic waves radiated from the edge of the first antenna element ① proceed in a direction toward which the first surface 41A (refer to FIG. 11) of the antenna structure 4 faces. Because the first edge E1, the second edge E2, and the third edge E3 are located adjacent to the edge of the printed circuit board 41 compared to the fourth edge E4, the antenna ground area corresponding to the first edge E1, the second edge E2, and the third edge E3 of the second conductive layer 502 may be smaller than an antenna ground area corresponding to the fourth edge E4 of the second conductive layer 502. In an embodiment, the antenna ground area corresponding to the first edge E1, the second edge E2, or the third edge E3 may be expanded or strengthened by using the conductive pattern 92 without expanding the second conductive layer 502. For example, the conductive pattern 92 may substantially contribute so that electromagnetic waves radiated from the first edge E1, the second edge E2, and the third edge E3 located adjacent to the edge of the printed circuit board 41 of the first antenna element ① may proceed in the direction that the first surface 41A of the antenna structure 4 faces. The conductive pattern 92 may reduce the effect (e.g., electromagnetic interference (EMI)) of electrical elements around the antenna structure 4 on electromagnetic waves radiated from the edge of the first antenna element ①. The conductive pattern 92 may reduce the effect of electromagnetic waves radiated from the edge of the first antenna element ① on electrical elements around the first antenna element ①.

According to an embodiment, the conductive part (e.g., the first conductive part 801, the second conductive part 802, or the sixth conductive part 806 of FIG. 7) located at least partially on the first side part S1 corresponding to the first edge E1 of the first antenna element ① may operate as an antenna radiator. For example, in order to improve the antenna radiation performance with respect to the first antenna element ①, there may be a comparative example in which the fifteenth edge E15 corresponding to the first edge E1 of the first antenna element ① of the second conductive layer 502 is expanded in the +y-axis direction. In the case of the comparative example, as the second conductive layer 502 is close to the first conductive part 801, the second conductive part 802, or the sixth conductive part 806, antenna radiation performance of an antenna using the second conductive part 802 or the sixth conductive part 806 as an antenna radiator may be deteriorated. In an embodiment, the conductive pattern 92 may reduce deterioration of antenna radiation performance with respect to an antenna using the first conductive part 801, the second conductive part 802, or the sixth conductive part 806 as an antenna radiator compared to the comparative example while expanding or strengthening the antenna ground for the first antenna element ① without expanding the second conductive layer 502, Referring to FIG. 14, in an embodiment, when viewed from above (e.g., in the −z-axis direction) of the fourth surface 9B of the third support structure 9, the conductive pattern 92 may be provided to include an edge 1401 spaced apart from the fifteenth edge E15 corresponding to the fifth edge E5 of the second antenna element ② of the second conductive layer 502 in the +y-axis direction. For example, the fifteenth edge E15 of the second conductive layer 502 may be at least partially located between the fifth edge E5 of the second antenna element ② and the edge 1401 of the conductive pattern 92 when viewed from above the fourth surface 9B of the third support structure 9.

According to an embodiment, when viewed from above (e.g., in the −z-axis direction) of the fourth surface 9B of the third support structure 9, the conductive pattern 92 may be provided to include an edge 1402 spaced apart from the sixteenth edge E16 corresponding to the eighth edge E8 of the second antenna element ② of the second conductive layer 502 in the −x-axis direction. For example, the sixteenth edge E16 of the second conductive layer 502 may be at least partially located between the eighth edge E8 of the second antenna element ② and the edge 1402 of the conductive pattern 92 when viewed from above the fourth surface 9B of the third support structure 9.

When a radiation current (or electromagnetic signals) (e.g., UWB signals) is provided (or fed) to the second antenna element ②, an electromagnetic field (electric field and magnetic field) distributed around the second antenna element ② may be formed. A part of the electromagnetic field formed by the second antenna element ② may proceed in front of (e.g., in a direction in which the first surface 41A faces) the first surface 41A (refer to FIG. 11) of the antenna structure 4. In an embodiment, the conductive pattern 92 may expand or strengthen the antenna ground for the second antenna element ② compared to a comparative example that does not include the conductive pattern 92. The conductive pattern 92 may improve the antenna radiation performance of the second antenna element ②. For example, the conductive pattern 92 may contribute so that energy may be radiated from the second antenna element ② in a direction in which the first surface 41A of the antenna structure 4 faces. For example, the conductive pattern 92 may contribute to forming a beam in which a relatively large amount of energy is emitted in a direction in which the first surface 41A faces through the second antenna element ②. For example, the conductive pattern 92 may reduce electromagnetic influence (e.g., electromagnetic interference (EMI)) that electrical elements around the antenna structure 4 have on the second antenna element ②. For example, the conductive pattern 92 may reduce the loss by shielding electromagnetic noise with respect to the signal flow or the power flow to the second antenna element ②. For example, the conductive pattern 92 may reduce the electromagnetic influence of the second antenna element ② on the electrical elements around the antenna structure 4.

According to an embodiment, when the radiation current is provided (or fed) to the second antenna element ②, electromagnetic waves may be substantially radiated from the edge (e.g., the fifth edge E5, the sixth edge E6, the seventh edge E7, and the eighth edge E8) of the second antenna element ②. The conductive pattern 92 may contribute so that electromagnetic waves radiated from the edge of the second antenna element ② proceed in a direction toward which the first surface 41A (refer to FIG. 11) of the antenna structure 4 faces. Because the fifth edge E5 and the eighth edge E8 are located adjacent to the edge of the printed circuit board 41 compared to the sixth edge E6 and the seventh edge E7, the antenna ground area corresponding to the fifth edge E5 and the eighth edge E8 of the second conductive layer 502 may be smaller than an antenna ground area corresponding to the sixth edge E6 and the seventh edge E7 of the second conductive layer 502. In an embodiment, the antenna ground area corresponding to the fifth edge E5 and/or the eighth edge E8 may be expanded or strengthened by using the conductive pattern 92 without expanding the second conductive layer 502. For example, the conductive pattern 92 may substantially contribute so that electromagnetic waves radiated from the fifth edge E5 and the eighth edge E8 located adjacent to the edge of the printed circuit board 41 of the second antenna element ② may proceed in the direction that the first surface 41A of the antenna structure 4 faces. The conductive pattern 92 may reduce the effect (e.g., electromagnetic interference (EMI)) of electrical elements around the antenna structure 4 on electromagnetic waves radiated from the edge of the second antenna element ②. The conductive pattern 92 may reduce the effect of electromagnetic waves radiated from the edge of the second antenna element ② on electrical elements around the second antenna element ②.

According to an embodiment, the conductive part (e.g., the first conductive part 801 or the sixth conductive part 806 of FIG. 7) located at least partially on the first side part S1 corresponding to the fifth edge E5 of the second antenna element ② may operate as an antenna radiator. For example, in order to improve the antenna radiation performance with respect to the second antenna element ②, there may be a comparative example in which the fifteenth edge E15 corresponding to the fifth edge E5 of the second antenna element ② of the second conductive layer 502 is expanded in the +y-axis direction. In the case of the comparative example, as the second conductive layer 502 is close to the first conductive part 801 or the sixth conductive part 806, antenna radiation performance of an antenna using the first conductive part 801 or the sixth conductive part 806 as an antenna radiator may be deteriorated. In an embodiment, the conductive pattern 92 may reduce deterioration of antenna radiation performance with respect to an antenna using the first conductive part 801 or the sixth conductive part 806 as an antenna radiator compared to the comparative example while expanding or strengthening the antenna ground for the second antenna element ② without expanding the second conductive layer 502, Referring to FIG. 15, in an embodiment, when viewed from above (e.g., in the −z-axis direction) of the fourth surface 9B of the third support structure 9, the conductive pattern 92 may be provided to include an edge 1501 spaced apart from the eighteenth edge E18 corresponding to the tenth edge E10 of the third antenna element ③ of the second conductive layer 502 in the +y-axis direction. For example, the eighteenth edge E18 of the second conductive layer 502 may be at least partially located between the tenth edge E10 of the third antenna element ③ and the edge 1501 of the conductive pattern 92 when viewed from above the fourth surface 9B of the third support structure 9.

According to an embodiment, when viewed from above (e.g., in the −z-axis direction) of the fourth surface 9B of the third support structure 9, the conductive pattern 92 may be provided to include an edge 1502 spaced apart from the seventeenth edge E17 corresponding to the eleventh edge E11 of the third antenna element ③ of the second conductive layer 502 in the −y-axis direction. For example, the seventeenth edge E17 of the second conductive layer 502 may be at least partially located between the eleventh edge E11 of the third antenna element ③ and the edge 1502 of the conductive pattern 92 when viewed from above the fourth surface 9B of the third support structure 9.

According to an embodiment, when viewed from above (e.g., in the −z-axis direction) of the fourth surface 9B of the third support structure 9, the conductive pattern 92 may be provided to include an edge 1503 spaced apart from the sixteenth edge E16 corresponding to the twelfth edge E12 of the third antenna element ③ of the second conductive layer 502 in the −x-axis direction. For example, the sixteenth edge E16 of the second conductive layer 502 may be at least partially located between the twelfth edge E12 of the third antenna element ③ and the edge 1503 of the conductive pattern 92 when viewed from above the fourth surface 9B of the third support structure 9.

When a radiation current (or electromagnetic signals) (e.g., UWB signals) is provided (or fed) to the third antenna element ③, an electromagnetic field (electric field and magnetic field) distributed around the third antenna element ③ may be formed. A part of the electromagnetic field formed by the third antenna element ③ may proceed in front of (e.g., in a direction in which the first surface 41A faces) the first surface 41A (refer to FIG. 11) of the antenna structure 4. In an embodiment, the conductive pattern 92 may expand or strengthen the antenna ground for the third antenna element ③ compared to a comparative example that does not include the conductive pattern 92. The conductive pattern 92 may improve the antenna radiation performance of the third antenna element ③. For example, the conductive pattern 92 may contribute so that energy may be radiated from the third antenna element ③ in a direction in which the first surface 41A of the antenna structure 4 faces. For example, the conductive pattern 92 may contribute to forming a beam in which a relatively large amount of energy is emitted in a direction in which the first surface 41A faces through the third antenna element ③. For example, the conductive pattern 92 may reduce electromagnetic influence (e.g., electromagnetic interference (EMI)) that electrical elements around the antenna structure 4 have on the third antenna element ③. For example, the conductive pattern 92 may reduce the loss by shielding electromagnetic noise with respect to the signal flow or the power flow to the third antenna element ③. For example, the conductive pattern 92 may reduce the electromagnetic influence of the third antenna element ③ on the electrical elements around the antenna structure 4.

According to an embodiment, when the radiation current is provided (or fed) to the third antenna element ③, electromagnetic waves may be substantially radiated from the edge (e.g., the ninth edge E9, the tenth edge E10, the eleventh edge E11, and the twelfth edge E12) of the third antenna element ③. The conductive pattern 92 may contribute so that electromagnetic waves radiated from the edge of the third antenna element ③ proceed in a direction toward which the first surface 41A (refer to FIG. 11) of the antenna structure 4 faces. Because the tenth edge E10, the eleventh edge E11, and the twelfth edge E12 are located adjacent to the edge of the printed circuit board 41 compared to the ninth edge E9, the antenna ground area corresponding to the tenth edge E10, the eleventh edge E11, and the twelfth edge E12 E8 of the second conductive layer 502 may be smaller than an antenna ground area corresponding to the ninth edge E9 of the second conductive layer 502. In an embodiment, the antenna ground area corresponding to the tenth edge E10, the eleventh edge E11, and/or the twelfth edge E12 may be expanded or strengthened by using the conductive pattern 92 without expanding the second conductive layer 502. For example, the conductive pattern 92 may substantially contribute so that electromagnetic waves radiated from the tenth edge E10, the eleventh edge E11, and the twelfth edge E12 located adjacent to the edge of the printed circuit board 41 of the third antenna element ③ may proceed in the direction that the first surface 41A of the antenna structure 4 faces. The conductive pattern 92 may reduce the effect (e.g., electromagnetic interference (EMI)) of electrical elements around the antenna structure 4 on electromagnetic waves radiated from the edge of the third antenna element ③. The conductive pattern 92 may reduce the effect of electromagnetic waves radiated from the edge of the third antenna element ③ on electrical elements around the third antenna element ③.

According to various embodiments, the conductive pattern 92 may be referred to by various other terms such as a 'conductive layer', a 'metal layer', a 'ground layer', or a 'ground plane'.

According to an embodiment, the conductive pattern 92 may be in an electrically floating state that is not electrically connected to other electrical elements. In this case, the conductive pattern 92 may be referred to by various other terms such as a 'floating ground layer' or a 'floating ground plane'.

According to various embodiments, the conductive pattern 92 may be electrically connected to a ground plane included in the first substrate assembly 73 (refer to FIG. 7).

According to various embodiments, the conductive pattern 92 may be electrically connected to the second conductive layer 502.

Figure 16:
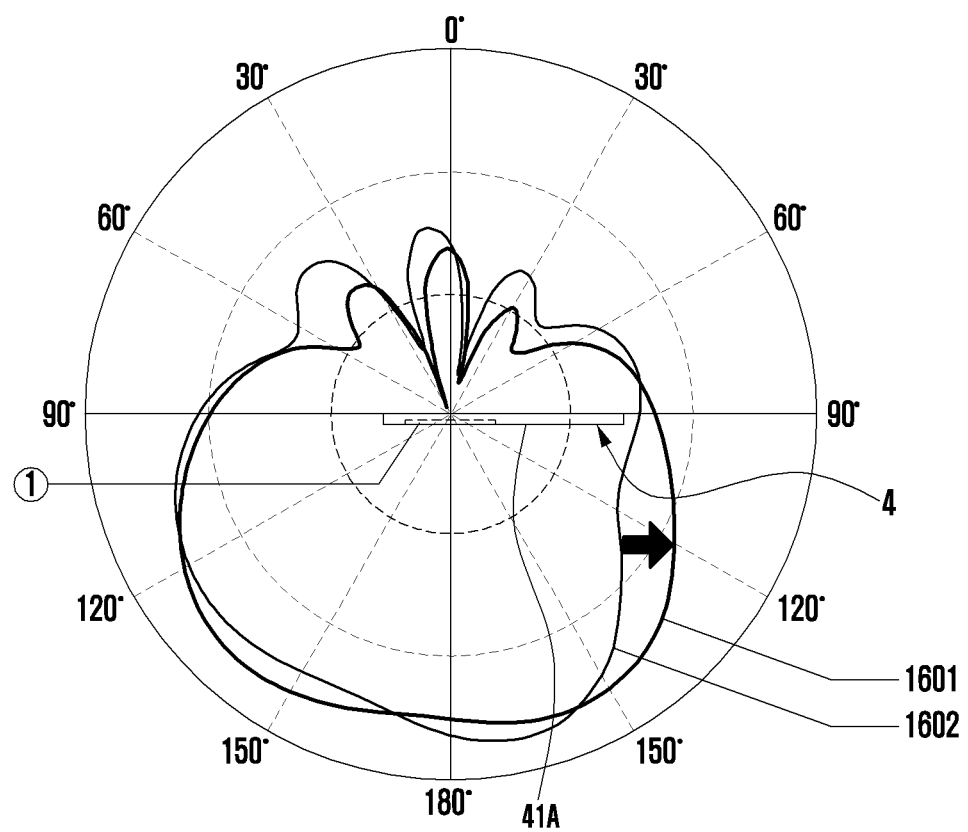
FIG. 16 is a diagram illustrating a radiation pattern of an antenna structure in an electronic device including a conductive pattern according to an embodiment and a radiation pattern of an antenna structure in an electronic device of a comparative example that does not include a conductive pattern.

FIG. 16 is a diagram illustrating a radiation pattern of an antenna structure 4 in an electronic device 2 including a conductive pattern 92 according to an embodiment and a radiation pattern of an antenna structure 4 in an electronic device of a comparative example that does not include a conductive pattern 92.

The electronic device of the comparative example is provided only for comparison with the electronic device 2 according to an embodiment, and does not have a preceding position with respect to various embodiments of the disclosure.

Referring to FIG. 16, reference numeral '1601' denotes a radiation pattern with respect to the first antenna element ① of the antenna structure 4 in the electronic device 2 according to an embodiment. Reference numeral '1602' denotes a radiation pattern with respect to the first antenna element ① of the antenna structure 4 in the electronic device of the comparative example. Compared to the electronic device of the comparative example, the electronic device 2 according to an embodiment may expand or strengthen the antenna ground for the first antenna element 1 by using the conductive pattern 92 located on the third support structure 9, so that a wider and more uniformly radiated radiation pattern (e.g., omnidirectional radiation pattern) may be formed in the space to which the first surface 41A of the antenna structure 4 faces.

FIG. 17A is a diagram illustrating a radiation pattern for a first antenna element ① according to a shape of a conductive area corresponding to the first antenna element ① (refer to FIG. 7) of an antenna structure 4 among conductive patterns (e.g., conductive pattern 92), according to an embodiment.

Referring to FIG. 17A, in a first example (refer to reference numeral '1710' in FIG. 17B), the conductive area 92A may include an edge located to be spaced apart from the thirteenth edge E13 of the second conductive layer 502 in the +y-axis direction, an edge located to be spaced apart from the fourteenth edge E14 of the second conductive layer 502 in the −x-axis direction, and an edge located to be spaced apart from the fifteenth edge E15 of the second conductive layer 502 in the +y-axis direction when viewed from above (e.g., in the +z-axis direction) of the first surface 41A of the antenna structure 4.

In a second example (refer to reference numeral '1720' in FIG. 17C), the conductive area 92B may include an edge substantially overlapping the thirteenth edge E13 of the second conductive layer 502, an edge substantially overlapping the fourteenth edge E14 of the second conductive layer 502, and an edge substantially overlapping the fifteenth edge E15 of the second conductive layer 502 when viewed from above the first surface 41A of the antenna structure 4.

In a third example (refer to reference numeral '1730' in FIG. 17D), the conductive area 92C may include an edge located to be spaced apart from the thirteenth edge E13 of the second conductive layer 502 in the −y-axis direction, an edge located to be spaced apart from the fourteenth edge E14 of the second conductive layer 502 in the +x-axis direction, and an edge located to be spaced apart from the fifteenth edge E15 of the second conductive layer 502 in the −y-axis direction when viewed from above the first surface 41A of the antenna structure 4.

In a fourth example (refer to reference numeral '1740' in FIG. 17E), the conductive area 92D may have edges further extended with respect to the thirteenth edge E13, the fourteenth edge E14, and the fifteenth edge E15 of the second conductive layer 502 compared to the conductive area 92D of the third example 1730.

Reference numeral '1711' indicates a radiation pattern for the first antenna element ① in the first example. Reference numeral '1721' indicates a radiation pattern for the first antenna element ① in the second example. Reference numeral '1731' indicates a radiation pattern for the first antenna element ① in the third example. Reference numeral '1741' indicates a radiation pattern for the first antenna element ① in the fourth example.

According to the expansion of the conductive area corresponding to the first antenna element ① of the conductive pattern 92, the antenna ground for the first antenna element ① is expanded or strengthened, so that the first antenna element ① may form a wider and more uniformly radiated radiation pattern (e.g., omnidirectional radiation pattern) into the space to which the first surface 41A of the antenna structure 4 faces. It may be understood that the first example, the second example, the third example, and the fourth example are only to present the effect on the radiation pattern of the antenna structure 4 according to the shape of the conductive pattern 92 according to an embodiment, and may be implemented in various forms to secure the radiation pattern or antenna radiation performance corresponding to the antenna structure 4.

Figure 18A:
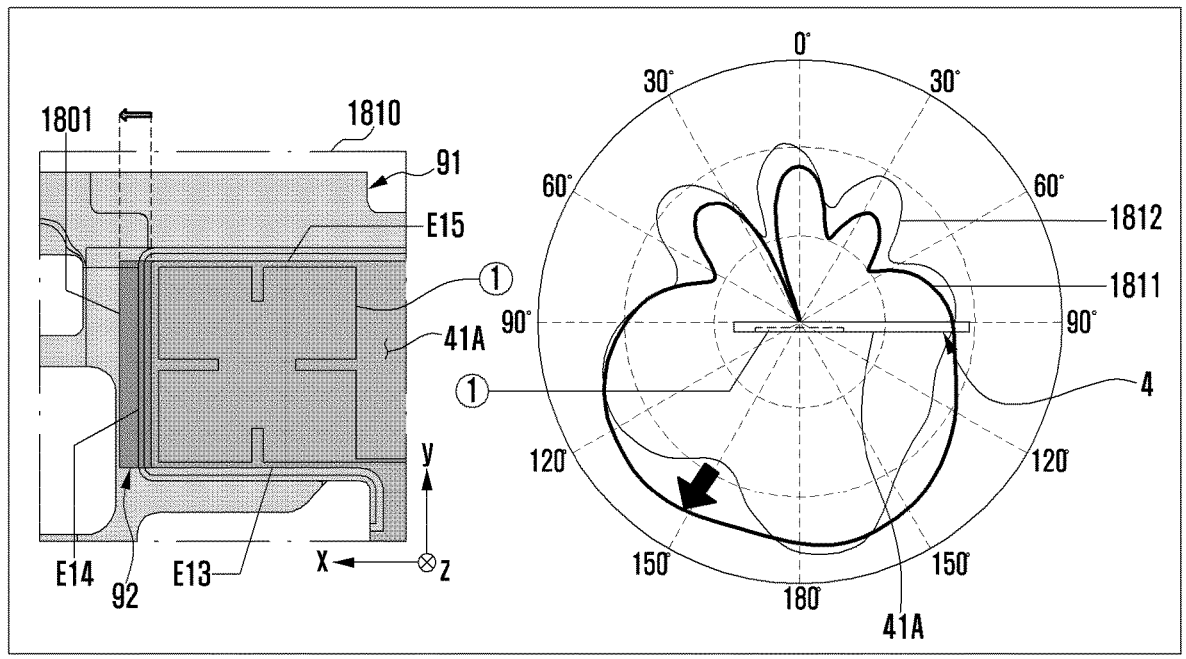
FIG. 18A is a diagram illustrating a radiation pattern for a first antenna element according to a shape of a conductive area corresponding to the first antenna element of an antenna structure among conductive patterns, according to an embodiment.
Figure 18B:
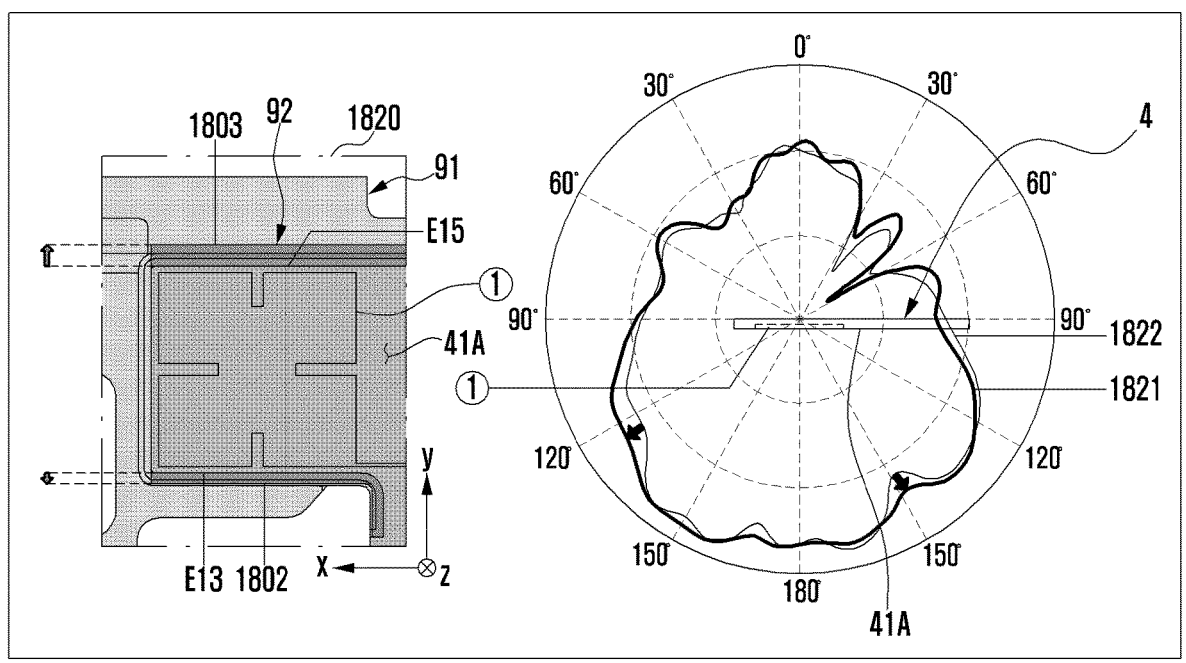
FIG. 18B is a diagram illustrating a radiation pattern for a first antenna element according to a shape of a conductive area corresponding to the first antenna element of an antenna structure among conductive patterns, according to an embodiment.

FIGS. 18A and 18B are diagrams illustrating a radiation pattern for a first antenna element ① according to a shape of a conductive area corresponding to the first antenna element ① (refer to FIG. 7) of an antenna structure 4 among conductive patterns (e.g., conductive pattern 92), according to an embodiment.

Referring to FIG. 18A, in a fifth example (refer to reference numeral '1810'), the conductive pattern 92 may include an edge 1801 located to be spaced apart from the fourteenth edge E14 of the second conductive layer 502 included in the antenna structure 4 in the +x-axis direction when viewed from above (e.g., in the +z-axis direction) of the first surface 41A of the antenna structure 4. Reference numeral '1811' indicates a radiation pattern for the first antenna element ① in the fifth example. Reference numeral '1812' indicates a radiation pattern for the first antenna element ① in the second example 1720 of FIG. 17C.

Referring to FIG. 18B, in a sixth example (refer to reference numeral '1820'), the conductive pattern 92 may include an edge 1802 located to be spaced apart from the thirteenth edge E13 of the second conductive layer 502 in the −y-axis direction and an edge 1803 located to be spaced apart from the fifteenth edge E15 of the second conductive layer 502 included in the antenna structure 4 in the +y-axis direction when viewed from above the first surface 41A of the antenna structure 4. Reference numeral '1821' indicates a radiation pattern for the first antenna element ① in the sixth example. Reference numeral '1822' indicates a radiation pattern for the first antenna element ① in the second example 1720 of FIG. 17C.

According to the expansion of the conductive area corresponding to the first antenna element ① of the conductive pattern 92, the antenna ground for the first antenna element ① is expanded or strengthened, so that the first antenna element ① may form a wider and more uniformly radiated radiation pattern (e.g., omnidirectional radiation pattern) into the space to which the first surface 41A of the antenna structure 4 faces. It may be understood that the fifth example and the sixth example are only to present the effect on the radiation pattern of the antenna structure 4 according to the shape of the conductive pattern 92 according to an embodiment, and may be implemented in various forms to secure the radiation pattern or antenna radiation performance corresponding to the antenna structure 4.

FIG. 19 is a diagram illustrating a state in which a third support structure 9 and an antenna structure 4 are coupled, according to various embodiments.

Referring to FIG. 19, in an embodiment, the third support structure 9 may include a non-conductive support structure 91, a first conductive pattern 1910, a second conductive pattern 1920, and/or a third conductive pattern 1930. The first conductive pattern 1910, the second conductive pattern 1920, and the third conductive pattern 1930 may replace the entire conductive pattern 92 according to the embodiment of FIG. 11. In an embodiment, the first conductive pattern 1910 may be disposed on the non-conductive support structure 91 corresponding to the first antenna element ① of the antenna structure 4, and as described with reference to FIG. 13, may contribute to expanding or strengthening the antenna ground for the first antenna element ① without expanding the second conductive layer 502 included in the antenna structure 4. In an embodiment, the second conductive pattern 1920 may be disposed on the non-conductive support structure 91 corresponding to the second antenna element ② of the antenna structure 4, and as described with reference to FIG. 14, may contribute to expanding or strengthening the antenna ground for the second antenna element ② without expanding the second conductive layer 502 included in the antenna structure 4. In an embodiment, the third conductive pattern 1930 may be disposed on the non-conductive support structure 91 corresponding to the third antenna element ③ of the antenna structure 4, and as described with reference to FIG. 15, may contribute to expanding or strengthening the antenna ground for the third antenna element ③ without expanding the second conductive layer 502 included in the antenna structure 4. In some embodiments, a portion of the third antenna element ③ extends beyond an outermost perimeter of the third conductive pattern 1930 (as shown).

According to various embodiments, although not illustrated, an integrated conductive pattern including any two of the first conductive pattern 1910, the second conductive pattern 1920, and the third conductive pattern 1930 may be implemented. Moreover, while a portion of the third antenna element ③ is shown to extend beyond an outermost perimeter of the third conductive pattern 1930, similar configurations (not shown) for the first antenna element ① and/or the second antenna element ② are within the contemplated scope of this disclosure. For example, either or both of the first antenna element ① and the second antenna element ② can include a portion that extends beyond a corresponding edge of the first conductive pattern 1910 and the second conductive pattern 1920, respectively.

Figure 20:
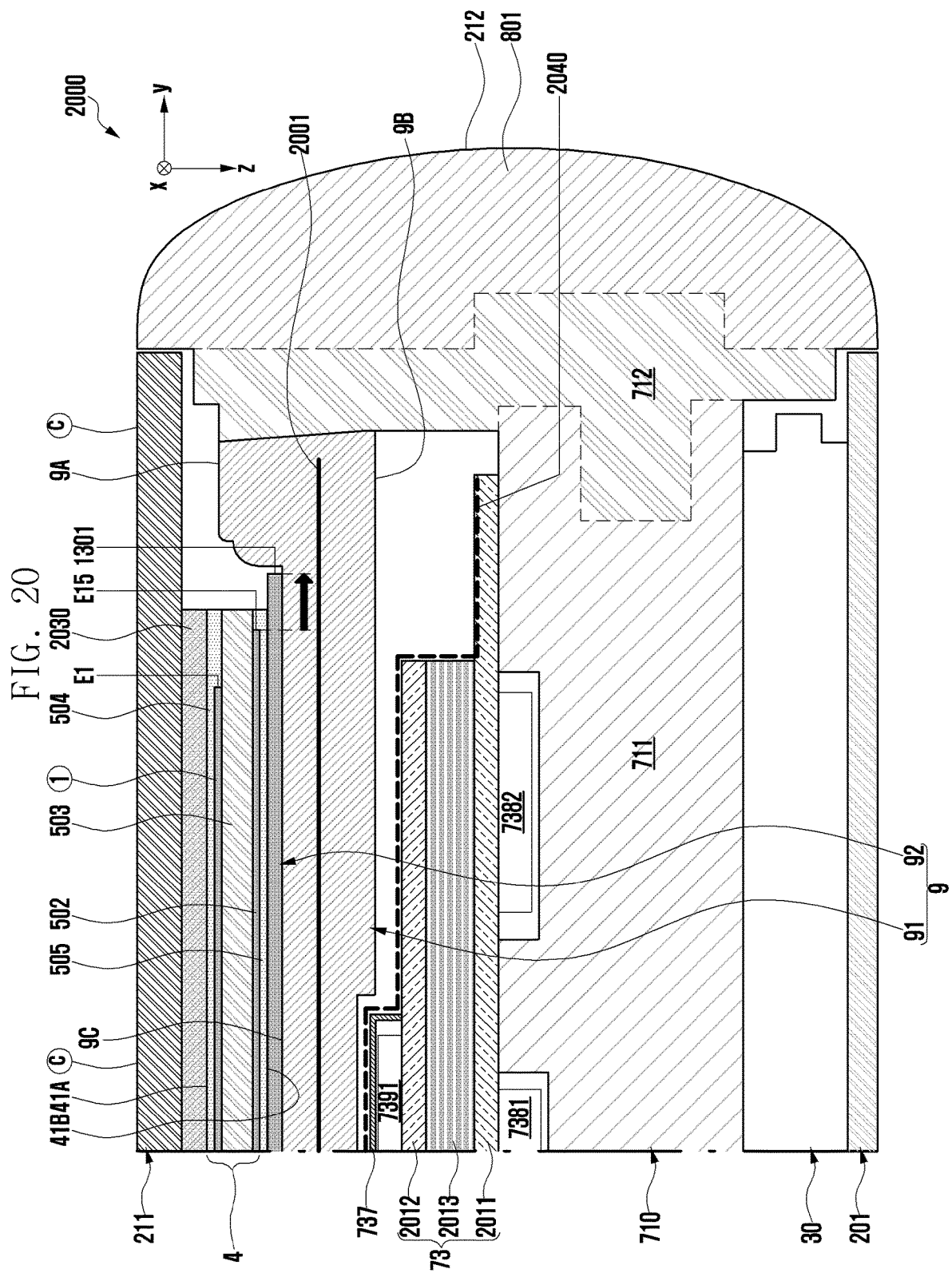
FIG. 20 is a cross-sectional view illustrating a part of an electronic device taken along line D-D' in FIG. 7, according to an embodiment.

FIG. 20 is a cross-sectional view 2000 illustrating a part of an electronic device 2 taken along line D-D' in FIG. 7, according to an embodiment.

Referring to FIG. 20, the electronic device 2 may include the first side member 212, the first support structure 710, the front cover 201, the first rear cover 211, the flexible display 30, the first substrate assembly 73, the antenna structure 4, the third support structure 9, and/or a buffer member 2030. A part corresponding to the first housing 21 (refer to FIG. 2A) of the flexible display 30 may be located between the first support structure 710 and the front cover 201. The first substrate assembly 73, the antenna structure 4, the third support structure 9, or the buffer member 2030 may be located between the first support structure 710 and the first rear cover 211. The third support structure 9 may be located between the first substrate assembly 73 and the first rear cover 211. The antenna structure 4 may be located at least partially between the third support structure 9 and the first rear cover 211. The buffer member 2030 may be located between the antenna structure 4 and the first rear cover 211.

According to an embodiment, the first substrate assembly 73 may include a primary PCB 2011, a secondary PCB 2012, and an interposer substrate 2013 between the primary PCB 2011 and the secondary PCB 2012. The primary PCB 2011 may include, for example, the first printed circuit board 730 illustrated in FIG. 7. The primary PCB 2011 may be disposed on the first support structure 710. The secondary PCB 2012 may be disposed at least partially overlapping the primary PCB 2011 when viewed from above the first rear cover 211 (e.g., when viewed in the −z-axis direction). The interposer substrate 2013 may electrically connect the primary PCB 2011 and the secondary PCB 2012. The interposer substrate 2013 may include, for example, a plurality of conductive vias (not illustrated) electrically connecting the primary PCB 2011 and the secondary PCB 2012. At least some of the plurality of conductive vias included in the interposer substrate 2013 may be a part of a signal line through which a signal is transmitted between at least one first electronic component disposed on the primary PCB 2011 and at least one second electronic component disposed on the secondary PCB 2012. Some of the plurality of conductive vias included in the interposer substrate 2013 may be a part of a ground path that electrically connects the ground plane included in the primary PCB 2011 and the ground plane included in the secondary PCB 2012.

According to an embodiment, the first support structure 710 may include the first conductive area 711 including a metal material, and a first non-conductive area 712 coupled to the first conductive area 711 and including a non-metal material. The first conductive area 711 of the first support structure 710 may be located at least partially between the first substrate assembly 73 and the flexible display 30. The first conductive area 711 may reduce electromagnetic effects (e.g., electromagnetic interference (EMI)) on the first substrate assembly 73 (or a plurality of electronic components 7381 and 7382 disposed on one surface facing the first support structure 710) and/or the flexible display 30. For example, the first conductive area 711 may reduce electromagnetic interference between the first substrate assembly 73 (or the plurality of electronic components 7381 and 7382) and the flexible display 30. In an embodiment, the first conductive area 711 may be electrically connected to a ground plane included in the first substrate assembly 73. The first conductive area 711 and the primary PCB 2011 may be electrically connected by using, for example, a conductive adhesive member (or conductive adhesive material) or a flexible conductive member (e.g., conductive clip, pogo pin, spring, conductive poron, conductive rubber, conductive tape, or conductive connector) located between the first conductive area 711 and the primary PCB 2011.

According to an embodiment, the antenna structure 4 may be disposed on the third support structure 9. The antenna structure 4 may include the first antenna element ①, the second conductive layer 502, the dielectric 503, a first coverlay 504, and/or a second coverlay 505. The first coverlay 504 may provide the first surface 41A of the antenna structure 4, and the second coverlay 505 may provide the second surface 41B of the antenna structure 4. The first coverlay 504 and the second coverlay 505 may, for example, protect the antenna structure 4 or a circuit (e.g., the first antenna element ①, the second antenna element ②, the third antenna element ③, the first path pattern PP1, the second path pattern PP2, the third path pattern PP3 of FIG. 11) included in the antenna structure 4 from the outside. The first coverlay 504 and the second coverlay 505 may include, for example, an insulating material or a non-conductive material. In an embodiment, the first coverlay 504 or the second coverlay 505 may include various insulating materials such as, for example, an epoxy-based solder mask insulating ink (e.g., photoimageable solder resist mask ink (PSR ink)). In some embodiments, the first coverlay 504 may include an electromagnetic shielding component (or electromagnetic shielding component), and in this case, may disposed so as not to overlap the first antenna element ①, the second antenna element ②, and the third antenna element ③ when viewed from above (e.g., in the +z-axis direction) of the first rear cover 211.

There may be restrictions in extending the second conductive layer 502 included in the antenna structure 4 in the limited antenna design space (or antenna mounting space) in the electronic device 2. In an embodiment, the conductive pattern 92 of the third support structure 9 may contribute to expanding or strengthening the antenna ground for the first antenna element ① without extending the second conductive layer 502. For example, the conductive pattern 92 may be disposed to extend beyond the second conductive layer 502 of the antenna structure 4 in a direction toward the first conductive part 801 of the first side member 212 when viewed from above the first rear cover 211 (e.g., +y-axis direction). In an embodiment, when viewed from above the first rear cover 211, the conductive pattern 92 may include an edge 1301 spaced apart from the fifteenth edge E15 of the second conductive layer 502 in the +y-axis direction. By using the conductive pattern 92 to expand or strengthen the antenna ground for the first antenna element ①, a wider and more uniformly radiated radiation pattern (e.g., omnidirectional radiation pattern) into the space to which the first surface 41A of the antenna structure 4 faces may be formed by the first antenna element ①.

According to various embodiments, the conductive pattern 92 may be a conductive adhesive member (e.g., a conductive double-sided tape) coupling the antenna structure 4 and the third support structure 9. In some embodiments, an area of the conductive adhesive member not covered by the antenna structure 4 may be provided with substantially no adhesiveness so that foreign substances such as dust do not stick. In some embodiments, an additional member may be disposed to prevent foreign substances such as dust from adhering to the adhesive area not covered by the antenna structure 4 among the conductive adhesive members.

According to various embodiments, the conductive pattern 92 may be at least partially located inside the third support structure 9 such as an imaginary line (a dashed-dotted line) indicated by reference numeral '2001'.

According to various embodiments, although not illustrated, the conductive pattern 92 may be disposed on the fourth surface 9B of the third support structure 9.

According to an embodiment, the buffer member 2030 may be disposed on the antenna structure 4 or disposed on the first rear cover 211. The buffer member 2030 may be located in a gap between the antenna structure 4 and the first rear cover 211. The buffer member 2030 may press the antenna structure 4 toward the first substrate assembly 73 between the antenna structure 4 and the first rear cover 211. The buffer member 2030 may reduce an influence (e.g., scratch) between the antenna structure 4 and the first rear cover 211. The buffer member 2030 may reduce a friction joint between the antenna structure 4 and the first rear cover 211. The buffer member 2030 may include a non-conductive material capable of reducing deterioration of antenna radiation performance when the antenna structure 4 transmits or receives a frequency signal toward the third cover area ⓒ of the electronic device 2. The buffer member 2030 may have a dielectric constant (e.g., low dielectric constant) capable of reducing deterioration of the antenna radiation performance of the antenna structure 4. The buffer member 2030 may, for example, be in the form of a film or include a flexible member such as a sponge.

Referring to FIGS. 7 and 20, in an embodiment, the conductive part (e.g., the first conductive part 801, the second conductive part 802, or the sixth conductive part 806) located at least partially on the first side part S1 corresponding to the first edge E1 of the first antenna element ① may operate as an antenna radiator. For example, in order to improve the antenna radiation performance with respect to the first antenna element ①, there may be a comparative example in which the fifteenth edge E15 corresponding to the first edge E1 of the first antenna element ① of the second conductive layer 502 is expanded in the +y-axis direction, and the conductive pattern 92 is omitted. In the case of the comparative example, as the second conductive layer 502 is close to the first conductive part 801, the second conductive part 802, or the sixth conductive part 806, antenna radiation performance of an antenna using the first conductive part 801, the second conductive part 802, or the sixth conductive part 806 as an antenna radiator may be deteriorated. An embodiment including the conductive pattern 92 may reduce deterioration of antenna radiation performance with respect to an antenna using the first conductive part 801, the second conductive part 802, or the sixth conductive part 806 as an antenna radiator compared to the comparative example while expanding or strengthening the antenna ground for the first antenna element ① without expanding the second conductive layer 502.

According to an embodiment, the electrical elements or set of electrical elements located below or beneath the third support structure 9 may provide a ground structure (or ground area) 2040 for the antenna structure 4. The first substrate assembly 73 may include, for example, one or more electronic components 7391 located between the first substrate assembly 73 and the third support structure 9. The first substrate assembly 73 may include, for example, an electromagnetic shielding member (e.g., a shield can) 737 that at least partially covers the one or more electronic components 7391. Components such as one or more electronic components 7391 including a metal component, a ground plane, or an electromagnetic shielding member 737 of the first substrate assembly 73 may form a ground structure 2040 that electromagnetically affects the antenna structure 4. The ground structure 2040, for example, when viewed from above the first rear cover 211 (e.g., when viewed in the +z-axis direction), may be understood or interpreted as a conductive surface, a conductive area, a ground surface, or a ground area that may at least partially overlap the antenna structure 4 and capable of affecting (e.g., reflecting) an electromagnetic field (or electromagnetic wave) radiated from the antenna structure 4. The ground structure 2040 may not be substantially flat compared to the second conductive layer 502 included in the antenna structure 4. For example, a first distance in which a part of the ground structure 2040 is spaced apart from the second surface 41B of the antenna structure 4 in the +z-axis direction may be different from a second distance in which another part of the ground structure 2040 is spaced apart from the second surface 41B of the antenna structure 4 in the +z-axis direction. The ground structure 2040 may operate as an antenna ground for the antenna structure 4. In the case of a comparative example that does not include the conductive pattern 92 disposed on the third support structure 9 and located between the antenna structure 4 and the ground 5 structure 2040, the ground structure 2040 may degrade antenna radiation performance with respect to the antenna structure 4. For example, in the comparative example, the ground structure 2040 may make it difficult to form a radiation pattern (or beam pattern) (e.g., an omnidirectional radiation pattern) that uniformly radiated into a space in a direction in which the first surface 41A of the antenna structure 4 faces. According to an embodiment, the conductive pattern 92 located between the antenna structure 4 and the ground structure 2040 may be flat with respect to the ground structure 2040. In an embodiment, the conductive pattern 92 may be implemented in consideration of an area flatter than the ground structure 2040 among the fourth surface 9B of the third support structure 9. According to an embodiment, the conductive pattern 92 located between the antenna structure 4 and the ground structure 2040 may contribute to securing antenna radiation performance by reducing the effect of the ground structure 2040 on the electromagnetic field (or electromagnetic wave) radiated from the antenna structure 4. According to an embodiment, the conductive pattern 92 located between the antenna structure 4 and the ground structure 2040 may contribute to form a radiation pattern (or beam pattern) (e.g., an omnidirectional radiation pattern) that is more widely and uniformly radiated to a space toward which the third cover area ⓒ of the electronic device faces.

According to an embodiment, the first rear cover 211 may be formed of a non-conductive material such as a polymer or glass. For example, the first rear cover 211 may have a dielectric constant (e.g., a low dielectric constant) (e.g., a relative dielectric constant of about 10 or less) that may reduce deterioration in antenna radiation performance when the antenna structure 4 transmits or receives a frequency signal toward the first rear cover 211.

According to various embodiments, although not illustrated, the antenna structure 4 may be located in the inner space of the first housing 21 so that the first surface 41A faces the front cover 201. In some embodiments, although not illustrated, the antenna structure 4 may be located in the inner space of the second housing 22 (refer to FIG. 2A) so that the first surface 41A faces the second cover area ⓑ (refer to FIG. 2A). The antenna structure 4 or a first part 411 (refer to FIG. 6) of the antenna structure 4 may be located, for example, on the rear surface of the flexible display 30 so that the first surface 41A faces the flexible display 30, or below or beneath the flexible display 30. In some embodiments, the antenna structure 4 or the first part 411 of the antenna structure 4 may be located aligned with a recess provided in the rear surface of the flexible display 30. The flexible display 30 may include a conductive layer (e.g., a copper layer) facing the first support structure 710 and the second support structure 720, and the conductive layer may, for example, function as electromagnetic shielding and/or heat dissipation. The recess provided in the rear surface of the flexible display 30 may be, for example, a groove in which areas corresponding to the antenna structure 4 (or the first part 411 of the antenna structure 4) or the plurality of antenna elements ①, ②, and ③ are removed among the conductive layers of the flexible display 30. The antenna structure 4 may receive a signal from the outside passing through the front cover 201 and the flexible display 30. A signal from the antenna structure 4 may be transmitted to the outside through the front cover 201 and the flexible display 30. In one embodiment, an air gap is located between the antenna structure 4 (or the first part 411 of the antenna structure 4) and the flexible display 30, so that the antenna radiation performance with respect to the antenna structure 4 may be secured. In an embodiment, the antenna structure 4 (or the first part 411 of the antenna structure 4) or a part of the flexible display 30 overlapping the plurality of antenna elements ①, ②, and ③ may include a pixel structure and/or a wiring structure different from other areas. For example, the antenna structure 4 (or the first part 411 of the antenna structure 4) or a part of the flexible display 30 overlapping the plurality of antenna elements ①, ②, and ③ may have different pixel densities compared to other areas. The pixel structure and/or wiring structure provided in the antenna structure 4 (or the first part 411 of the antenna structure 4) or a part of the flexible display 30 overlapping the plurality of antenna elements ①, ②, and ③ may reduce signal loss between the outside and the antenna structure 4.

According to various embodiments, although not illustrated, the antenna structure 4 may be located in the inner space of the second housing 22 (refer to FIG. 2A). The antenna structure 4 may be located so that the first surface 41A faces the second rear cover 221 (or the fourth cover area ⓓ) (refer to FIG. 2F). The antenna structure 4 or a first part 411 (refer to FIG. 6) of the antenna structure 4 may be located, for example, on the rear surface of the sub-display 310 so that the first surface 41A faces the sub-display 310, or below or beneath the sub-display 310. In some embodiments, the antenna structure 4 or the first part 411 of the antenna structure 4 may be located aligned with a recess provided in the rear surface of the sub-display 310. The sub-display 310 may include a conductive layer (e.g., a copper layer) facing the second support structure 720 (refer to FIG. 7), and the conductive layer may, for example, function as electromagnetic shielding and/or heat dissipation. The recess provided in the rear surface of the sub-display 310 may be, for example, a groove in which areas corresponding to the antenna structure 4 (or the first part 411 of the antenna structure 4) or the plurality of antenna elements ①, ②, and ③ are removed among the conductive layers of the sub-display 310. The antenna structure 4 may receive a signal from the outside passing through the second rear cover 221 and the sub-display 310. A signal from the antenna structure 4 may be transmitted to the outside through the second rear cover 221 and the sub-display 310. In one embodiment, an air gap is located between the antenna structure 4 (or the first part 411 of the antenna structure 4) and the sub-display 310, so that the antenna radiation performance with respect to the antenna structure 4 may be secured. In an embodiment, the antenna structure 4 (or the first part 411 of the antenna structure 4) or a part of the sub-display 310 overlapping the plurality of antenna elements ①, ②, and ③ may include a pixel structure and/or a wiring structure different from other areas. For example, the antenna structure 4 (or the first part 411 of the antenna structure 4) or a part of the sub-display 310 overlapping the plurality of antenna elements ①, ②, and ③ may have different pixel densities compared to other areas. The pixel structure and/or wiring structure provided in the antenna structure 4 (or the first part 411 of the antenna structure 4) or a part of the sub-display 310 overlapping the plurality of antenna elements ①, ②, and ③ may reduce signal loss between the outside and the antenna structure 4.

Figure 21:
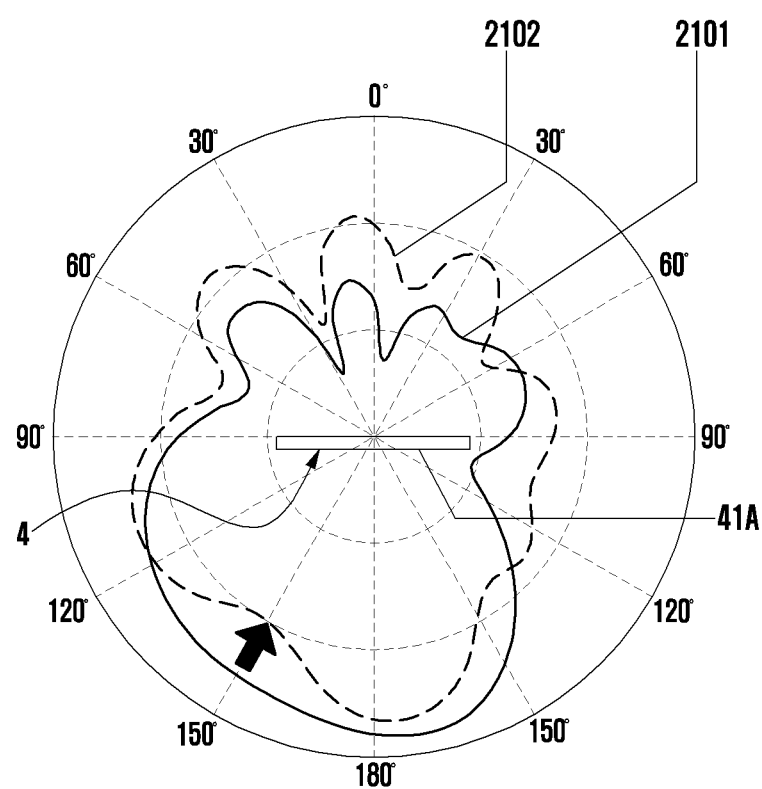
FIG. 21 is a diagram illustrating a radiation pattern of an antenna structure according to a dielectric constant of a first rear cover in an electronic device of a comparative example that does not include a conductive pattern, according to an embodiment.

FIG. 21 is a diagram illustrating a radiation pattern of an antenna structure 4 according to a dielectric constant of a first rear cover 211 in an electronic device of a comparative example that does not include a conductive pattern 92 (refer to FIG. 20), according to an embodiment.

Figure 22:
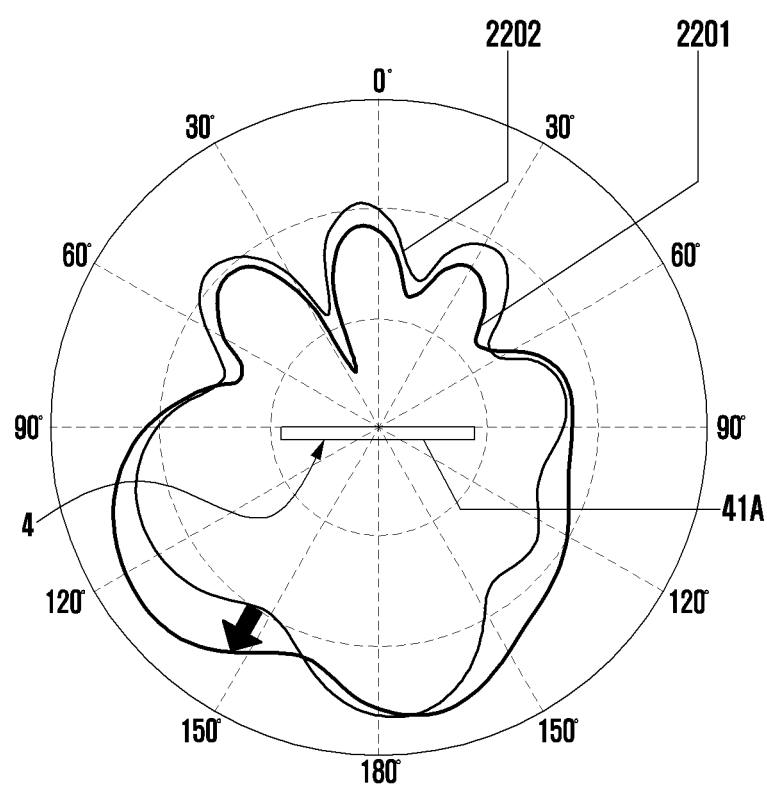
FIG. 22 is a diagram illustrating a radiation pattern for an antenna structure in an electronic device including a conductive pattern according to an embodiment, and a radiation pattern for an antenna structure in an electronic device of a comparative example that does not include a conductive pattern in a case where a first rear cover is formed of ceramic.

FIG. 22 is a diagram illustrating a radiation pattern 2201 for an antenna structure 4 in an electronic device 2 including a conductive pattern 92 according to an embodiment, and a radiation pattern 2202 for an antenna structure 4 in an electronic device of a comparative example that does not include a conductive pattern 92 in a case where a first rear cover 211 is formed of ceramic.

Figure 23B:
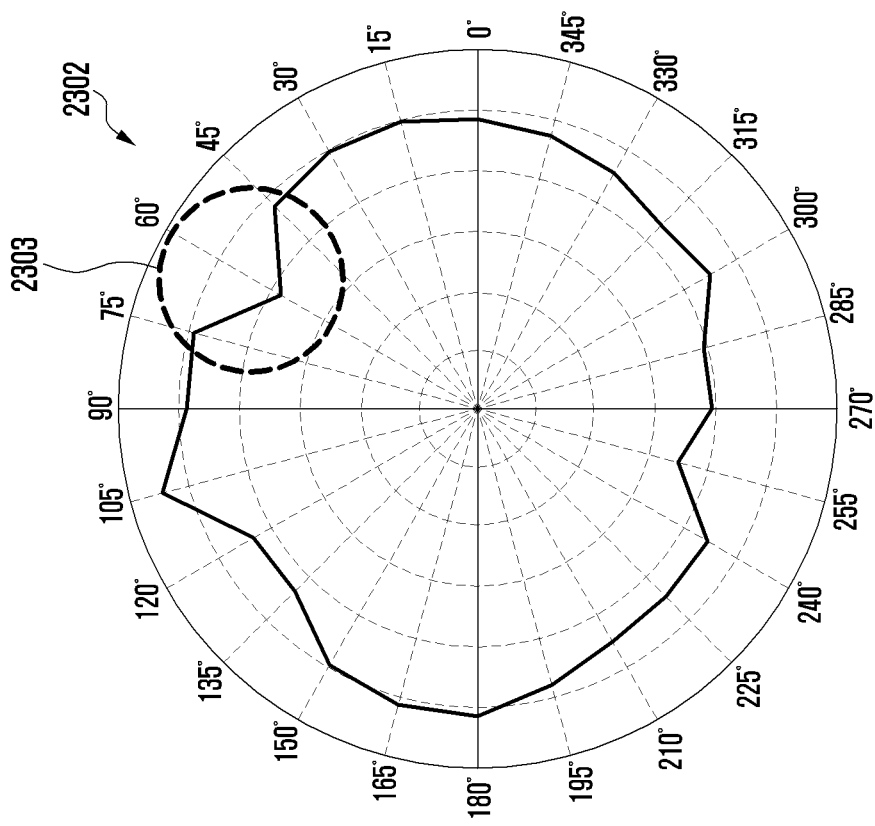
FIG. 23B is a diagram illustrating a radiation pattern for an antenna structure in an electronic device of a comparative example that does not include a conductive pattern.
Figure 23A:
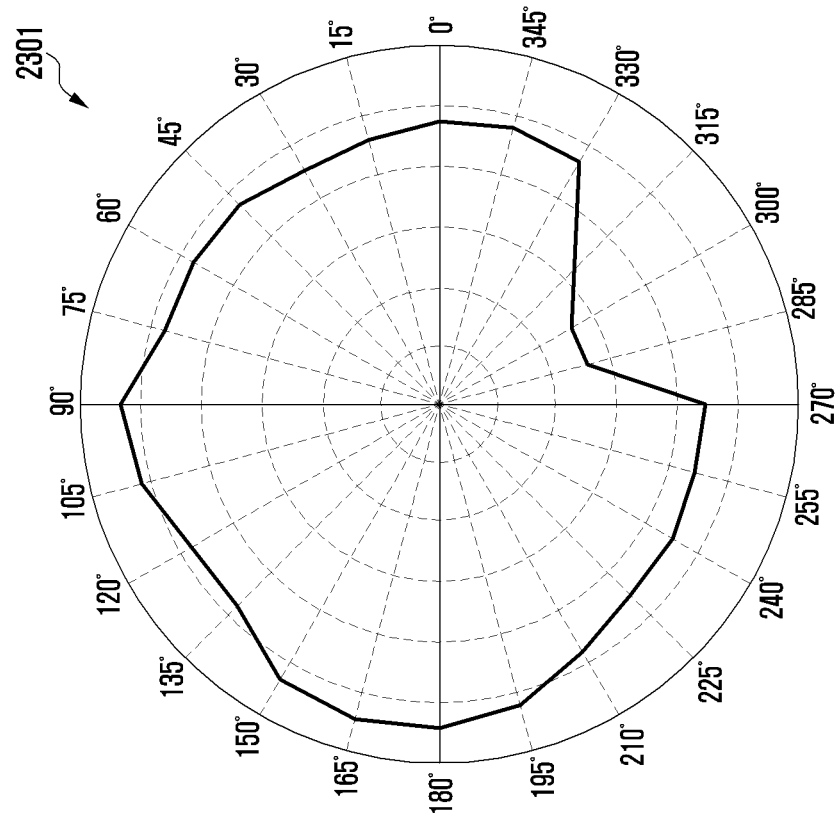
FIG. 23A is a diagram illustrating a radiation pattern for an antenna structure in an electronic device including a conductive pattern according to an embodiment.

FIG. 23A is a diagram illustrating a radiation pattern 2301 for an antenna structure 4 in an electronic device 2 including a conductive pattern 92 according to an embodiment, and FIG. 23B is a diagram illustrating a radiation pattern 2302 for an antenna structure 4 in an electronic device of a comparative example that does not include a conductive pattern 92.

Referring to FIG. 21, reference numeral '2101' indicates a radiation pattern for the antenna structure 4 in a case where the first rear cover 211 has a first dielectric constant in the comparative example. Reference numeral '2102' indicates a radiation pattern for the antenna structure 4 in a case where the first rear cover 211 has a second dielectric constant greater than the first dielectric constant in the comparative example. The first rear cover 211 may be formed of, for example, glass, and may have a relative dielectric constant of about 7 as a first dielectric constant. The first rear cover 211 may be formed of, for example, ceramic, and may have a relative dielectric constant of about 30 as a second dielectric constant. In a comparative example, as the dielectric constant of the first rear cover 211 increases, the amount of reflection by the first rear cover 211 may increase, and the amount of radiation of electromagnetic waves passing through the first rear cover 211 to the outside may be reduced. In a comparative example, a surface wave guided through the first rear cover 211 may be generated due to the electromagnetic wave radiated from the antenna structure 4. In a comparative example, the first rear cover 211 is a waveguide through which electromagnetic waves radiated from the antenna structure 4 flow, and may be, for example, a path of a medium through which electromagnetic waves flow by using total reflection properties. In a comparative example, beamforming may be performed so that a corresponding beam pattern is formed through the antenna array AR (refer to FIG. 4) of the antenna structure 4, but the surface wave guided to the first rear cover 211 may cause deformation (or distortion) of the beam pattern or reduce the beam coverage (or communication range). In a comparative example, the surface wave may cause power loss, thereby reducing the antenna radiation performance of the antenna structure 4. In a comparative example, a part of the electromagnetic field (or electromagnetic wave) formed from the antenna array AR of the antenna structure 4 may be reflected from the first rear cover 211, and the reflected component may compensate and/or interfere with the maximum radiation direction (boresight) (e.g., the direction of the main lobe), resulting in deformation (or distortion) of the beam pattern. In a comparative example, deformation (or distortion) of the beam pattern may include the formation of nulls (e.g., refer to reference numeral '2303' in FIG. 23B) between lobes of the beam pattern. The null may indicate, for example, an ineffective area in which the antenna array AR cannot radiate or detect electromagnetic waves. The null may indicate, for example, a direction in which the radiation intensity is substantially zero. In a comparative example, it may be difficult to secure beam coverage due to deformation or distortion of the beam pattern. In a comparative example, a part of the electromagnetic field (or electromagnetic wave) formed from the antenna structure 4 may be reflected by the first rear cover 211 to reach the ground structure 2040 (refer to FIG. 20) and may be reflected by the non-flat ground structure 2040, and the reflected component may cause compensation and/or interference, resulting in deformation (or distortion) of the beam pattern. Referring to FIG. 22, in an embodiment, the conductive pattern 92 may reduce the effect of the first rear cover 211 on the antenna radiation performance of the antenna structure 4 compared to the comparative example in which the conductive pattern 92 is not included. In a comparative example, the first rear cover 211 may reflect the electromagnetic wave radiated from the antenna structure 4 to reduce the radiation amount of the electromagnetic wave passing through the first rear cover 211 to the outside. In a comparative example, it may be difficult to form a radiation pattern (e.g., an omnidirectional radiation pattern) that is uniformly radiated into a space in a direction in which the third cover area ⓒ of the electronic device 2 faces. In a comparative example, the first rear cover 211 may make it difficult to form a beam in which a relatively large amount of energy is radiated in a direction toward which the third cover area ⓒ of the electronic device 2 faces. In an embodiment, the conductive pattern 92 may reduce the influence of the first rear cover 211 and/or the non-flat ground structure 2040 on the antenna radiation performance or the beam pattern of the antenna structure 4 compared to the comparative example. For example, the conductive pattern 92 may reduce or suppress the surface wave that the electromagnetic wave radiated from the antenna structure 4 is induced or leaked to the first rear cover 211 to reduce deformation or distortion of the beam pattern, thereby securing antenna gain and beam coverage. For example, the conductive pattern 92 may suppress a surface wave or reduce a disturbance wave. For example, the conductive pattern 92 may reduce the deformation or distortion of the electromagnetic wave by changing the boundary condition of the electromagnetic wave with respect to the first rear cover 211.

Figure 24A:
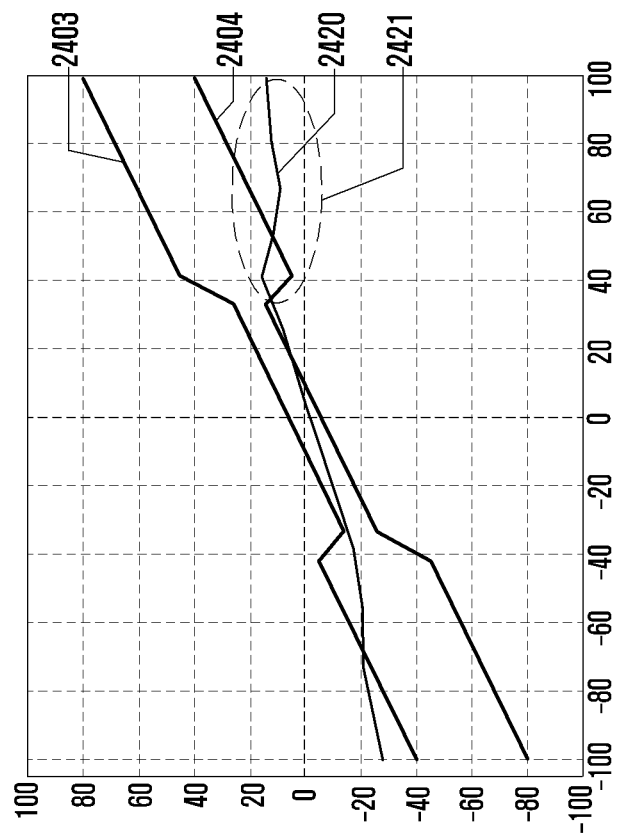
FIG. 24A is a graph illustrating a value measured at an angle at which a signal transmitted from a signal source is received by an electronic device according to an embodiment including a conductive pattern and an electronic device according to a comparative example not including a conductive pattern.
Figure 24B:
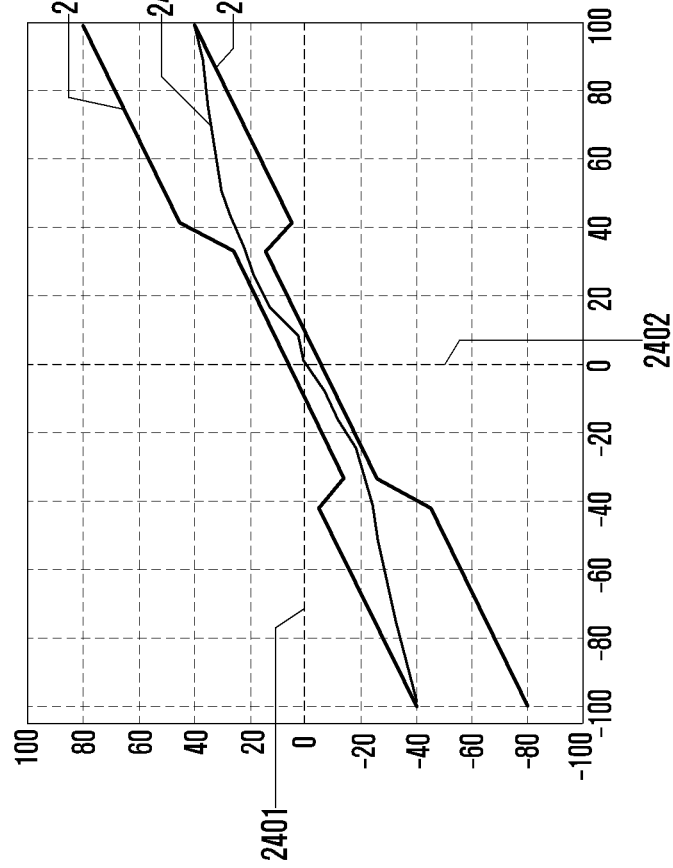
FIG. 24B is a graph illustrating a value measured at an angle at which a signal transmitted from a signal source is received by an electronic device according to a comparative example that does not include a conductive pattern.

FIG. 24A is a graph illustrating a value measured at an angle at which a signal transmitted from a signal source is received by an electronic device 2 according to an embodiment including a conductive pattern 92. FIG. 24B is a graph illustrating a value measured at an angle at which a signal transmitted from a signal source is received by an electronic device according to a comparative example that does not include a conductive pattern 92.

Referring to FIGS. 24A and 24B, the electronic device 2 according to an embodiment may include the conductive pattern 92 capable of expanding or strengthening the antenna ground for the antenna structure 4 (refer to FIG. 7). Reference numeral '2410' is a graph related to the electronic device 2 according to an embodiment. Reference numeral '2420' is a graph related to the electronic device 2 of the comparative example. A horizontal axis 2401 of the graphs indicates an angle at which the electronic device is rotated. A vertical axis 2402 of the graphs may represent a value obtained by measuring an angle (e.g., the angle received on the x-axis, or the angle received on the y-axis) at which a signal transmitted from a signal source is received according to a rotation angle of the electronic device. The graph indicated by reference numeral '2403' and the graph indicated by '2404' may represent, for example, a design range capable of securing reliability of data received from a signal source according to a rotation angle of the electronic device. The electronic device of the comparative example may have a measurement value that is out of the design range that may ensure reliability, such as the part indicated by the reference numeral '2421', but the electronic device 2 according to an embodiment may measure a reliable signal reception angle satisfying a design range by expanding or strengthening an antenna ground for the antenna structure 4 by using the conductive pattern 92 compared to the electronic device of the comparative example.

According to an embodiment of disclosure, an electronic device (e.g., the electronic device 2 of FIG. 2) may include a housing (e.g., the foldable housing 20 of FIG. 2) providing a front surface (e.g., the front surface 20A of FIG. 2) of the electronic device and a rear surface (e.g., the rear surface 20B of FIG. 2) of the electronic device. The electronic device may include an antenna structure (e.g., the antenna structure 4 of FIG. 2) located within the housing. The antenna structure 4 may include a printed circuit board (e.g., the printed circuit board 41 of FIG. 4). The printed circuit board may include a first surface (e.g., the first surface 41A in FIG. 4) facing the front surface or the rear surface, and a second surface (e.g., the second surface 41B of FIG. 4 or FIG. 6) facing an opposite direction to the first surface. The printed circuit board may include a first conductive layer (e.g., the first conductive layer 501 of FIG. 5) including a first antenna element and a second antenna element (e.g., any two of the plurality of antenna elements ①, ②, and ③ of FIG. 4) that do not overlap each other when viewed from above the first surface. The printed circuit board may include a second conductive layer (e.g., the second conductive layer 502 of FIG. 5) located closer to the second surface than the first conductive layer. The second conductive layer may operate as a ground plane. The printed circuit board may include a dielectric (e.g., dielectric 503 in FIG. 5) located between the first conductive layer and the second conductive layer. The electronic device may include a conductive pattern (e.g., the conductive pattern 92 of FIG. 9 or FIG. 20). The conductive pattern may be located between the front surface and the second surface in a case where the first surface faces the rear surface, and may be located between the rear surface and the second surface in a case where the first surface faces the front surface. The conductive pattern may overlap at least a part of the second conductive layer when viewed from above the first surface.

According to an embodiment of disclosure, the second conductive layer (e.g., the second conductive layer 502 in FIG. 20) may include a second edge (e.g., the fifteenth edge E15 of FIG. 20) corresponding to the first edge (e.g., the first edge E1 of FIG. 20) of the first antenna element or the second antenna element when viewed from above the first surface (e.g., the first surface 41A in FIG. 20). The conductive pattern may include a third edge (e.g., the edge 1301 of FIG. 20) corresponding to the second edge when viewed from above the first surface. The second edge may be located between the first edge and the third edge when viewed from above the first surface.

According to an embodiment of disclosure, the electronic device may further include a non-conductive support structure (e.g., the non-conductive support structure 91 of FIG. 20) located within the housing. The printed circuit board (e.g., the printed circuit board 41 of FIG. 4) may be coupled to the non-conductive support structure. The conductive pattern (e.g., the conductive pattern 92 of FIG. 20) may be disposed in the non-conductive support structure.

According to an embodiment of disclosure, the conductive pattern (e.g., the conductive pattern 92 of FIG. 9) may be disposed on one surface (e.g., on surface 91A of FIG. 10) of the non-conductive support structure (e.g., the non-conductive support structure 91 of FIG. 10) facing the printed circuit board (e.g., the printed circuit board 41 of FIG. 4).

According to an embodiment of disclosure, the conductive pattern (e.g., the conductive pattern 92 of FIG. 9) may be formed by using LDS.

According to an embodiment of disclosure, the conductive pattern (e.g., the conductive pattern 92 of FIG. 20) may include a conductive adhesive member.

According to an embodiment of disclosure, the conductive pattern is disposed on other surface (e.g., the fourth surface 9B of FIG. 20) of the non-conductive support structure (e.g., the non-conductive support structure 91 of FIG. 10) facing opposite direction to one surface facing the printed circuit board.

According to an embodiment of disclosure, the conductive pattern may be located at least partially inside a perimeter of the non-conductive support structure (e.g., the non-conductive support structure 91 of FIG. 10).

According to an embodiment of disclosure, the conductive pattern includes a first conductive pattern located corresponding to the first antenna element, and a second conductive pattern located corresponding to the second antenna element and separated from the first conductive pattern (e.g., refer to the first conductive pattern 1910, the second conductive pattern 1920, and the third conductive pattern 1930 of FIG. 19).

According to an embodiment of disclosure, the conductive pattern (e.g., the conductive pattern 92 of FIG. 20) may be in an electrically floating state.

According to an embodiment of disclosure, the electronic device may further include another printed circuit board (e.g., the first printed circuit board 730 of FIG. 7) on which a wireless communication circuit configured to transmit and/or receive a signal of a selected or specified frequency band through the antenna structure is disposed. The conductive pattern (e.g., the conductive pattern 92 of FIG. 7) may be electrically connected to a ground plane included in the other printed circuit board.

According to an embodiment of disclosure, the housing may include a side member (e.g., the first side member 212 of FIG. 7) that provides at least a part of a side surface of the electronic device. The electronic device may further include a support structure (e.g., the first support structure 710 of FIG. 7) located in the housing and connected or coupled to the side member, and a non-conductive support structure (e.g., the non-conductive support structure 91 of FIG. 7) disposed on one surface of the support structure facing the rear surface. The printed circuit board (e.g., the printed circuit board 41 of FIG. 4) may be coupled to the non-conductive support structure. The conductive pattern (e.g., the conductive pattern 92 of FIG. 7) may be disposed in the non-conductive support structure.

According to an embodiment of disclosure, the electronic device may further include a flexible display (e.g., the flexible display 30 of FIG. 20) located within the housing. The flexible display may be visually exposed through the front surface (e.g., the front surface 20A of FIG. 2). The housing may fold the front surface inward and include a first housing (e.g., the first housing 21 of FIG. 2) and a second housing (e.g., the second housing 22 of FIG. 2) with respect to a folding axis. The antenna structure may be located within the first housing or the second housing.

According to an embodiment of disclosure, the antenna structure (e.g., the antenna structure 4 of FIG. 7) may transmit and/or receive a signal of a frequency band related to ultra-wide band (UWB).

According to an embodiment of disclosure, the electronic device may further include a wireless communication circuit (e.g., the wireless communication module 192 of FIG. 1) configured to transmit and/or receive a signal of a selected or specified frequency band through the antenna structure, and a processor (e.g., the processor 120 in FIG. 1) electrically connected to the wireless communication circuit. The processor may be configured to perform a positioning function for a signal source based on signals received through the first antenna element and the second antenna element.

According to an embodiment of disclosure, an electronic device (e.g., the electronic device 2 of FIG. 2) may include a housing (e.g., the foldable housing 20 of FIG. 2) providing a front surface (e.g., the front surface 20A of FIG. 2) of the electronic device and a rear surface (e.g., the rear surface 20B of FIG. 2) of the electronic device. The electronic device may include an antenna structure (e.g., the antenna structure 4 of FIG. 2) located within the housing. The antenna structure 4 may include a printed circuit board (e.g., the printed circuit board 41 of FIG. 4). The printed circuit board may include a first surface (e.g., the first surface 41A in FIG. 4) facing the front surface or the rear surface, and a second surface (e.g., the second surface 41B of FIG. 4 or FIG. 6) facing an opposite direction to the first surface. The printed circuit board may include a first conductive layer (e.g., the first conductive layer 501 of FIG. 5) including a first antenna element and a second antenna element (e.g., any two of the plurality of antenna elements ①, ②, and ③ of FIG. 4) that do not overlap each other when viewed from above the first surface. The printed circuit board may include a second conductive layer (e.g., the second conductive layer 502 of FIG. 5) located closer to the second surface than the first conductive layer. The second conductive layer may operate as a ground plane. The printed circuit board may include a dielectric (e.g., dielectric 503 in FIG. 5) located between the first conductive layer and the second conductive layer. The electronic device may include a conductive pattern (e.g., the conductive pattern 92 of FIG. 9 or FIG. 20). The conductive pattern may be located between the front surface and the second surface in a case where the first surface faces the rear surface, and may be located between the rear surface and the second surface in a case where the first surface faces the front surface. The conductive pattern may overlap at least a part of the second conductive layer when viewed from above the first surface. The second conductive layer may include a second edge (e.g., the fifteenth edge E15 of FIG. 20) corresponding to the first edge (e.g., the first edge E1 of FIG. 20) of the first antenna element or the second antenna element when viewed from above the first surface. The conductive pattern may include a third edge (e.g., the edge 1301 of FIG. 20) corresponding to the second edge when viewed from above the first surface. The second edge may be located between the first edge and the third edge when viewed from above the first surface.

According to an embodiment of disclosure, the electronic device may further include a non-conductive support structure (e.g., the non-conductive support structure 91 of FIG. 20) located within the housing. The printed circuit board (e.g., the printed circuit board 41 of FIG. 4) may be coupled to the non-conductive support structure. The conductive pattern (e.g., the conductive pattern 92 of FIG. 20) may be disposed in the non-conductive support structure.

According to an embodiment of disclosure, the conductive pattern (e.g., the conductive pattern 92 of FIG. 9) may be disposed on one surface (e.g., one surface 91A of FIG. 10) of the non-conductive support structure (e.g., the non-conductive support structure 91 of FIG. 10) facing the printed circuit board (e.g., the printed circuit board 41 of FIG. 4).

According to an embodiment of disclosure, the electronic device may further include a flexible display (e.g., the flexible display 30 of FIG. 20) located within the housing. The flexible display may be visually exposed through the front surface (e.g., the front surface 20A of FIG. 2). The housing may fold the front surface inward and include a first housing (e.g., the first housing 21 of FIG. 2) and a second housing (e.g., the second housing 22 of FIG. 2) with respect to a folding axis. The antenna structure may be located within the first housing or the second housing.

According to an embodiment of disclosure, the electronic device may further include a wireless communication circuit (e.g., the wireless communication module 192 of FIG. 1)

configured to transmit and/or receive a signal of a selected or specified frequency band through the antenna structure, and a processor (e.g., the processor 120 in FIG. 1) electrically connected to the wireless communication circuit. The processor may be configured to perform a positioning function for a signal source based on signals received through the first antenna element and the second antenna element.

Embodiments disclosed in the disclosure and drawings are merely presented as specific examples to easily explain technical content and help understanding of the embodiments, and are not intended to limit the scope of the embodiments. Therefore, the scope of the various embodiments of the disclosure should be interpreted as being included in the scope of the various embodiments of the disclosure, in addition to the embodiments disclosed herein, in a modified or modified form.

The invention claimed is:

1. An electronic device comprising:
 a housing providing a front surface of the electronic device and a rear surface of the electronic device;
 an antenna structure including a printed circuit board located within the housing and including a first surface facing the front surface or the rear surface and a second surface facing an opposite direction to the first surface, wherein the printed circuit board comprises:
  a first conductive layer including a first antenna element and a second antenna element that do not overlap each other when viewed from above the first surface;
  a second conductive layer located closer to the second surface than the first conductive layer and operating as a ground plane; and
  a dielectric located between the first conductive layer and the second conductive layer; and
 a conductive pattern that overlaps at least a part of the second conductive layer when viewed from above the first surface;
 wherein, when the first surface faces the rear surface, the conductive pattern is located between the front surface and the second surface; and
 wherein, when the first surface faces the front surface, the conductive pattern is located between the rear surface and the second surface.

2. The electronic device of claim 1, wherein the second conductive layer, when viewed from above the first surface, includes a second edge corresponding to a first edge of the first antenna element or the second antenna element, wherein the conductive pattern includes a third edge corresponding to the second edge, and wherein the second edge is located between the first edge and the third edge.

3. The electronic device of claim 1, further comprising a non-conductive support structure located within the housing,
 wherein the printed circuit board is coupled to the non-conductive support structure, and
 wherein the conductive pattern is disposed on the non-conductive support structure.

4. The electronic device of claim 3, wherein the conductive pattern is disposed on a first surface of the non-conductive support structure facing the printed circuit board.

5. The electronic device of claim 4, wherein the conductive pattern is formed by using laser direct structuring (LDS).

6. The electronic device of claim 4, wherein the conductive pattern includes a conductive adhesive member.

7. The electronic device of claim 3, wherein the conductive pattern is disposed on a second surface of the non-conductive support structure facing an opposite direction from a first surface facing the printed circuit board.

8. The electronic device of claim 3, wherein the conductive pattern is located at least partially inside a perimeter of the non-conductive support structure.

9. The electronic device of claim 1, wherein the conductive pattern comprises a first conductive pattern overlapping the first antenna element, and a second conductive pattern overlapping the second antenna element and separated from the first conductive pattern.

10. The electronic device of claim 1, wherein the conductive pattern is in an electrically floating state.

11. The electronic device of claim 1, further comprising another printed circuit board on which a wireless communication circuit configured to transmit and/or receive a signal of a selected or specified frequency band through the antenna structure is disposed,
 wherein the conductive pattern is electrically connected to a ground plane included in the other printed circuit board.

12. The electronic device of claim 1, wherein the housing includes a side member that provides at least a part of a side surface of the electronic device, further comprising a support structure located in the housing and connected or coupled to the side member, and a non-conductive support structure disposed on one surface of the support structure facing the rear surface,
 wherein the printed circuit board is coupled to the non-conductive support structure, and
 wherein the conductive pattern is disposed in the non-conductive support structure.

13. The electronic device of claim 1, further comprising a flexible display located within the housing and visually exposed through the front surface,
 wherein the housing is able to fold the front surface inward and includes a first housing and a second housing with respect to a folding axis, and
 wherein the antenna structure is located within the first housing or the second housing.

14. The electronic device of claim 1, wherein the antenna structure transmits and/or receives a signal of a frequency band related to ultra-wide band (UWB).

15. The electronic device of claim 1, further comprising:
 a wireless communication circuit configured to transmit and/or receive a signal of a selected or specified frequency band through the antenna structure; and
 a processor electrically connected to the wireless communication circuit,
 wherein the processor is configured to perform a positioning function for a signal source based on signals received through the first antenna element and the second antenna element.

16. An electronic device comprising:
 a housing providing a front surface of the electronic device and a rear surface of the electronic device;
 an antenna structure including a printed circuit board located within the housing and including a first surface facing the front surface or the rear surface and a second surface facing an opposite direction to the first surface, wherein the printed circuit board comprises:
  a first conductive layer including a first antenna element and a second antenna element that do not overlap each other when viewed from above the first surface,
  a second conductive layer located closer to the second surface than the first conductive layer and operating as a ground plane, and a dielectric located between the first conductive layer and the second conductive layer; and a conductive pattern that overlaps the second conductive layer when viewed from above the first surface;

wherein, when the first surface faces the rear surface, the conductive pattern is located between the front surface and the second surface, wherein, when the first surface faces the front surface, the conductive pattern is located between the rear surface and the second surface, and wherein, when viewed from above the first surface, the second conductive layer includes a second edge corresponding to a first edge of the first antenna element or the second antenna element, wherein the conductive pattern includes a third edge corresponding to the second edge, and wherein the second edge is located between the first edge and the third edge.

17. The electronic device of claim 16, further comprising a non-conductive support structure located within the housing, wherein the printed circuit board is coupled to the non-conductive support structure, and wherein the conductive pattern is disposed on the non-conductive support structure.

18. The electronic device of claim 17, wherein the conductive pattern is disposed on a first surface of the non-conductive support structure facing the printed circuit board.

19. The electronic device of claim 16, further comprising a flexible display located within the housing and visually exposed through the front surface, wherein the housing is able to fold the front surface inward and includes a first housing and a second housing with respect to a folding axis, and wherein the antenna structure is located within the first housing or the second housing.

20. The electronic device of claim 16, further comprising:

a wireless communication circuit configured to transmit and/or receive a signal of a selected or specified frequency band through the antenna structure; and a processor electrically connected to the wireless communication circuit, wherein the processor is configured to perform a positioning function for a signal source based on signals received through the first antenna element and the second antenna element.

* * * * *